United States Patent
Zhang et al.

(10) Patent No.: US 12,502,859 B2
(45) Date of Patent: Dec. 23, 2025

(54) FULLY-AUTOMATIC PRODUCTION LINE AND AUTOMATIC PRODUCTION METHOD FOR RUBBER SEAL RINGS

(71) Applicant: CHENGDU HOLY AVIATION SCIENCE TECHNOLOGY CO., LTD., Chengdu (CN)

(72) Inventors: Xiaofeng Zhang, Chengdu (CN); Jie Zhong, Chengdu (CN); Chen Han, Chengdu (CN); Bing Li, Chengdu (CN); Liang Wang, Chengdu (CN); Jiangxiong Luo, Chengdu (CN); Chun Xu, Chengdu (CN); Yong Huang, Chengdu (CN); Xi Ling, Chengdu (CN); Zhe Chen, Chengdu (CN); Qianqian Xu, Chengdu (CN); Qingbo Zheng, Chengdu (CN); Siyu Lin, Chengdu (CN); Qin Chen, Chengdu (CN); Xing Liu, Chengdu (CN)

(73) Assignee: CHENGDU HOLY AVIATION SCIENCE TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/503,464

(22) Filed: Nov. 7, 2023

(65) Prior Publication Data
US 2024/0227338 A1 Jul. 11, 2024

(30) Foreign Application Priority Data
Jan. 9, 2023 (CN) .......................... 202310023823.5

(51) Int. Cl.
*B29D 99/00* (2010.01)
*B29K 21/00* (2006.01)
(Continued)

(52) U.S. Cl.
CPC .......... *B29D 99/0053* (2013.01); *B65B 5/067* (2013.01); *B65B 7/02* (2013.01);
(Continued)

(58) Field of Classification Search
CPC ....... B29D 99/0053; B65B 5/067; B65B 7/02; B65B 9/08; B65B 43/10; B65B 51/26;
(Continued)

(56) References Cited

FOREIGN PATENT DOCUMENTS

| CN | 106751850 A | 5/2017 |
|---|---|---|
| CN | 107553800 A | 1/2018 |

(Continued)

OTHER PUBLICATIONS

Diao, Machine Translation of CN 112959568 A, Jun. 15, 2021 (Year: 2024).*

*Primary Examiner* — Veronica Martin
(74) *Attorney, Agent, or Firm* — MUNCY, GEISSLER, OLDS & LOWE, P.C.

(57) ABSTRACT

A fully-automatic production line and an automatic production method for rubber sealing rings. The fully-automatic production line includes a ring forming area, a molded vulcanization area, a flash removal area, a two-stage vulcanization area, an online detection area, a packaging and labeling area, and a control room. An automatic production line for rubber sealing rings involves the steps of loading and transferring, molded vulcanization, flash removal, second-stage vulcanization, packaging and labeling, and the like. The fully-automatic production line solves the technical problems in the prior art that the production of rubber sealing rings fails to adopt the molded vulcanization process, and meanwhile the specifications of the produced rubber sealing rings are single.

10 Claims, 29 Drawing Sheets

(51) Int. Cl.
- *B65B 5/06* (2006.01)
- *B65B 7/02* (2006.01)
- *B65B 9/08* (2012.01)
- *B65B 43/10* (2006.01)
- *B65B 51/26* (2006.01)
- *B65B 57/20* (2006.01)
- *B65C 1/02* (2006.01)
- *B65C 9/40* (2006.01)
- *F16J 15/3284* (2016.01)

(52) U.S. Cl.
CPC ............... *B65B 9/08* (2013.01); *B65B 43/10* (2013.01); *B65B 51/26* (2013.01); *B65B 57/20* (2013.01); *B65C 1/02* (2013.01); *B65C 9/40* (2013.01); *B29K 2021/006* (2013.01); *F16J 15/3284* (2013.01)

(58) Field of Classification Search
CPC .. B65B 57/20; B65C 1/02; B65C 9/40; B29K 2021/006
See application file for complete search history.

(56) References Cited

FOREIGN PATENT DOCUMENTS

| | | | | |
|---|---|---|---|---|
| CN | 105719880 B | 2/2018 | | |
| CN | 109483787 A | 3/2019 | | |
| CN | 109366828 B | 7/2020 | | |
| CN | 112959568 A | * 6/2021 | ............ | B29C 35/02 |
| CN | 213532775 U | 6/2021 | | |
| CN | 113510892 A | 10/2021 | | |
| CN | 112959568 B | 11/2021 | | |
| CN | 214724259 U | 11/2021 | | |
| CN | 114055686 A | 2/2022 | | |
| CN | 113829575 B | 4/2022 | | |

\* cited by examiner

FULLY-AUTOMATIC PRODUCTION LINE AND AUTOMATIC PRODUCTION METHOD FOR RUBBER SEAL RINGS

TECHNICAL FIELD

The present invention relates to the field of rubber production, in particular to a fully-automatic production line and an automatic production method for rubber seal rings.

BACKGROUND

A rubber seal ring is a widely used sealing product which is produced by placing a rubber blank into a corresponding mold, then pressurizing and heating the mold, taking the mold out to remove a mold parting flash, and then performing further heating and second-stage vulcanization. It is well known in the art that a rubber seal ring produced by a molded vulcanization process mainly includes several or all of processes of blank refining, ring forming, molded vulcanization, flash removal, two-stage vulcanization, finished-product detection, as well as packaging and labeling. Some processes have been automatically production in the prior art. For example, authorization announcement number CN112959568B, titled "Automatic Molded Vulcanization System and Method for Rubber Product", provides a fully-automatic molded vulcanization production technology for a rubber seal ring in a molded vulcanization process; authorization announcement number CN114055686A, titled "High-precision Automatic Flash Removal Device and Method for Rubber Seal ring", provides an automatic flash removal technology for a rubber seal ring in a flash removal process; and authorization announcement number CN214724259U, titled "Automatic Two-stage Vulcanization System for Rubber Product based on Seven-axis Robot", provides an automatic two-stage vulcanization technology for a rubber seal ring in a two-stage vulcanization process. The rubber seal ring production processes corresponding to the above technologies have the characteristics of high degree of automation and production efficiency, but do not have the beneficial technical effect of fully-automatic production for the rubber seal rings because of only focusing on a single production process. There are some automation technologies for other rubber products in the prior art. For example, authorization announcement number CN105719880B, titled "Fully-automatic Production Line for Mylar Rubber Dome", provides a fully-automatic production line for a mylar rubber dome; authorized announcement number CN109366828B, titled "Automatic Production Line for Medical Rubber Gloves", provides an automatic production line for medical rubber gloves; authorization announcement number CN213532775U, titled "Automatic Grinding and Cutting Production Line for Multi-functional Rubber Transmission Belt", provides an automatic multi-functional rubber belt grinding and cutting line; application number CN106751850A, titled "Continuous Automatic Production Method and Automatic Production Line for Electronic RTV Silicone Rubber", provides a continuous automatic production method and automatic production line for an electronic industry adhesive; application number CN107553800A, titled "Automatic Production Line for Rubber Pad", provides an automatic production line for a rubber pad; application announcement number CN113510892A, titled "Automatic Production Line for Rubber Support", provides an automatic production line of a rubber support; and application number CN109483787A, titled "Automatic Processing Production Line for Rubber Belt", provides an automatic processing production line for a rubber belt. The above technologies realize the automated production of their respective rubber products. However, based on the common general knowledge and corresponding technical characteristics in the art, the production process of the above rubber products is quite different from the production process of rubber seal rings, making it difficult to obtain the technical enlightenment of fully-automatic production of rubber seal rings. Authorization announcement number CN113829575B, titled "Automatic Rubber Production Line and Control Method Therefor", provides an automatic production process of a rubber product, which improves the overall production efficiency and equipment utilization rate of the production line by matching production cycles of opening and closing mold actions and molded vulcanization action. This technology is applied to the automatic production of rubber seal rings. However, in fact, this technology is only for the molded vulcanization production process, and does not involve other production processes.

At present, there is no fully-automatic production technology for rubber seal rings using a molded vulcanization process at home and abroad.

SUMMARY

An object of the present invention is to provide a fully-automatic production line and an automatic production method for rubber seal rings, in order to solve the technical problems of low automation rate in the whole production process of the existing rubber seal ring and single specification of the produced rubber seal ring.

In order to achieve the above object, the technical scheme adopted in the present invention is as follows:

The present invention provides a fully-automatic production line for rubber sealing rings, comprising a ring forming area, a molded vulcanization area, a flash removal area, a two-stage vulcanization area, an online detection area, a packaging and labeling area, and a control room, wherein the ring forming area comprises a blank box stereoscopic warehouse and a plurality of blank forming machines; the blank box stereoscopic warehouse further comprises a blank box, a longitudinal load-bearing steel frame of the blank box stereoscopic warehouse, and a transverse load-bearing steel frame of the blank box stereoscopic warehouse; the blank box is disposed on a load-bearing steel frame composed of the longitudinal load-bearing steel frame of the blank box stereoscopic warehouse and the transverse load-bearing steel frame of the blank box stereoscopic warehouse; the load-bearing steel frame composed of the longitudinal load-bearing steel frame of the blank box stereoscopic warehouse and the transverse load-bearing steel frame of the blank box stereoscopic warehouse is also provided with a four-way reach truck passage of the blank box stereoscopic warehouse; a four-way reach truck of the blank box stereoscopic warehouse is disposed on and in conjunction with the four-way reach truck passage of the blank box stereoscopic warehouse; an in-warehouse stacking machine of the blank box stereoscopic warehouse is disposed at an inlet of the four-way reach truck passage of the blank box stereoscopic warehouse; a blank box conveying belt I is also disposed beside the in-warehouse stacking machine of the blank box stereoscopic warehouse; a blank box transfer mechanism I is disposed on and in conjunction with the blank box conveying belt I; an ex-warehouse stacking machine of the blank box stereoscopic warehouse is further disposed at an outlet of the four-way reach truck passage of the blank box stereoscopic warehouse; an ex-warehouse passage of the blank box stereoscopic warehouse is disposed beside and in cooperation with the ex-warehouse stacking machine of the blank box stereoscopic warehouse; the plurality of blank forming machines is arranged side by side beside the blank box stereoscopic warehouse, and a matching blank box conveying belt II is disposed on the other side of the plurality of blank forming machines;

the molded vulcanization area comprises a mold stereoscopic warehouse, a production stereoscopic warehouse and an assembly unit; the mold stereoscopic warehouse is divided into multiple layers with the same structure, each layer being provided with a plurality of transverse mold stereoscopic warehouse roller groups I, a plurality of longitudinal mold stereoscopic warehouse roller groups II and a mold stereoscopic warehouse roller group III; the mold stereoscopic warehouse roller groups II and the mold stereoscopic warehouse roller groups I jointly constitute a plurality of mold stereoscopic warehouse mold storage positions; a conveying belt steering rod I is respectively disposed at an outlet and an inlet of each mold stereoscopic warehouse mold storage position; a conveying belt steering rod II is further disposed at the junction between the mold stereoscopic warehouse roller group II and the mold stereoscopic warehouse roller group III; the assembly unit comprises a transfer robot I; a blank box conveying belt III is disposed beside and in cooperation with the transfer robot I; a blank box transfer tank III is formed in and in cooperation with the blank box conveying belt III, and meanwhile a photoelectric sensor III is also disposed on the blank box conveying belt III; the blank box conveying belt III is also provided with mold conveying belts II at different heights in a direction perpendicular to the ground; a mold leveling baffle is disposed on the mold conveying belt II, and meanwhile, a mold barcode reader is also disposed on the mold conveying belt II; an in-warehouse stacking machine of a mold stereoscopic warehouse is also disposed at an outlet of the mold conveying belt II; an ex-warehouse stacking machine of the mold stereoscopic warehouse is also disposed at a corresponding position of the in-warehouse stacking machine of the mold stereoscopic warehouse; the in-warehouse stacking machine of the mold stereoscopic warehouse and the ex-warehouse stacking machine of the mold stereoscopic warehouse are connected through a mold stereoscopic warehouse roller group III; the production stereoscopic warehouse comprises a blank box conveying belt V, a conveying belt steering rod III, a molded vulcanization manufacturing unit, longitudinal load-bearing steel frames of the molded vulcanization stereoscopic warehouse, transverse load-bearing steel frames of the molded vulcanization stereoscopic warehouse, transfer robot II ground rails, a transfer robot II, a photoelectric sensor IV, a photoelectric sensor V and a photoelectric sensor VI; the plurality of longitudinal load-bearing steel frames of the molded vulcanization stereoscopic warehouse and the plurality of transverse load-bearing steel frames of the molded vulcanization stereoscopic warehouse constitute a molded vulcanization stereoscopic warehouse shelf; the molded vulcanization warehouse shelf is divided into multiple layers along a direction perpendicular to the ground, with a plurality of molded vulcanization manufacturing units being stored in each layer; the transfer robot II ground rails are disposed between the molded vulcanization stereoscopic warehouse shelves; the transfer robot II is disposed and in cooperation with the transfer robot II ground rails; the photoelectric sensor IV, the photoelectric sensor V and the photoelectric sensor VI are respectively disposed at each position, adjacent to the transfer robot II ground rails, of the blank box conveying belt V; the conveying belt steering rod III is disposed at the connection between the blank box conveying belt V and the blank box conveying belt III;

the flash removal area comprises a blank box conveying belt VI, a flash removal machine base, a blank box transfer tank IV, a blank box transfer mechanism III, a plurality of flash removal machines, a photoelectric sensor VII, a base lifting mechanism III, a blank box and flash removal machine supporting rods; the flash removal machine supporting rods are disposed below the flash removal machine base; the flash removal machines are disposed above the flash removal machine base; the blank box conveying belt V is disposed on one side of each flash removal machine, the blank box conveying belt VI is disposed on the other side of each flash removal machine, and the base lifting mechanism III and the blank box transfer mechanism III are disposed in front of the flash removal machine; the blank box transfer tank IV is disposed on the blank box conveying belt VI; the photoelectric sensor VII is disposed on the blank box conveying belt V; the blank box is mounted on the flash removal machines; the plurality of flash removal machines share one blank box conveying belt V, and at the same time share one blank box conveying belt VI;

the two-stage vulcanization area comprises a rubber ring placement robot, a rubber ring disc, a blank box transfer mechanism IV, a transfer robot III, a two-stage vulcanization area oven rack temporary-storage area, transfer robot III ground rails, ovens and oven supports; the rubber ring disc is installed in conjunction with the rubber ring placement robot; a blank box transfer mechanism IV is disposed beside the rubber ring placement robot; the transfer robot III ground rails is disposed on and in conjunction with the blank box transfer mechanism IV; the transfer robot III is also disposed on and in conjunction with the transfer robot III ground rails; the two-stage vulcanization area oven rack temporary-storage area is also disposed on the transfer robot III ground rails; the plurality of ovens is disposed on both sides of the transfer robot III ground rails through the oven supports, and divided into an upper layer and a lower layer; the transfer robot III ground rails are used in conjunction with the transfer robot III, such that a disposed oven rack is fed into and removed from the oven;

the online detection area comprises an input passage of an automatic rubber ring detection machine, a qualified rubber ring output passage of the automatic rubber ring detection machine, an unqualified rubber ring output passage of the automatic rubber ring detection machine, and the automatic rubber ring detection machine; the input passage of the automatic rubber ring detection machine, the qualified rubber ring output passage of the automatic rubber ring detection machine, and the unqualified rubber ring output passage of the automatic rubber ring detection machine are respectively connected to the automatic rubber ring detection machine; meanwhile, the other end of the input passage of the automatic rubber ring detection machine is connected to the rubber ring placement robot; and the packaging and labeling area comprises a packaging and labeling area unqualified rubber ring input passage, a packaging and labeling area qualified rubber ring input passage, an unqualified rubber ring packaging and labeling machine, a qualified rubber ring packaging and labeling machine, a packaging and labeling area unqualified rubber ring output passage, and a packaging and labeling area qualified rubber ring output passage; one end of the packaging and labeling area unqualified rubber ring input passage is connected to the unqualified rubber ring output passage of the automatic rubber ring detection machine, and the other end of the packaging and labeling area unqualified rubber ring input passage is connected to the unqualified rubber ring packaging and labeling machine; the packaging and labeling area unqualified rubber ring output passage is connected to the unqualified rubber ring packaging and labeling machine; one end of the packaging and labeling area qualified rubber ring input passage is connected to the qualified rubber ring output passage of the automatic rubber ring detection machine, and the other end of the packaging and labeling area qualified rubber ring input passage is connected to the qualified rubber ring packaging and labeling machine; and the packaging and labeling area qualified rubber ring output passage is connected to the qualified rubber ring packaging and labeling machine.

Optionally or preferably, the blank box further comprises a plurality of blank box barrels; the plurality of the blank box barrels is disposed side by side on one side inside the blank box; a thermal insulation area is disposed beside each blank box barrel; a mold storage position is arranged above the thermal insulation area; a blank box mold clamping tank is also formed above the thermal insulation area; an upper barrel edge is disposed on the top of the blank box barrel; a barrel stop edge is disposed at the bottom of an outer edge of the upper barrel edge; the internal side wall of the blank box barrel is provided with a barrel side edge vertical tank and a barrel positioning rod; a barrel base is disposed on the bottom of the blank box barrel; the barrel base is also provided with a barrel base lifting auxiliary hole; a barrel positioning rod transverse fixing rod is also arranged under the barrel base; and a barrel positioning rod top connecting rod and a barrel positioning rod bottom connecting rod are correspondingly disposed at the upper and lower ends of the barrel positioning rod, respectively.

Optionally or preferably, the blank box transfer mechanism I further comprises a blank box transfer mechanism I base; the blank box transfer mechanism I base is disposed on one side of the blank box conveying belt I close to the blank box stereoscopic warehouse; the blank box transfer mechanism I base is further provided with a blank box transfer mechanism I Z-axis sliding table, and a blank box transfer mechanism I Y-axis sliding table screw; the blank box transfer mechanism I Y-axis sliding table screw is provided with a blank box transfer mechanism I Y-axis sliding table motor, meanwhile the blank box transfer mechanism I base is also provided with a blank box transfer mechanism I clamping cylinder and a blank box transfer tank I, and meanwhile the blank box conveying belt I is further provided with a photoelectric sensor I; the blank box transfer mechanism II comprises a blank box transfer mechanism II Z-axis sliding table screw II and a blank box transfer mechanism II Z-axis screw I which are disposed on the blank forming machine base; a blank box transfer mechanism II Z-axis sliding table motor II and a blank box transfer mechanism II Z-axis sliding table motor I are respectively disposed at the upper end of the blank box transfer mechanism II Z-axis sliding table screw II and the upper end of the blank box transfer mechanism II Z-axis screw I; the blank box transfer mechanism II Z-axis sliding table screw II and the upper end of the blank box transfer mechanism II Z-axis screw I are connected through a blank box transfer mechanism II X-axis screw; the blank box transfer mechanism II X-axis screw is also provided with a blank box transfer mechanism II X-axis sliding block and a blank box transfer mechanism II cylinder; the blank box transfer mechanism III comprises a blank box transfer mechanism III Z-axis sliding table screw I and a blank box transfer mechanism III Z-axis sliding table screw II; the blank box transfer mechanism III Z-axis sliding table screw I and the blank box transfer mechanism III Z-axis sliding table screw II are respectively disposed on a flash removal machine base; the blank box transfer mechanism III Z-axis sliding table screw I and the blank box transfer mechanism III Z-axis sliding table screw II are connected through a mounted blank box transfer mechanism III X-axis sliding table screw; the blank box transfer mechanism III X-axis sliding table screw is provided with a blank box transfer mechanism III X-axis sliding table connecting block and a blank box transfer mechanism III cylinder; a blank box transfer mechanism III X-axis sliding table motor is disposed at one end of the blank box transfer mechanism III X-axis sliding table screw; a blank box transfer mechanism III Z-axis sliding table motor II is arranged at the upper end of the blank box transfer mechanism III Z-axis sliding table screw II; a blank box transfer mechanism III Z-axis sliding table motor I is arranged at the upper end of the blank box transfer mechanism III Z-axis sliding table screw I; the blank box transfer mechanism IV comprises a blank box transfer mechanism IV base; a blank box transfer mechanism IV Z-axis screw I and a base lifting mechanism IV are respectively disposed at the upper part of the blank box transfer mechanism IV base; one end of the blank box transfer mechanism IV Z-axis screw I and one end of the blank box transfer mechanism IV screw II are both disposed on the blank box transfer mechanism IV base, and a blank box transfer mechanism IV Z-axis sliding table motor I and a blank box transfer mechanism IV Z-axis sliding table motor II are respectively disposed at the other ends of the blank box transfer mechanism IV Z-axis screw I and the blank box transfer mechanism IV screw II; the blank box transfer mechanism IV Z-axis screw I and the blank box transfer mechanism IV screw II are connected through a mounted blank box transfer mechanism IV X-axis sliding table screw; a blank box transfer mechanism IV X-axis sliding table motor is disposed at one end of the blank box transfer mechanism IV X-axis sliding table screw, and meanwhile, a blank box transfer mechanism IV cylinder is further disposed on the blank box transfer mechanism IV X-axis sliding table screw; and a photoelectric sensor VIII is disposed on the blank box conveying belt VI.

Optionally or preferably, the blank forming machine includes a blank forming machine base, a blank reel, a blank strip guide device, a blank gripping mechanism, a blank forming workbench, a blank box transfer mechanism II, a base lifting mechanism I, a blank box, a blank box conveying belt II, a blank box transfer tank II, a photoelectric sensor II, a blank forming machine supporting rod, a blank strip cutting knife and a blank gripper; the blank forming machine supporting rod is disposed on the bottom surface under the blank forming machine base; the blank forming workbench, the blank box conveying belt II, the blank strip guide device, the blank reel, the blank box transfer mechanism II, the blank box conveying belt II and the base lifting mechanism I are further disposed on the blank forming machine base; the blank strip cutting knife, the blank gripper and the blank gripping mechanism are disposed on the blank forming workbench; the blank strip guide device is composed of a blank strip guide device mounting base mounted on the blank forming machine base and two upper and lower blank strip guide device guide pulleys located on the blank strip guide device mounting base; the blank reel comprises a blank reel body, a blank reel shaft and a blank reel mounting base; the blank reel is mounted on the blank forming machine base through a blank reel mounting base, and assisted by a blank reel motor to rotate; the blank reel is also wound with a rubber blank strip extruded by a high-pressure extruder; the blank box conveying belt II is provided with a blank box transfer tank II in conjunction therewith; a photoelectric sensor II is also disposed on the blank box conveying belt II; the base lifting mechanism I comprises a base lifting mechanism I motor, a base lifting mechanism I screw and a base lifting mechanism I connecting rod; one end of the base lifting mechanism I screw is disposed on the blank forming machine base, the base lifting mechanism I motor is disposed at the other end of the base lifting mechanism I screw, and the base lifting mechanism I connecting rod is disposed on the base lifting mechanism I screw; the base lifting mechanism I connecting rod is driven by the base lifting mechanism I screw to move vertically in a direction perpendicular to the ground; the blank gripping mechanism comprises a blank gripping mechanism Z-axis screw; one end of the blank gripping mechanism Z-axis screw is disposed on the blank forming machine base, and a blank gripping mechanism Z-axis motor is disposed at the other end of the blank gripping mechanism Z-axis screw; a blank gripping mechanism X-axis screw and a blank gripping mechanism Y-axis sliding table are disposed on the blank gripping mechanism Z-axis screw; a blank gripping mechanism X-axis connecting mechanism is arranged at one end of the blank gripping mechanism X-axis screw; a blank gripping mechanism cylinder is also disposed on the blank gripping mechanism X-axis connecting mechanism; a blank gripping mechanism X-axis motor is disposed at the other end of the blank gripping mechanism X-axis screw; and meanwhile, the base lifting mechanism IV and the base lifting mechanism I are identical in structure, not repeat it here.

Optionally or preferably, the molded vulcanization manufacturing unit comprises a molded vulcanization manufacturing unit frame and a mold; the molded vulcanization manufacturing unit frame is of a cuboid structure, and meanwhile the molded vulcanization manufacturing unit frame is provided with a molded vulcanization machine inside; a molded vulcanization manufacturing unit control box is disposed on one side of the molded vulcanization machine, and a loading and unloading mechanism I is disposed on the other side of the molded vulcanization machine; a base lifting mechanism II is disposed in front of the molded vulcanization manufacturing unit frame; the molded vulcanization machine comprises a molded vulcanization machine C-type base; the molded vulcanization machine C-type base is disposed on a bottom plate of the molded vulcanization manufacturing unit frame, and at the same time provides mechanical structural support for the molded vulcanization machine; a molded vulcanization machine force-applying shaft is also disposed at the upper part of the molded vulcanization machine C-type base; the molded vulcanization machine force-applying shaft moves vertically along a Z-axis in a direction perpendicular to the ground, and is provided with an electromagnetic adsorption device I, a heat insulation layer I and a heating plate I respectively from top to bottom; an outer edge of the heating plate I is also provided with a vulcanization thermal insulation plate; a heating plate II, a heat insulation layer II and an electromagnetic adsorption device II are disposed at the lower part of the molded vulcanization machine C-type base from bottom to top; the loading and unloading mechanism I comprises a loading and unloading mechanism I Z-axis screw and a loading and unloading mechanism I Y-axis sliding table; one end of the loading and unloading mechanism I Z-axis screw is disposed on the bottom plate of the molded vulcanization manufacturing unit frame, and a loading and unloading mechanism I Z-axis motor is disposed at the other end of the loading and unloading mechanism I Z-axis screw; a loading and unloading mechanism I cylinder connecting block is disposed on the loading and unloading mechanism I Y-axis sliding table; a loading and unloading mechanism I cylinder rotating assembly is disposed on the loading and unloading mechanism I cylinder connecting block; the loading and unloading mechanism I cylinder is divided into a loading and unloading mechanism I cylinder upper part and a loading and unloading mechanism I cylinder lower part, which are connected independently to an air source and controlled for actions receptively by corresponding air pressure gauges; and meanwhile, the base lifting mechanism II and the base lifting mechanism I are identical in structure, not repeat it here.

Optionally or preferably, the flash removal machine comprises a flash removal machine frame, a loading and unloading mechanism II and a flash removal mechanism; the loading and unloading mechanism II comprises a clamping removal end of the flash removal machine, a loading and unloading mechanism II Y-axis sliding table, a loading and unloading mechanism II Z-axis motor and a loading and unloading mechanism II Z-axis screw; the clamping removal end of the flash removal machine consists of a removal head of the flash removal machine, a force sensor I, a clamping removal end connector of the flash removal machine and a flash removal machine cylinder; one end of the flash removal head of the flash removal machine is connected to the force sensor I, and the other end of the flash removal head of the flash removal machine is continuously provided with a 45° inclination friction surface and a 90° inclination friction surface; one end of the force sensor I is connected to the flash removal head of the flash removal machine, and the other end of the force sensor I is connected to the clamping removal end connector of the flash removal machine; the clamping removal end connector of the flash removal machine is respectively connected to the force sensor I, the flash removal machine cylinder and the loading and unloading mechanism II Y-axis sliding table; the flash removal machine cylinder is connected to the clamping removal end connector of the flash removal machine; the lower part of the flash removal machine frame is disposed on the flash removal machine frame, and except for the side connected with the base lifting mechanism III, the other three sides and the bottom are closed; the loading and unloading mechanism II Y-axis sliding table is composed of a loading and unloading mechanism II Y-axis motor and a loading and unloading mechanism II Y-axis screw; one end of the loading and unloading mechanism II Z-axis screw is disposed on the flash removal machine base, and a loading and unloading mechanism II Z-axis motor is disposed at the other end of the loading and unloading mechanism II Z-axis screw; the flash removal mechanism comprises a flash removal machine X-axis sliding table, a flash removal machine rubber ring rotating motor and a flash removal machine flash removal table; the flash removal machine X-axis sliding table is composed of a flash removal machine rubber ring hook, a flash removal machine rubber ring stretching guide block, a force sensor II, a flash removal machine X-axis sliding table connecting block, a flash removal machine X-axis sliding table screw and a flash removal machine X-axis sliding table motor; one side of the force value sensor II is connected to the flash removal machine rubber ring hook through a crossbar, and the other side of the force value sensor II is connected to the flash removal machine X-axis sliding table connecting block; one side of the flash removal machine X-axis sliding table connecting block is connected to the force sensor II, and the other side of the flash removal machine X-axis sliding table connecting block is connected to the flash removal machine X-axis sliding table screw, such that a connecting force value drives the force sensor II to slide through the flash removal machine X-axis sliding table screw, and finally drives the flash removal machine rubber ring hook to tighten the rubber ring.

Optionally or preferably, the rubber ring placement robot comprises a rubber ring placement robot frame, rubber ring placement robot pneumatic rods, a rubber ring placement robot cylinder, a rubber ring placement robot base and a rubber ring placement robot supporting rod; the rubber ring placement robot frame is disposed on the rubber ring placement robot base; one ends of the plurality of rubber ring placement robot pneumatic rods at the same angle to each other are connected to the rubber ring placement robot frame, and the other ends thereof are connected to the rubber ring placement robot cylinder; a rubber ring disc is also disposed above the rubber ring placement robot base, and functions to carry the rubber rings placed by the rubber ring placement robot; the rubber ring disc is also provided with a barcode for rubber ring disc identification; a rubber ring placement robot supporting rod is disposed below the rubber ring placement robot base and used for providing mechanical support and height adjustment of the rubber ring placement robot; meanwhile the oven rack is composed of an oven rack bracket, an oven rack hook and a rubber ring disc, and functions to hold different rubber ring discs in conjunction with the oven; the oven is composed of an oven door, an oven body, oven door guide rails and an oven door hook; the oven door is driven by a motor disposed in the oven, and is opened and closed along the oven door guide rails; and the oven rack hook on the oven rack is used in conjunction with the oven door hook.

Optionally or preferably, the automatic rubber ring detection machine comprises a qualified rubber ring outlet, an unqualified rubber ring outlet, a rubber ring detection disc motor, a rubber ring separation mechanism, a unqualified rubber ring air gun, an unqualified rubber ring inlet, a qualified rubber ring air gun, a qualified rubber ring inlet, a rubber ring detection disc, and an automatic rubber ring detection machine base; an automatic rubber ring detection machine frame is disposed in the middle of the upper part of the automatic rubber ring detection machine base, an automatic rubber ring detection machine frame is also provided around the perimeter of the automatic rubber ring detection machine base, and automatic rubber ring detection machine supporting rods are disposed at the lower part of the automatic rubber ring detection machine base; a detection station I, a detection station II, a detection station III, a detection station IV and a detection station V are respectively disposed at the upper part of the automatic rubber ring detection machine base; the detection station V further comprises a detection station V Z-axis sliding table screw and a detection station V Z-axis detection head; one end of the detection station V Z-axis sliding table screw is disposed on one end on the automatic rubber ring detection machine base, a detection station V Z-axis sliding table motor is disposed at the other end of the detection station V Z-axis sliding table screw, and a detection station V detection head connecting block is disposed in the middle of the detection station V Z-axis sliding table screw; one side of the detection station V Z-axis detection head is connected to the detection station V detection head connecting block, and a detection station V detection lens is disposed at the lower part of the detection station V Z-axis detection head; a detection station V power supply is disposed below the detection station V detection lens, and the detection station V power supply is located below the rubber ring detection disc; and a qualified rubber ring air gun and an unqualified rubber ring air gun are disposed at a position of the rubber ring detection disc close to the upper part of the automatic rubber ring detection machine input passage, and function to blow air to the rubber rings, such that qualified rubber rings or unqualified rubber rings are blown into the qualified rubber ring inlet or the unqualified rubber ring inlet respectively.

Optionally or preferably, the unqualified rubber ring packaging and labeling machine comprises a packaging bag barrel, a packaging bag barrel shaft, a packaging bag I, a rubber ring receiving barrel, a photoelectric sensor IX, a packaging and labeling machine supporting rod, a packaging bag guide cylinder, a labeler, a packaging bag transverse heat sealer, a packaging bag II, a barcode identifier, a rubber ring and a packaging bag longitudinal heat sealer; the lower part of the packaging and labeling machine supporting rod is disposed on the ground, and the packaging bag barrel is disposed above the packaging and labeling machine supporting rod through the packaging bag barrel shaft; the packaging bag I is a film rolled on the packaging bag barrel, and the lower part of the packaging bag I is rolled into a film tube with an unsealed end through the packaging bag guide cylinder; the unsealed side end of the packaging bag I is heat-sealed by the packaging bag longitudinal heat sealer, and the lower end of the packaging bag I is sealed twice in the front and the rear of the rubber ring by the packaging bag transverse heat sealer; the rubber ring is inputted by the unqualified rubber ring input passage of the packaging and labeling unit, and falls into the packaging bag II with the lower end and side end being sealed after passing through the rubber ring receiving barrel, and the falling process is counted by the photoelectric sensor IX; and the packaging bag II is labeled by the labeler.

An automatic production method for rubber seal rings, which is implemented by the fully-automatic production line for rubber seal rings, comprising the following steps:

S1: issuing a production order number to production line management personnel in a control room; conveying, by a four-way reach truck of a blank box stereoscopic warehouse, blank boxes in the blank box stereoscopic warehouse to an ex-warehouse stacking machine of the blank box stereoscopic warehouse through a four-way reach truck passage of the blank box stereoscopic warehouse, and then conveying to a working area of a transfer robot I through an ex-warehouse passage of the blank box stereoscopic warehouse; establishing a corresponding relation between the production order number and a barcode on the blank box;

S2: clamping, by the transfer robot I, the blank box on the four-way reach truck of the blank box stereoscopic warehouse to a blank box transfer tank II, and returning the four-way reach truck of the blank box stereoscopic warehouse to the blank box stereoscopic warehouse;

S3: conveying the blank box that is carried on the blank box transfer tank II to a blank forming machine that produces the blank ring corresponding to a material designation, along a blank box conveying belt II;

S4: activating a blank box transfer mechanism II to clamp the blank box out of the blank box transfer tank II, and installing the blank box together with a base lifting mechanism I, by means of the installation method of inserting a base lifting mechanism I connecting rod into a barrel base lifting auxiliary hole;

S5: lifting a base lifting mechanism I connecting rod close to one side of the blank forming machine until a barrel base is in a highest position;

S6: after the installation of the blank box, operating the blank forming machine, and clamping, by a blank gripping mechanism cylinder, blank strips and pulling them forward until a blank gripper clamps the front ends of the blank strips;

S7: loosening the blank strips by the blank gripping mechanism cylinder, and conveying the blank strips forward by a blank strip guide device guide pulley until a desired blank strip length is formed in accordance with a desired blank ring specification;

S8: clamping the blank strip by the blank gripping mechanism cylinder, and operating a blank strip cutting knife to cut off the blank strip;

S9: bending the blank strip into a ring by the blank gripping mechanism cylinder under the action of a blank gripping mechanism, and extruding two ends of the blank strip by the blank gripping mechanism cylinder and the blank gripper to complete the blank ring formation;

S10: loosening the blank gripper, placing, by the blank gripping mechanism cylinder, the blank ring, onto a barrel base on which the blank box is raised, and moving the barrel base slightly downward under the driving of a base lifting mechanism I connecting rod to ensure that a vertical height position of the next blank ring on the barrel base is similar to the previous one;

S11: repeating S6 to S10, till a barrel is filled with the blank rings;

S12: clamping the blank box into a blank box transfer tank II through a blank box transfer mechanism II, and conveying the blank box transfer tank II to a working area of the transfer robot I through a blank box conveying belt II;

S13: clamping, by the transfer robot I, the blank box from the blank box transfer tank II into the blank box transfer tank II, recognizing a barcode on the blank box, and issuing a mold command to a mold stereoscopic warehouse;

S14: conveying molds in corresponding mold stereoscopic warehouse mold storage positions in the mold stereoscopic warehouse respectively to an ex-warehouse stacking machine of the mold stereoscopic warehouse through a mold stereoscopic warehouse roller group I, a mold stereoscopic warehouse roller group II and a mold stereoscopic warehouse roller group III, under the action of a conveying belt steering rod I and a conveying belt steering rod II;

S15: lifting the corresponding molds to a working position of the transfer robot I through the ex-warehouse stacking machine of the mold stereoscopic warehouse, and clamping the molds by the transfer robot I into a blank box mold cavity of the blank box;

S16: conveying the blank box transfer tank III to a molded vulcanization area through a blank box conveying belt III, and then conveying to a working area of a corresponding transfer robot II under the action of a conveying belt steering rod III and a blank box conveying belt V;

S17: clamping, by the transfer robot II, the blank box out of a blank box transfer tank III, and installing the blank box in a base lifting mechanism II of the idle mold vulcanization manufacturing unit, by means of the installation method of inserting a connecting rod of the base lifting mechanism II into a barrel base lifting auxiliary hole;

S18: installing, by the transfer robot II, the mold in the blank box on the molded vulcanization machine, and lifting, by the base lifting mechanism II, a barrel base away from the molded vulcanization machine, to a highest position;

S19: operating an electromagnetic adsorption device I and an electromagnetic adsorption device II of the molded vulcanization machine to adsorb an upper mold and a lower mold respectively;

S20: moving a molded vulcanization machine force-applying shaft of the molded vulcanization machine upward to drive the upper mold to be separated from the lower mold;

S21: sucking, a loading and unloading mechanism I, the blank ring from the barrel containing the blank ring in the blank box to the lower mold, and then moving the molded vulcanization machine force-applying shaft downward;

S22: operating a heating plate I and a heating plate II such that the blank ring begins to be molded-vulcanized;

S23: after the completion of molded vulcanization, moving the molded vulcanization machine force-applying shaft upward, and moving a loading and unloading mechanism I cylinder of the loading and unloading mechanism I between the upper mold and the lower mold;

S24: moving the molded vulcanization machine force-applying shaft upward until the upper mold and the lower mold are fitted to the loading and unloading mechanism I cylinder;

S25: operating the loading and unloading mechanism I cylinder to suck the rubber ring on the mold, and determining, according to sensor data, that an adsorption position of the rubber ring is located in a loading and unloading mechanism I cylinder upper part or a loading and unloading mechanism I cylinder lower part;

S26: moving the molded vulcanization machine force-applying shaft upward, and rotating, by the loading and unloading mechanism I, the rubber ring, onto a finished-product rubber ring barrel of the blank box;

S27: moving the finished-product rubber ring barrel base slightly downward under the driving of the base lifting mechanism II to ensure that a vertical height position of the next rubber ring on the barrel base is similar to the previous one;

S28: repeating S19 to S27, until all blank rings are molded-vulcanized, and placed one by one in the finished-product rubber ring barrel;

S29: moving the molded vulcanization machine force-applying shaft downward till the upper mold and the lower mold are close and fitted, stopping operating an electromagnetic adsorption device I and an electromagnetic adsorption device II, and lowering, by the base lifting mechanism, barrel bases on both sides of the blank box to a lowest position;

S30: moving the molded vulcanization machine force-applying shaft upward, clamping, by the transfer robot II, the mold into a blank box mold cavity of the blank box, and clamping the blank box into a blank box transfer tank III;

S31: conveying the blank box transfer tank III into a flash removal area through a blank box conveying belt V, taking, by a blank box transfer mechanism III, the blank box out of the blank box transfer tank III, and installing the blank box in the base lifting mechanism III, by means of an installation method of inserting a connecting rod of the base lifting mechanism III into a barrel base lifting auxiliary hole;

S32: lifting, by the base lifting mechanism III, the barrel base on one side of the blank barrel of the blank box to a highest position;

S33: clamping, by the blank box transfer mechanism III, the rubber ring on one side of a finished-product barrel of the blank box to a flash removal table of the flash removable machine, such that a rotating shaft of a rubber ring rotating motor of the flash removal machine and a flash removal rubber ring hook are located in the rubber ring;

S34: operating a flash removal machine X-axis sliding table, and tightening the rubber ring, wherein the degree of tightening is controlled by a force sensor II;

S35: operating the rubber ring rotating motor of the flash removal machine to drive the rubber ring to rotate, and operating a flash removal head of the flash removal machine to remove flashes of the rubber ring by means of a friction surface, wherein the removal force is controlled by the force sensor I;

S36: after the removal of the flashes of the rubber ring, loosening the rubber ring by the flash removal machine X-axis sliding table; clamping, by the blank box transfer mechanism III, the rubber ring to one side of the blank barrel of the blank box; and moving the blank barrel base slightly downward under the driving of the base lifting mechanism III to ensure that a vertical height position of the next rubber ring on the barrel base is similar to the previous one;

S37: repeating S29 to S36, until all rubber rings are removed for flashes, and placed one by one in the blank barrel;

S38: operating the base lifting mechanism III to lower the barrel bases on both sides of the blank box to a lowest position; and operating the blank box transfer mechanism III to clamp the blank box into a blank box transfer tank IV;

S39: conveying, by the blank box transfer tank IV, the blank box to a second-stage vulcanization area along a blank box conveying belt VI;

S40: operating a blank box transfer mechanism IV to install the blank box and the base lifting mechanism IV, by means of the installation method of inserting a connecting rod of the base lifting mechanism IV into a barrel base lifting auxiliary hole;

S41: taking, by a rubber ring placement robot, the rubber rings one by one out of the blank barrel of the blank box, placing the rubber rings on a rubber disc without overlapping with each other, and establishing a relationship between a barcode on the rubber disc and a barcode on the blank box;

S42: after all rubber rings are placed in the blank box, clamping, by the blank box transfer mechanism IV, a mold in the blank box onto a mold conveying belt II, and then conveying to the mold stereoscopic warehouse by a mold conveying belt II; clamping, by the blank box transfer mechanism IV, the blank box onto the blank box conveying belt I, and then conveying to a blank box stereoscopic warehouse 1 by the blank box conveying belt I;

S43: transferring a rubber ring disc to an oven rack by a transfer robot III, and after all the rubber ring discs placed in the same batch of rubber rings are transferred to the oven rack, transferring the oven rack to the oven by the transfer robot III;

S44: operating the oven to perform two-stage vulcanization of the rubber rings;

S45: after the completion of the two-stage vulcanization, transferring, by the transfer robot III, the oven out of the oven rack, and placing the oven on a two-stage vulcanization area oven rack temporary-storage area; placing, by the transfer robot III, the rubber ring discs in the oven rack one by one on a rubber ring placement robot base; sucking, by a rubber ring placement robot, the rubber rings one by one into an automatic rubber ring detection machine input passage;

S46: inputting the rubber rings one by one ton an automatic blank detection machine through the automatic rubber ring detection machine input passage, for appearance quality and size detection; associating detection information through the barcode on the rubber ring disc; blowing qualified rubber rings into a qualified rubber ring inlet, and then conveying into a packaging and labeling area through a qualified rubber ring output passage of the automatic rubber ring detection machine; blowing unqualified rubber rings into an unqualified rubber ring inlet, and then conveying into the packaging and labeling area through an unqualified rubber ring output passage of the automatic rubber ring detection machine; and S47: packaging and labeling the qualified rubber rings through a qualified rubber ring packaging and labeling machine, and associating detection information through the barcode on the rubber ring disc; packaging and labeling the unqualified rubber rings through an unqualified rubber ring packaging and labeling machine, and associating detection information through the barcode on the rubber ring disc.

The embodiments of the present invention at least can produce the following technical effects.

(1) The whole production process refers to the fully-automatic production. According to the fully-automatic production technology for the rubber seal rings provided by this patent, a blank box is taken out of a blank box warehouse and then transferred to a ring forming area, rubber rings produced in the ring forming area are stacked one by one into the blank box, and the blank box is then transferred to a mold blank box assembling unit. A mold and the blank box are assembled, and then transferred to a molded vulcanization manufacturing unit as a whole. After mold in the blank box is taken out and installed in the molded vulcanization manufacturing unit, the rings in the blank box are taken out one by one and then subjected to molded vulcanization. The finished-product rubber rings after the vulcanization is completed are stacked back to the blank box one by one. After all rings are subjected to molded vulcanization, the mold is removed from the molded vulcanization manufacturing unit and assembled on the blank box. The blank box is transferred to a mold box splitting unit. The mold is splitted and then transferred back to a mold warehouse, and the remaining blank boxes are transferred to a flash removal area. The finished-product rubber rings in the blank box are removed for flashes one by one in the flash removal area, and the flash-removed rubber rings are stacked back into the blank box one by one. After flashes are removed from all finished-product rubber rings, the blank box is transferred to a second-stage vulcanization area, the finished-product rubber rings in the blank box are placed on an oven tray one by one, and the oven tray is transferred to an oven for second-stage vulcanization. After the completion of the second-stage vulcanization, the oven tray is taken out of the oven, and the rubber rings on the tray are transferred to an online detection area for detection one by one. After the detection is completed, the rubber rings are transferred one by one to a packaging and labeling area for packaging and labeling, thereby completing the fully-automatic production process of the whole production process of rubber seal rings.

(2) The production line can produce a variety of specifications of rubber seal rings at the same time. The fully-automatic production line for rubber seal rings provided by this patent mainly achieves the beneficial effects that the production line can produce multiple specifications of rubber seal rings at the same time through seven universal technical settings. 1. Universal double-barrel blank box. The double-barrel blank box, as a carrier for material transfer between different processes of the production line, has universality for rubber seal rings of different specifications. The technical method is that a barrel base is positioned at the vertex of a blank ring or rubber ring through three points, and for rubber rings of different specifications and sizes, this vertex is fixed unchanged, thereby achieving a beneficial effect of universal positioning for clamping and stacking. Use parts of the double-barrel blank box include a ring forming area, a molded vulcanization area, a flash removal area and a two-stage vulcanization area. The blank boxes have the same auxiliary lifting structure, and are universally used in the entire production line, and the detailed structure is described in the embodiments in the specific implementations. 2. Universal blanking forming method. An automatic blank forming technology used in this patent is used in which a rubber blank is remelted and then extruded into continuous blank strips, which are then coiled on a reel. When in use, the length of each blank strip is calculated by an equivalent circumference of the rubber ring, and the reel is controlled to output the blank strip of this length, such that the strip can be coiled into a rubber ring of a desired size, and the detailed structure is described in the embodiments in the specific implementations. 3. Universal molded vulcanization method. A molded vulcanization manufacturing technology used in this patent adopts single-cavity molded vulcanization molds, and the molds having different inner cavity sizes are exactly the same in appearance size structures. A molded vulcanization pressure, time and temperature of the molded vulcanization manufacturing unit can be controlled and adjusted, which is versatile for seal rings of different sizes and rubber grades, and the detailed structure is described in the embodiments in the specific implementations. 4. Universal flash removal method. A flash removal method used in this patent uses two mandrels to stretch the rubber ring, wherein one mandrel is used to fix the rubber ring, the other mandrel is driven by a sliding table module to stretch the rubber ring, and a stretching degree is controlled by a sensor connected to a sliding table. The mandrel driven by the sliding table module is connected to a motor, and the rubber ring is stretched open and driven by the motor to rotate. Flashes inside and outside the rotating rubber ring are removed by a flash removal mandrel of an automatic flashing removal machine to achieve the beneficial effect of universal flash removal, and the detailed structure is described in the embodiments in the specific implementations. 5. Universal two-stage vulcanization method. In the two-stage vulcanization method used in this patent, the rubber rings subjected to two-stage vulcanization on the oven tray are separately stacked through a parallel robot, and then the tray is transferred into the oven through a seven-axis robot. Different oven temperatures are set according to different rubber types to achieve the beneficial effect of universal two-stage vulcanization of the rubber rings, and the detailed structure is described in the embodiments in the specific implementations. 6. Universal online detection method. The online detection method used in this patent uses CCD cameras at different stations to check the surface of the rubber ring. The CCD cameras are used to adjust a Z-axis height through a Z-axis sliding table module, the appearance quality and sizes of rubber rings of different sizes are checked universally, and the detailed structure is described in the embodiments in the specific implementations. 7. Universal packaging and labeling. The packaging marking method used in this patent is used to count the rubber rings by a sensor disposed on a conveying belt, and the rubber rings are packaged with universal packaging plastic bags, and labeled with identification codes on the packaging bags through an inkjet printer, and the detailed structure is described in the embodiments in the specific implementations.

Figure 1:
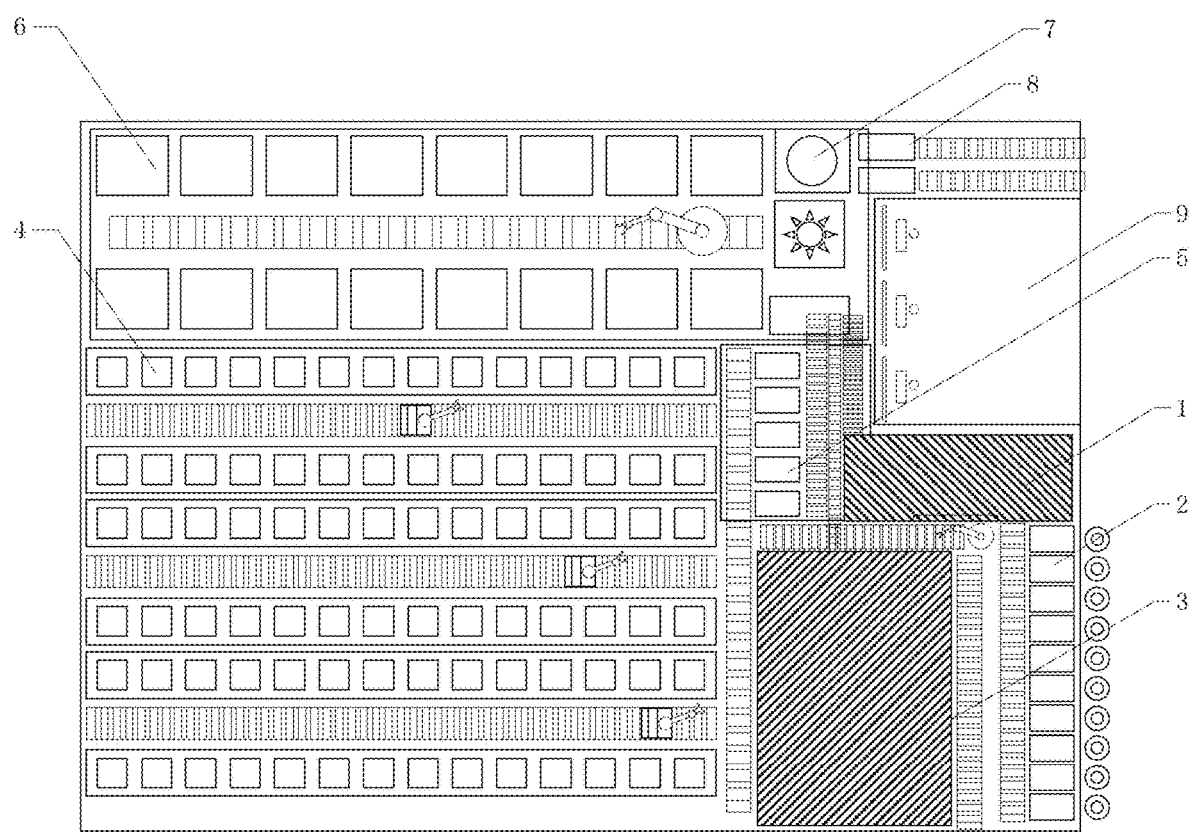
FIG. 1 is a schematic diagram of the layout of a preferred automatic production line for rubber seal rings provided by the present invention.
Figure 2:
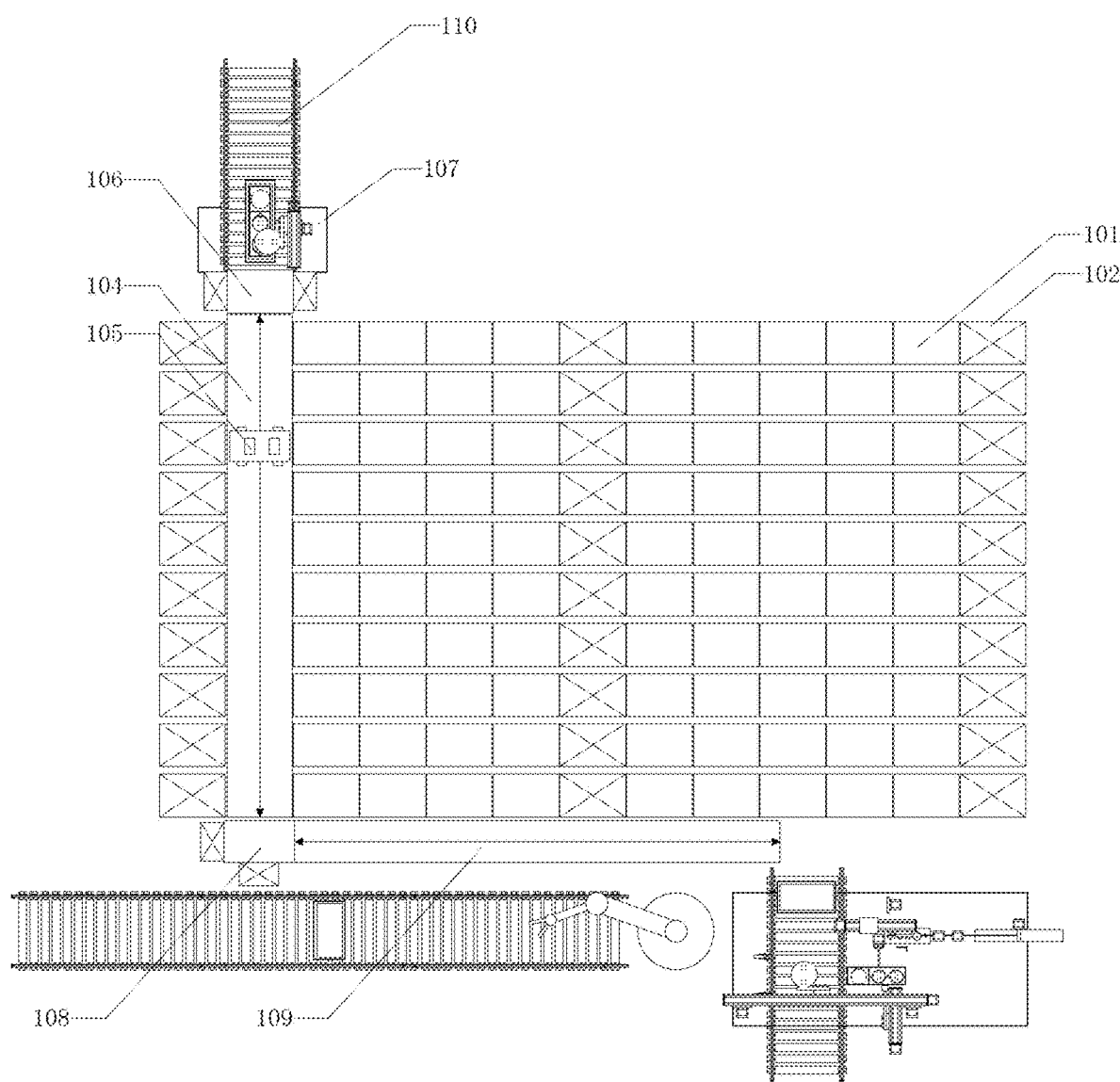
FIG. 2 is a top view of a preferred blank box stereoscopic warehouse provided by the present invention.
Figure 3:
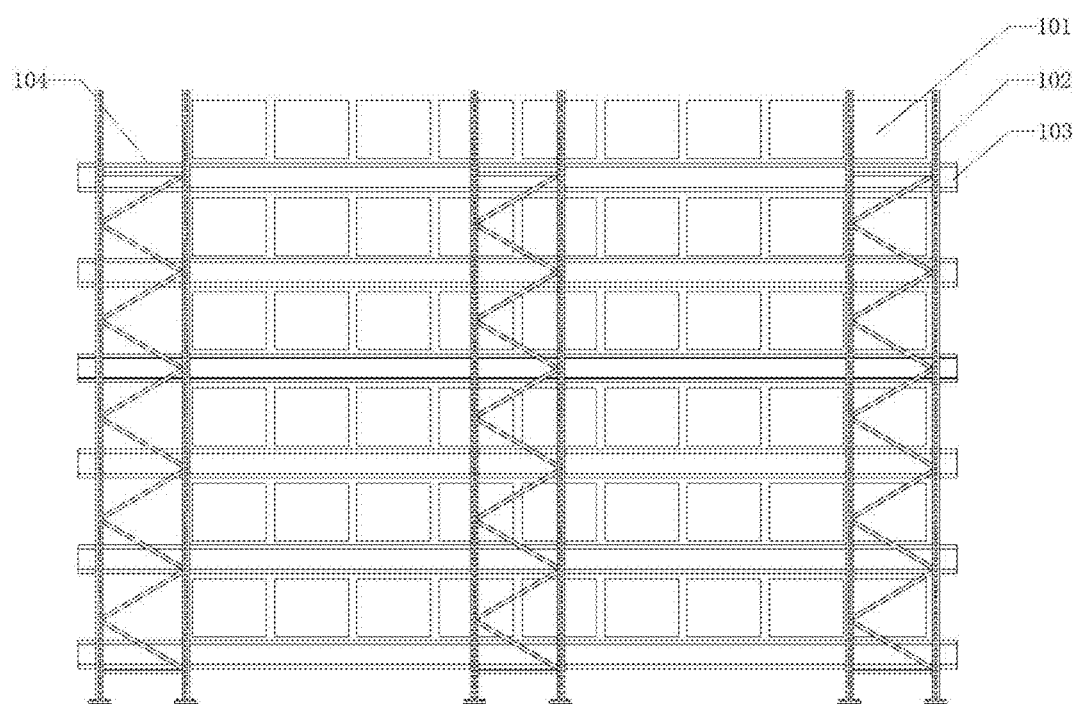
FIG. 3 is a side view of a preferred blank box stereoscopic warehouse provided by the present invention.
Figure 4:
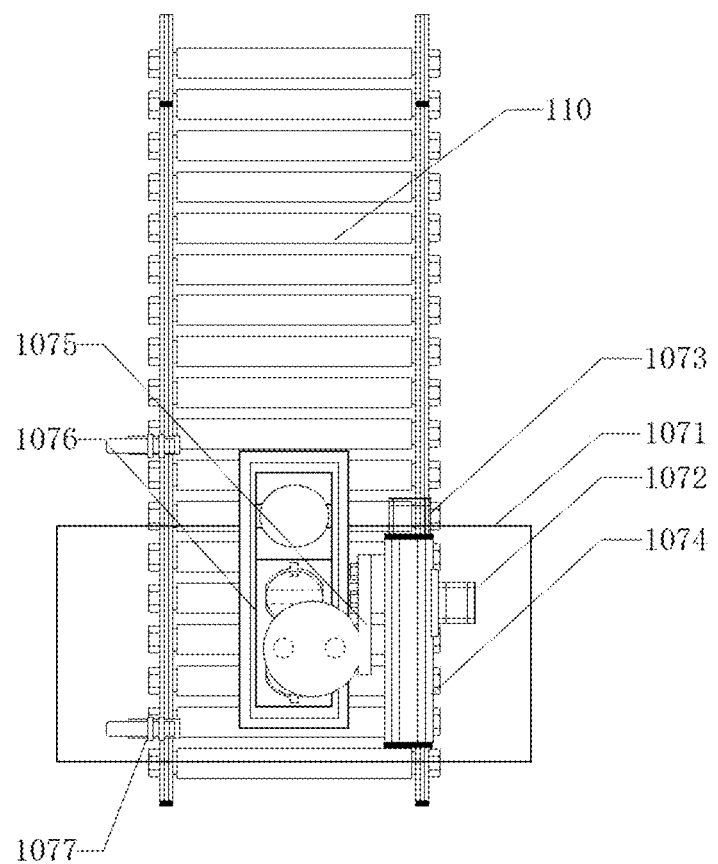
FIG. 4 is a schematic diagram of a preferred transfer mechanism of a blank box stereoscopic warehouse provided by the present invention.
Figure 5:
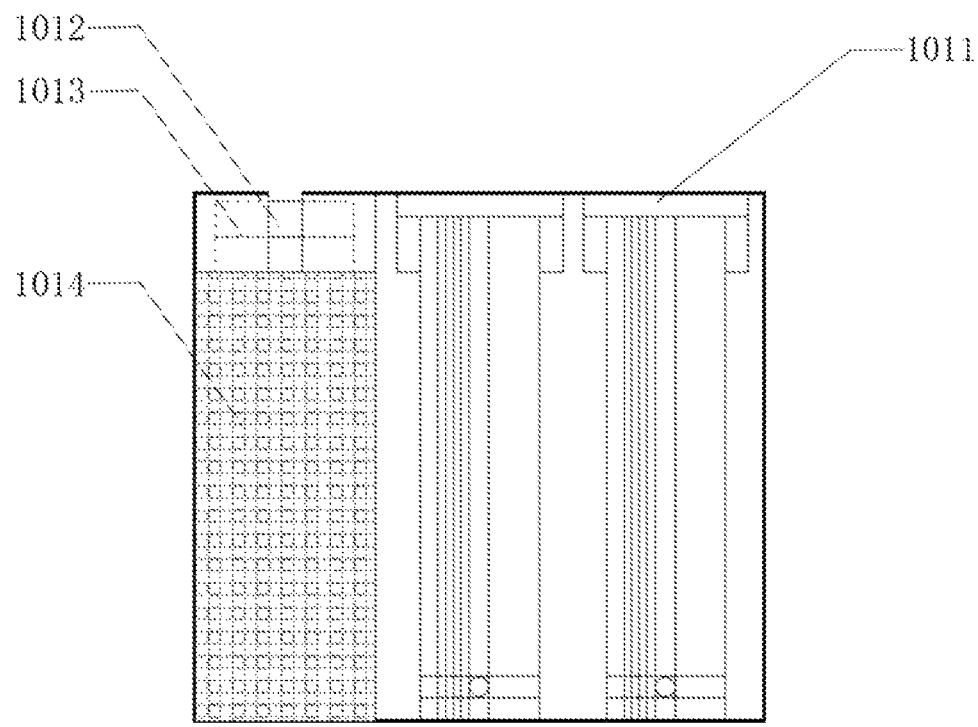
FIG. 5 is a schematic diagram of a preferred blank box provided by the present invention.
Figure 6:
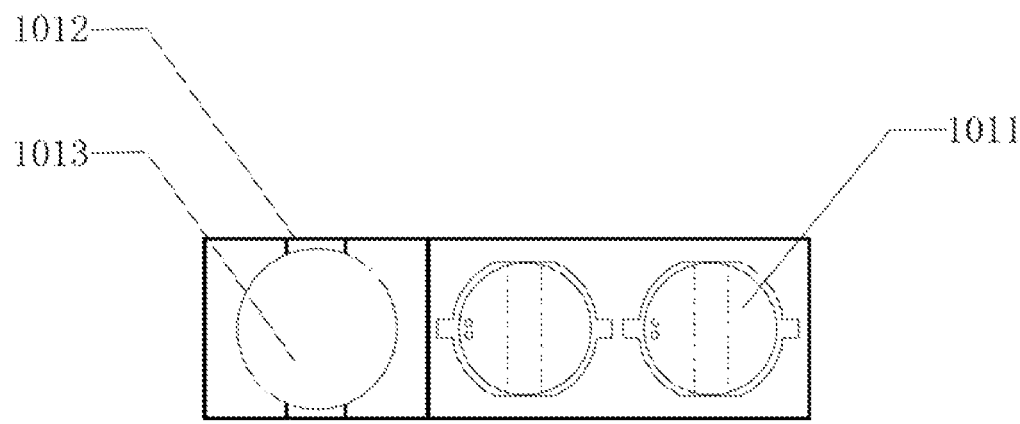
FIG. 6 is a top view of a preferred blank box provided by the present invention.
Figure 7:
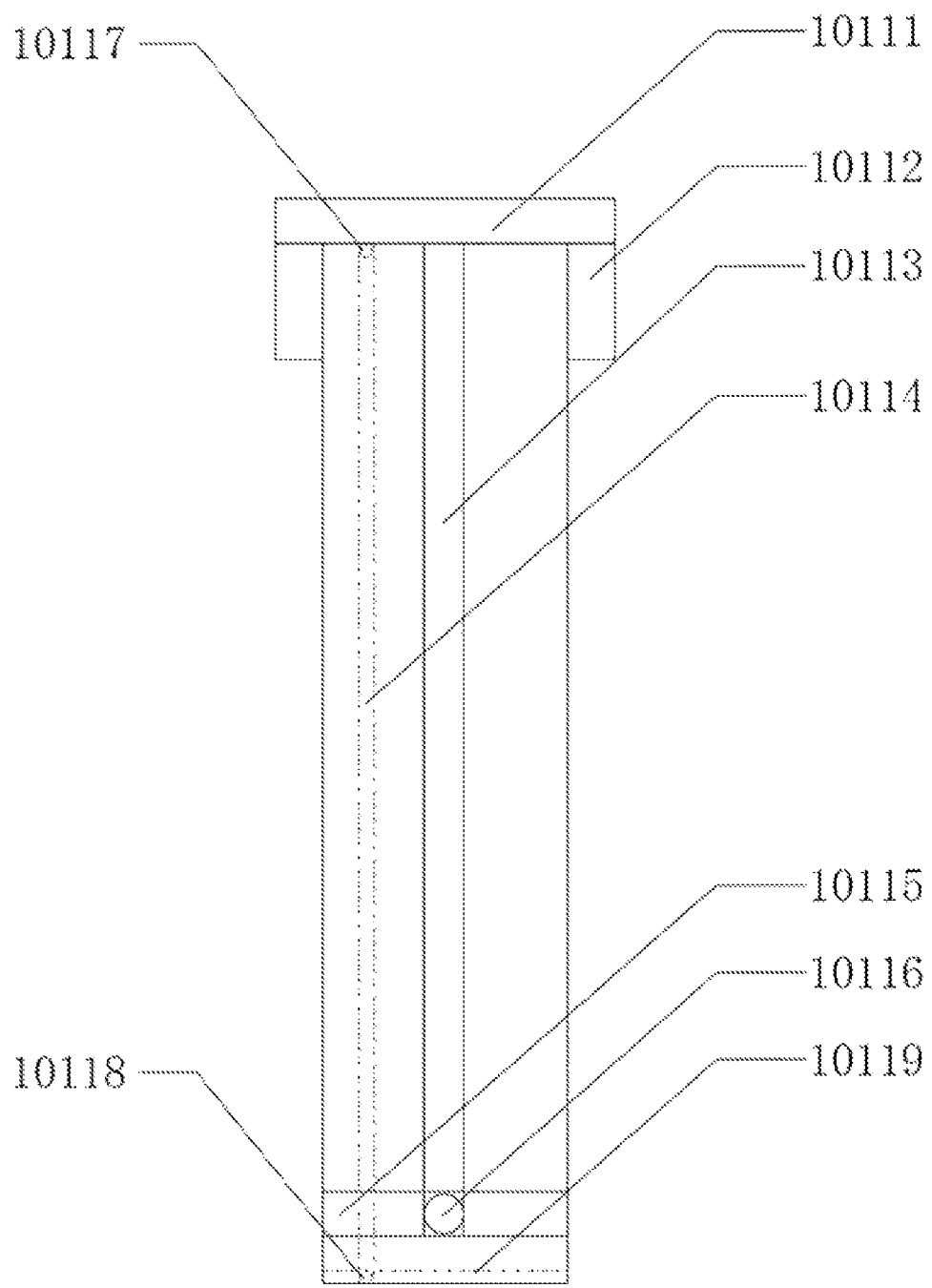
FIG. 7 is a schematic diagram of a preferred blank box barrel provided by the present invention.
Figure 8:
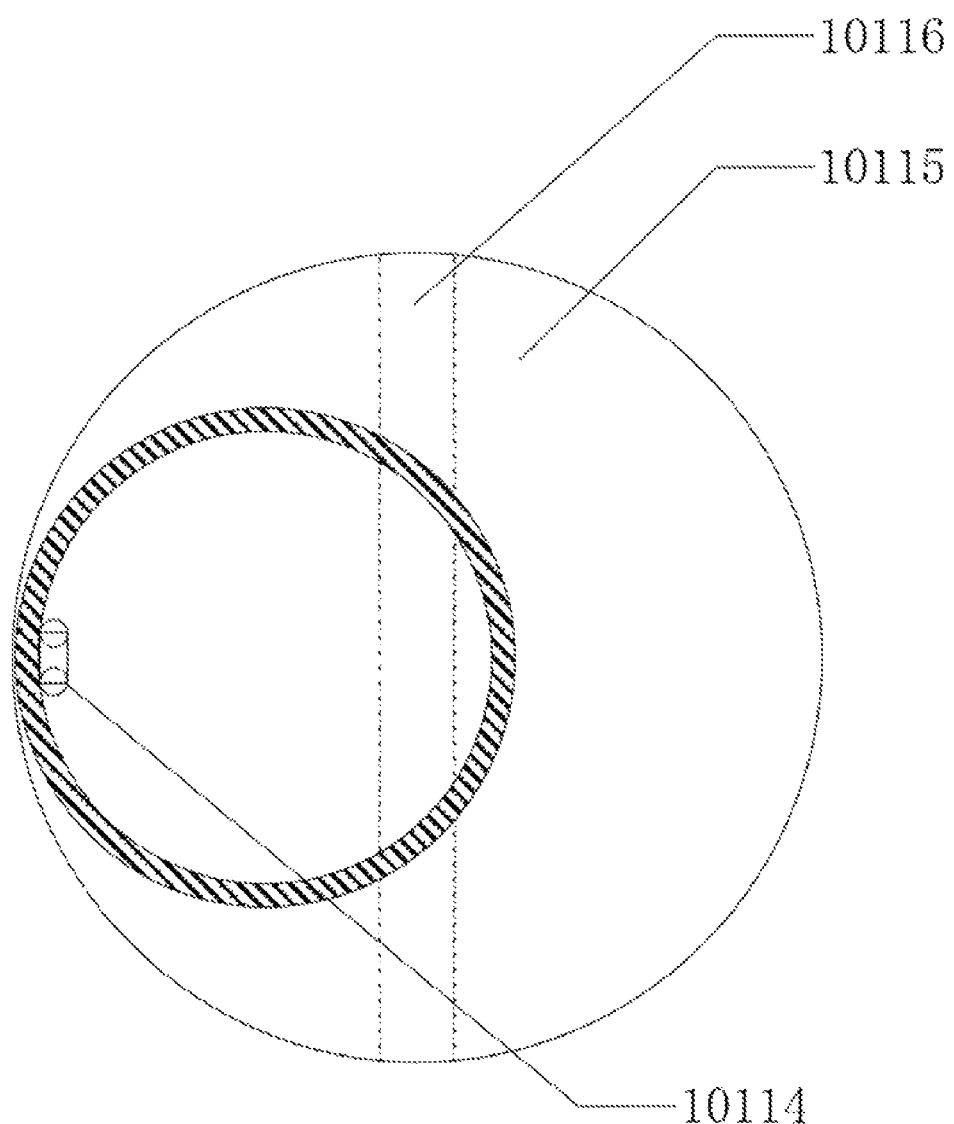
FIG. 8 is a schematic diagram of a preferred barrel base provided by the present invention.
Figure 9:
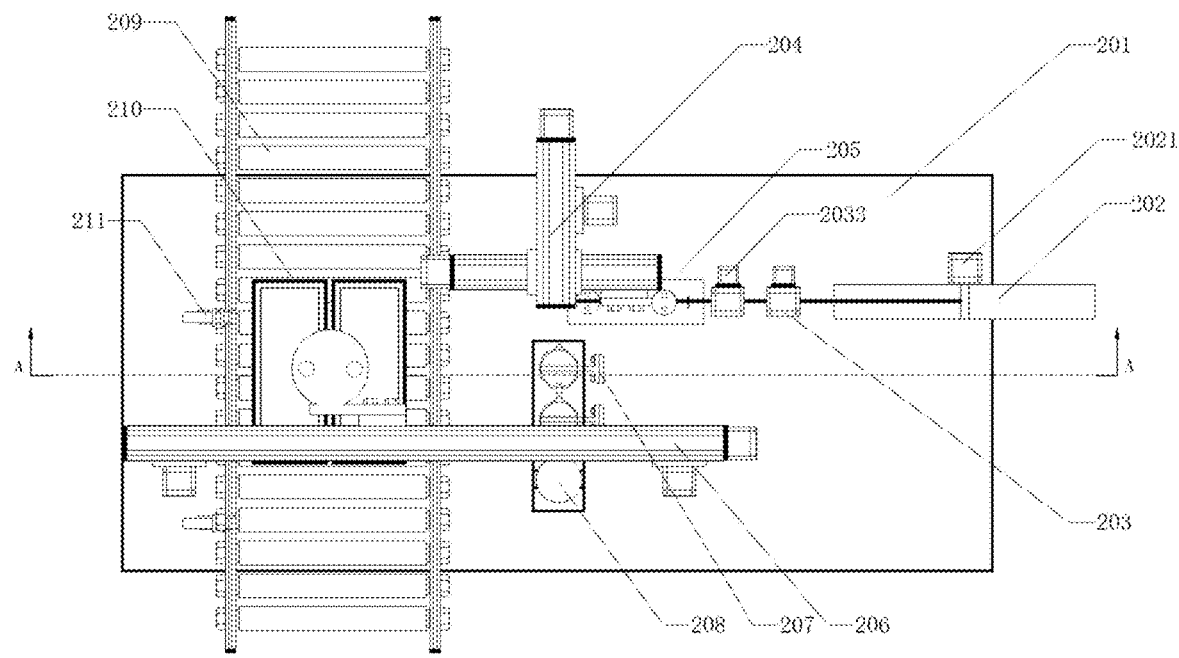
FIG. 9 is a top view of a preferred blank forming machine provided by the present invention.
Figure 10:
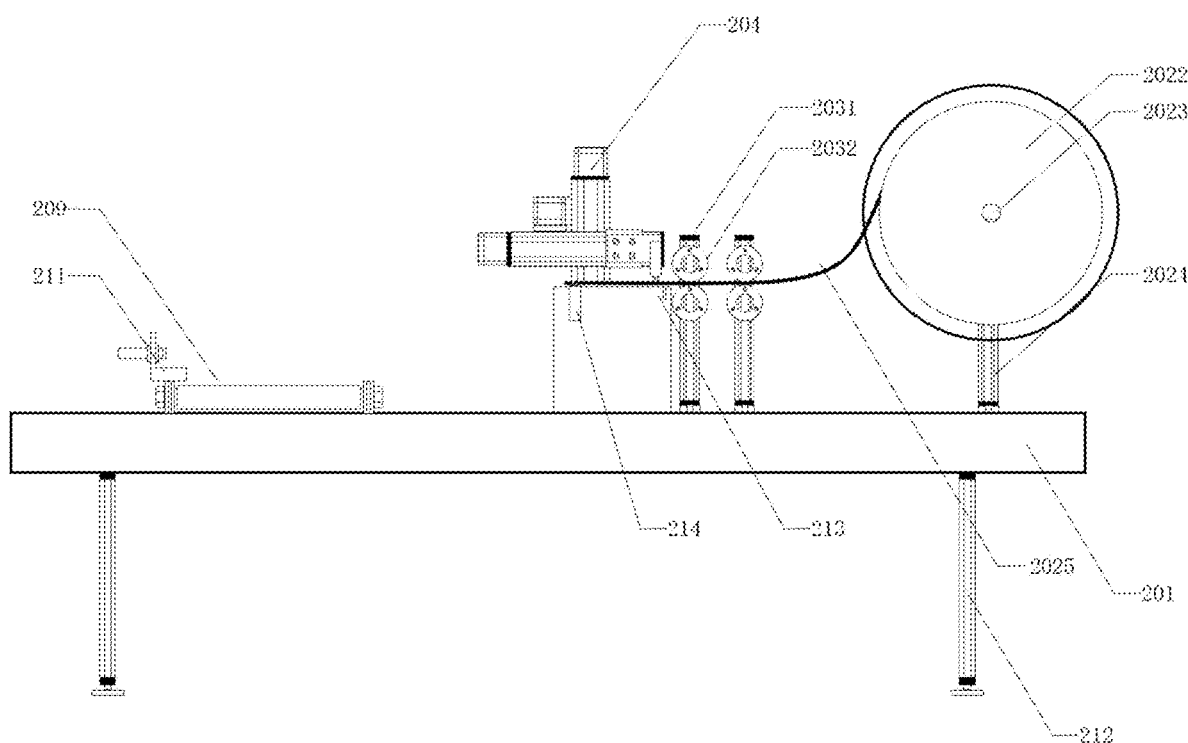
FIG. 10 is a left view of a preferred blank forming machine provided by the present invention.
Figure 11:
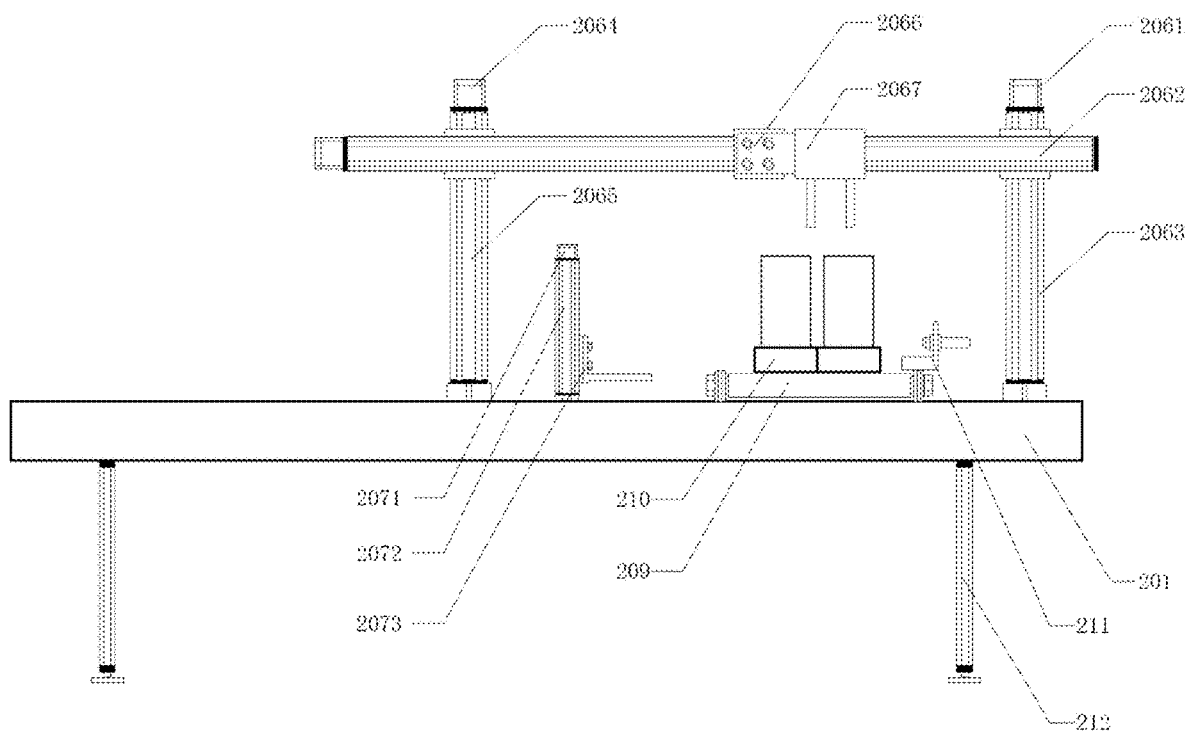
FIG. 11 is a right view of a preferred blank forming machine provided by the present invention.
Figure 12:
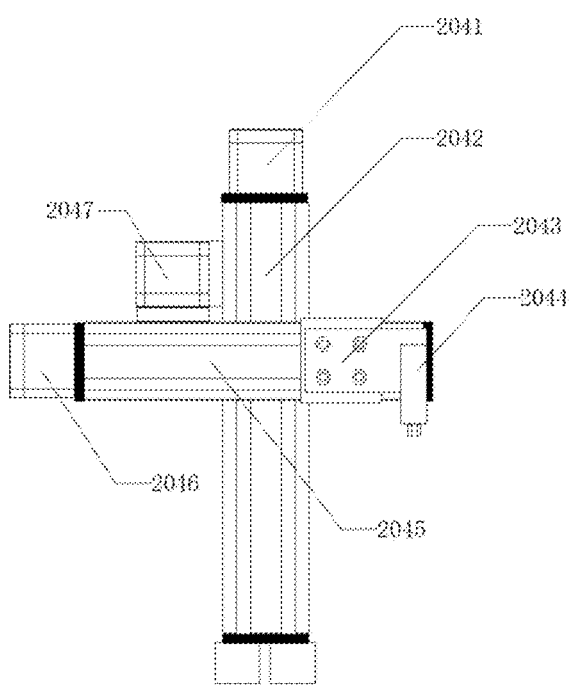
FIG. 12 shows a blank gripping mechanism of a preferred blank forming machine provided by the present invention.
Figure 13:
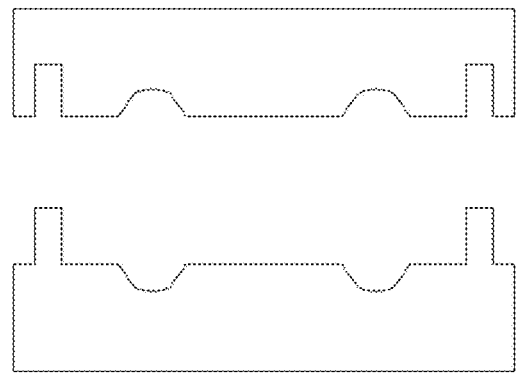
FIG. 13 is a schematic diagram of a preferred mold provided by the present invention.
Figure 14:
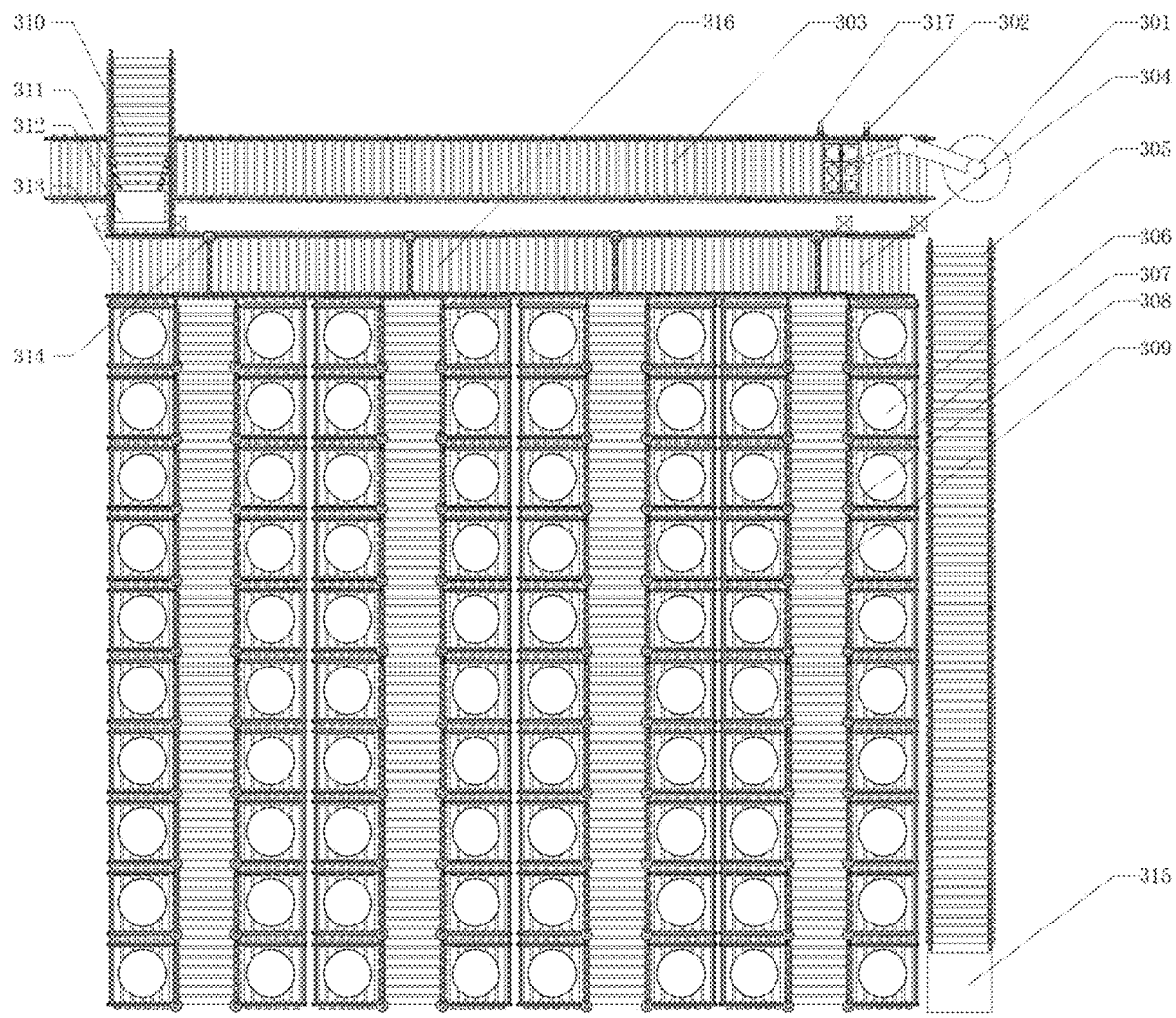
FIG. 14 is a schematic diagram of a preferred mold stereoscopic warehouse provided by the present invention.
Figure 15:
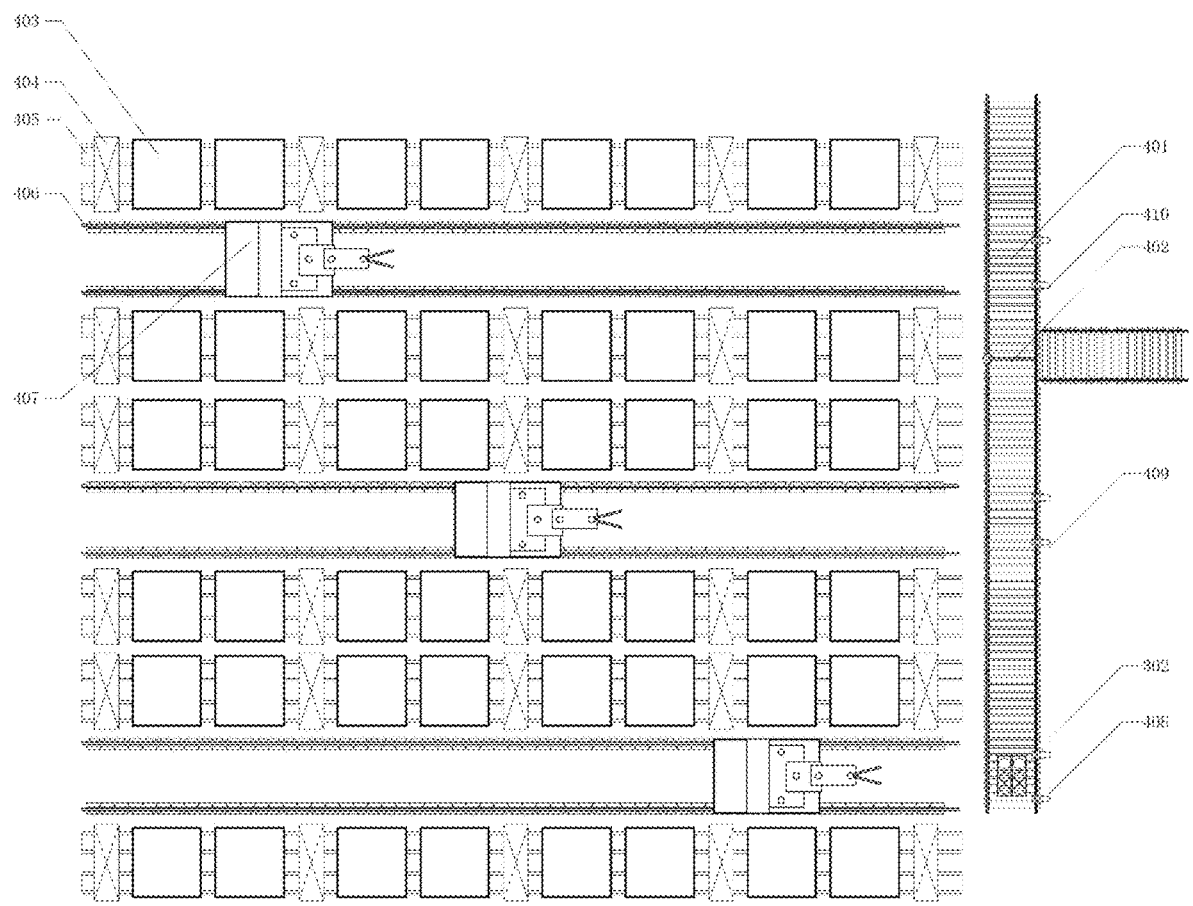
FIG. 15 is a top view of a preferred molded vulcanization unit provided by the present invention.
Figure 16:
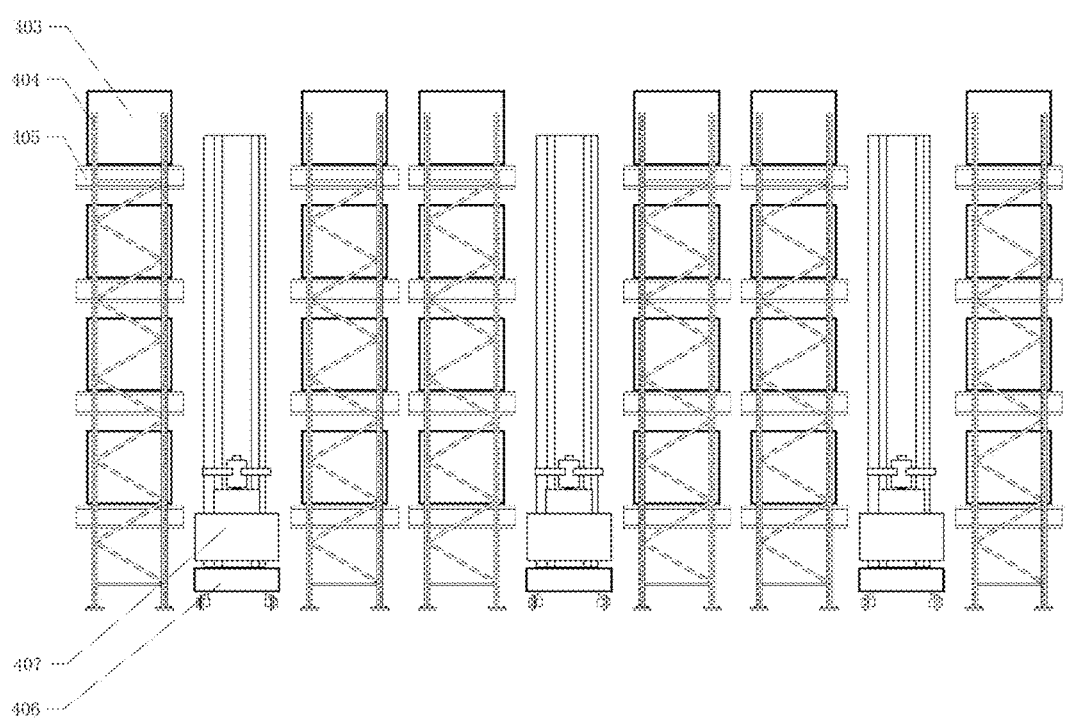
FIG. 16 is a front view of a preferred molded vulcanization unit provided by the present invention.
Figure 17:
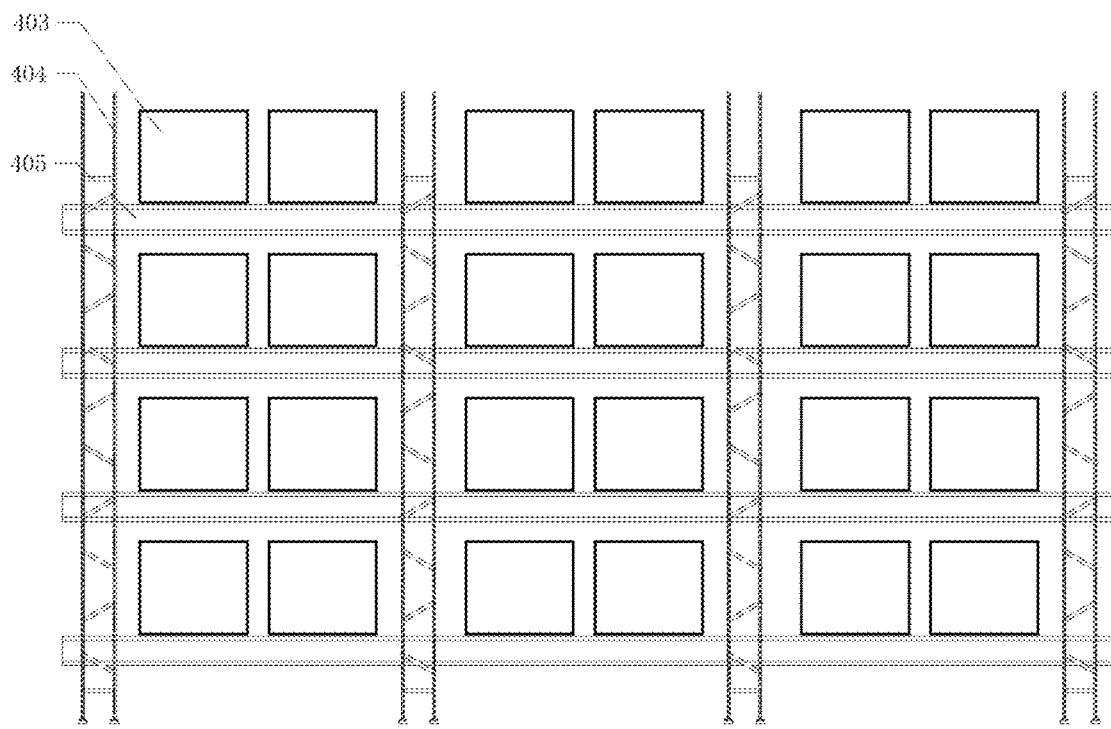
FIG. 17 is a side view of a preferred molded vulcanization unit provided by the present invention.
Figure 18:
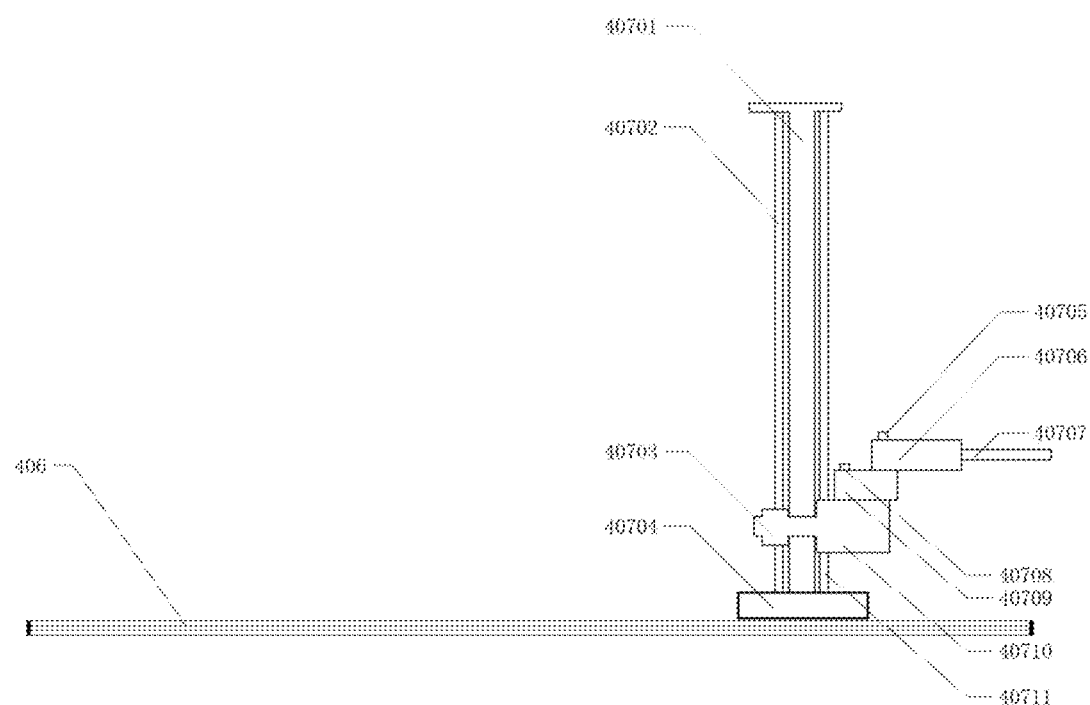
FIG. 18 is a ground rail transferring mechanism of a preferred molded vulcanization unit provided by the present invention.
Figure 19:
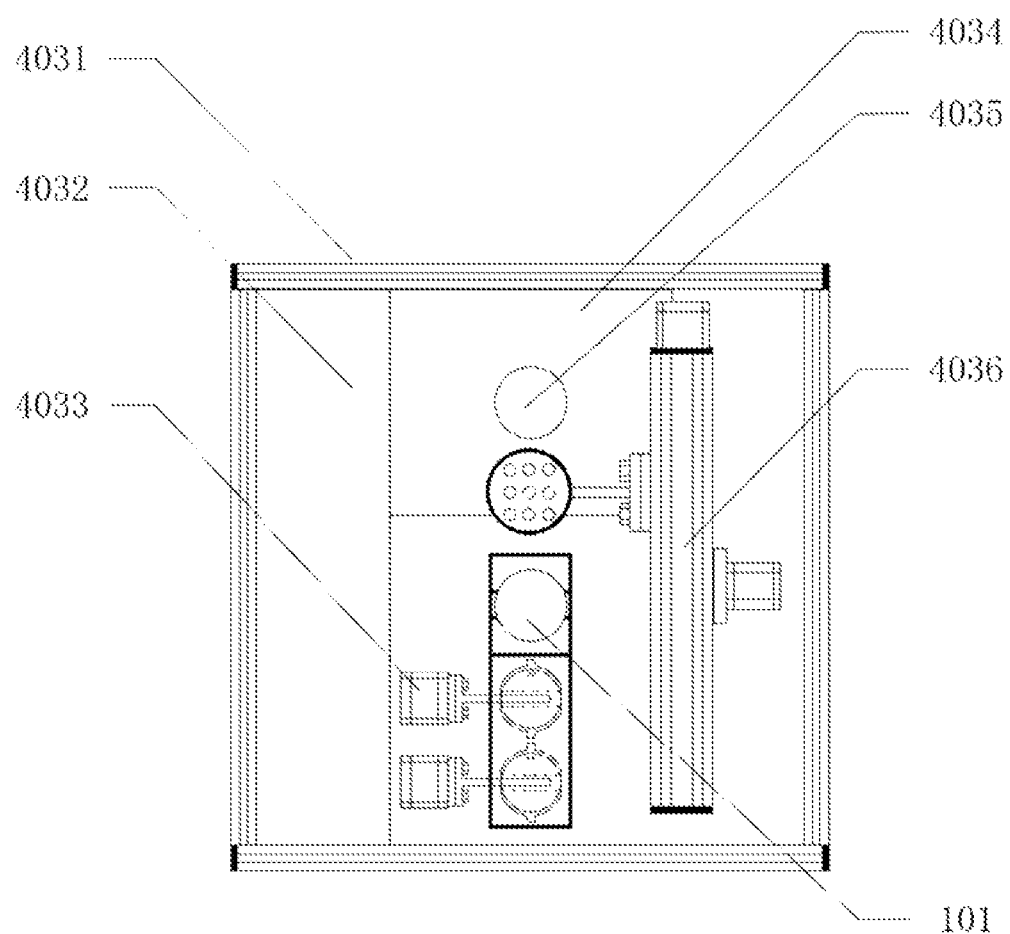
FIG. 19 is a top view of a preferred molded vulcanization manufacturing unit provided by the present invention.
Figure 20:
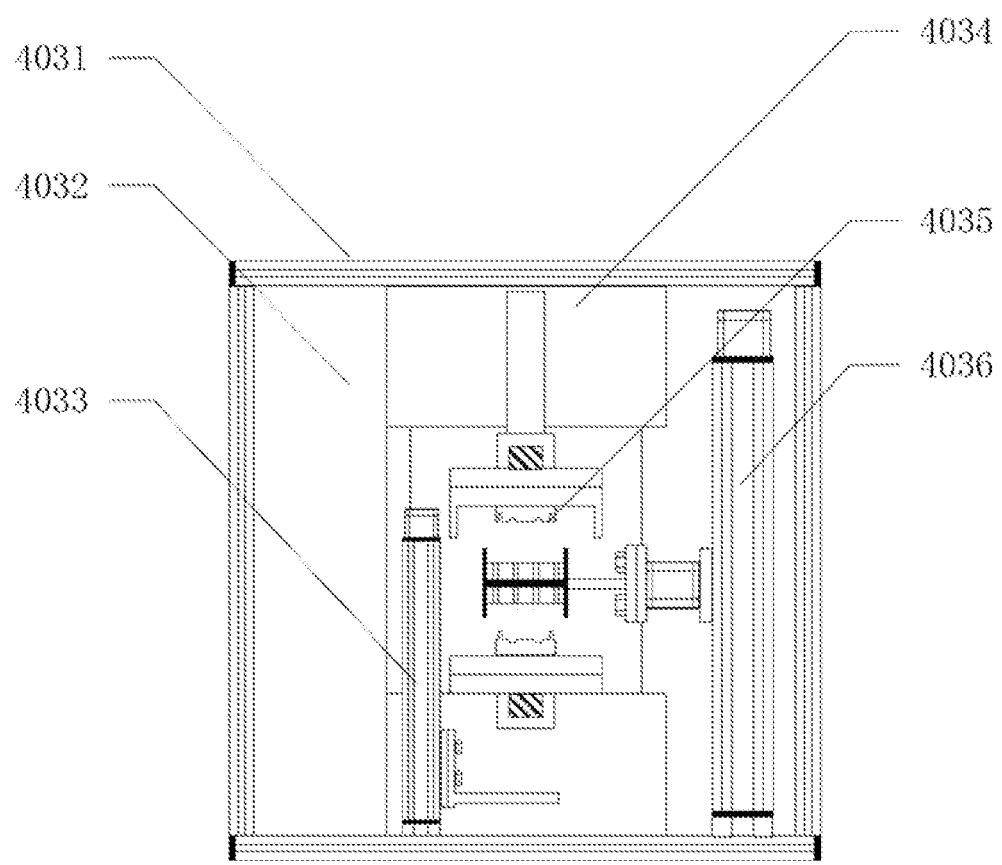
FIG. 20 is a front view of a preferred molded vulcanization manufacturing unit provided by the present invention.
Figure 21:
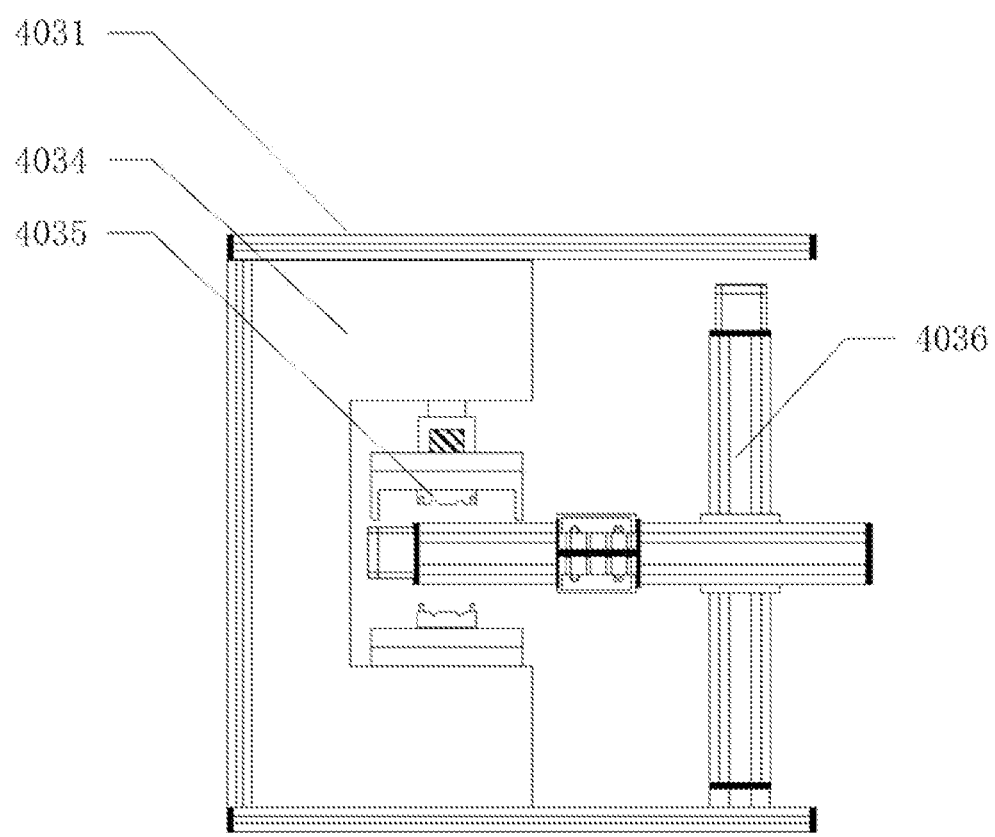
FIG. 21 is a left view of a preferred molded vulcanization manufacturing unit provided by the present invention.
Figure 22:
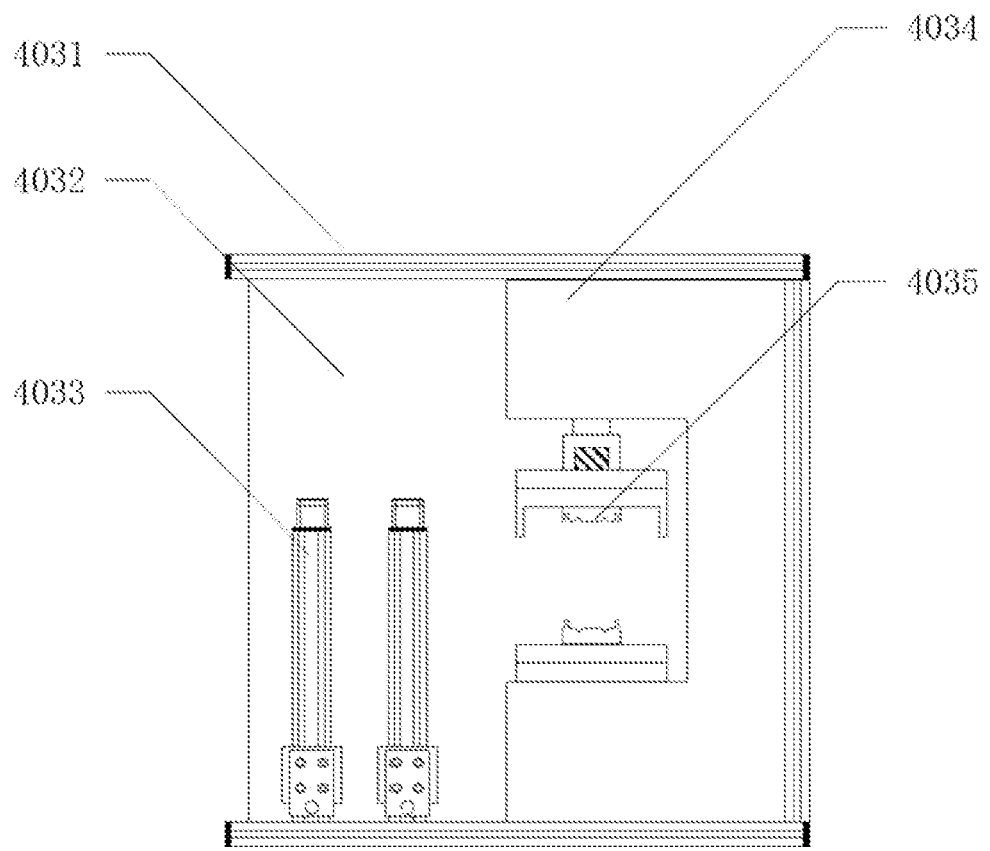
FIG. 22 is a right view of a preferred molded vulcanization manufacturing unit provided by the present invention.
Figure 23:
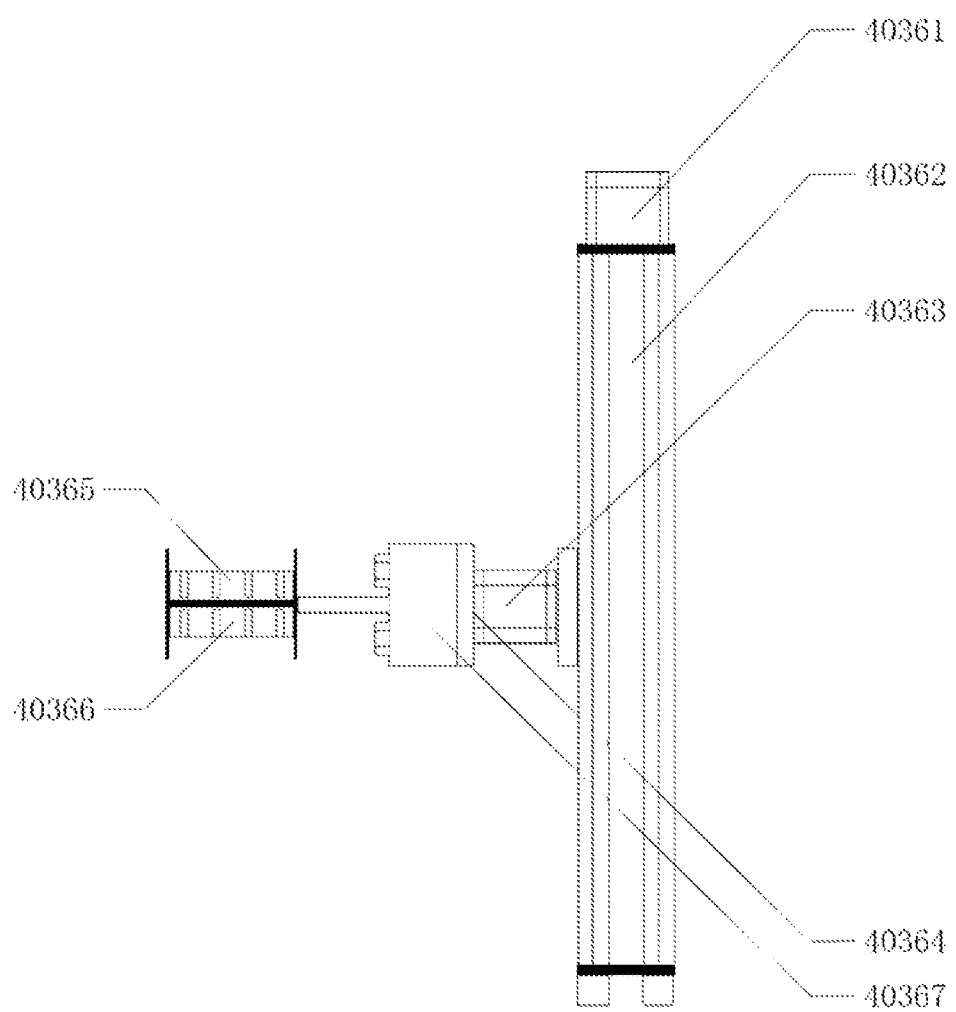
FIG. 23 is a loading and unloading mechanism of a preferred molded vulcanization manufacturing unit provided by the present invention.
Figure 24:
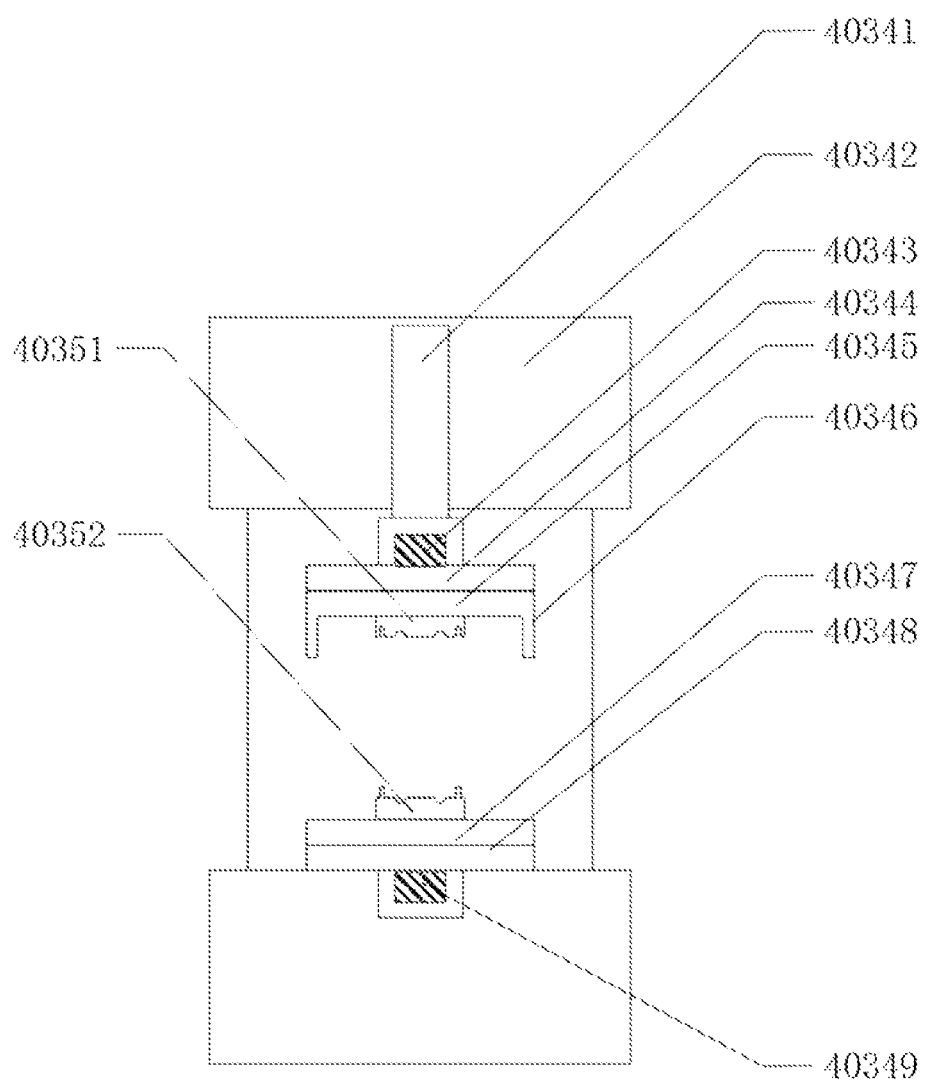
FIG. 24 is a schematic diagram of a mold vulcanization machine of a preferred molded vulcanization manufacturing unit provided by the present invention.
Figure 25:
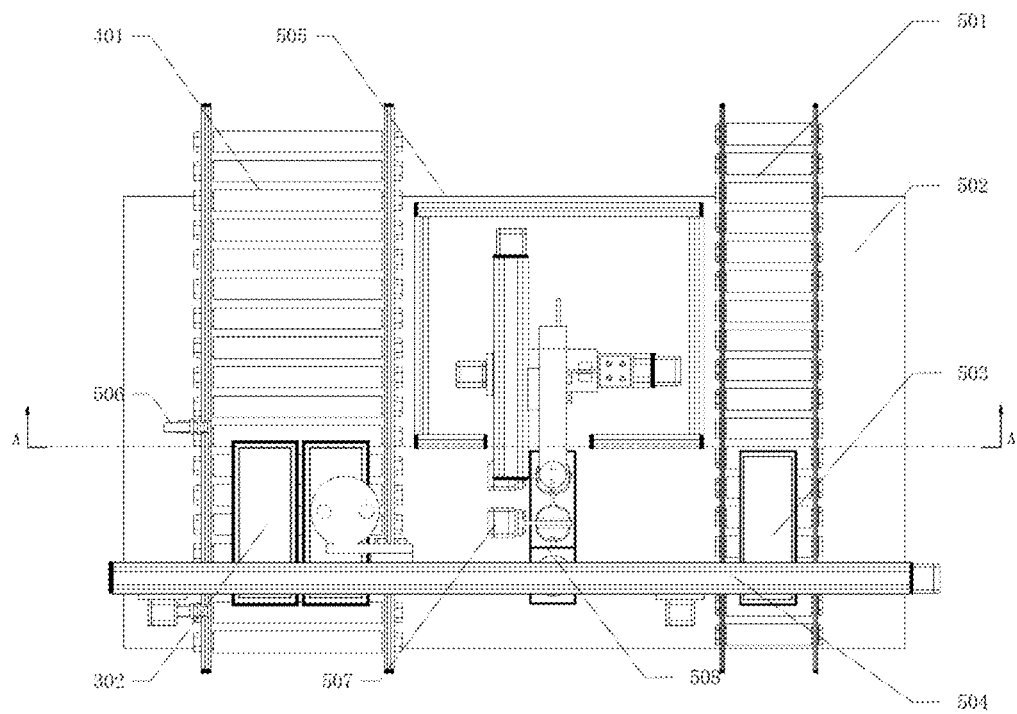
FIG. 25 is a top view of a preferred flash removal machine provided by the present invention.
Figure 26:
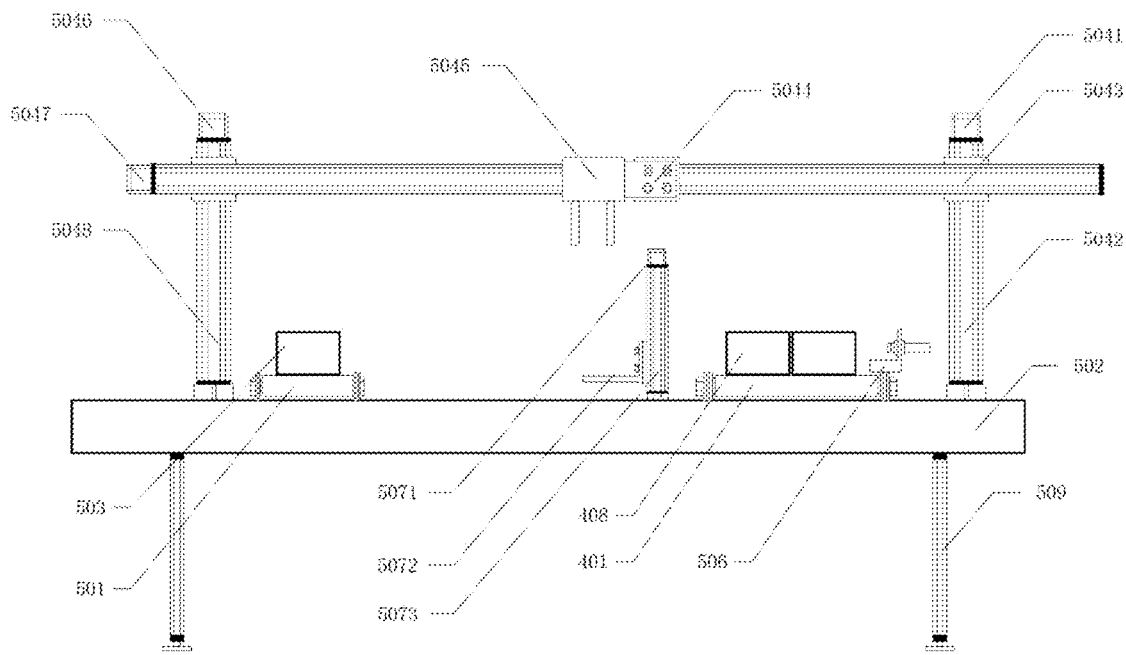
FIG. 26 is a left view of a preferred flash removal machine provided by the present invention.
Figure 27:
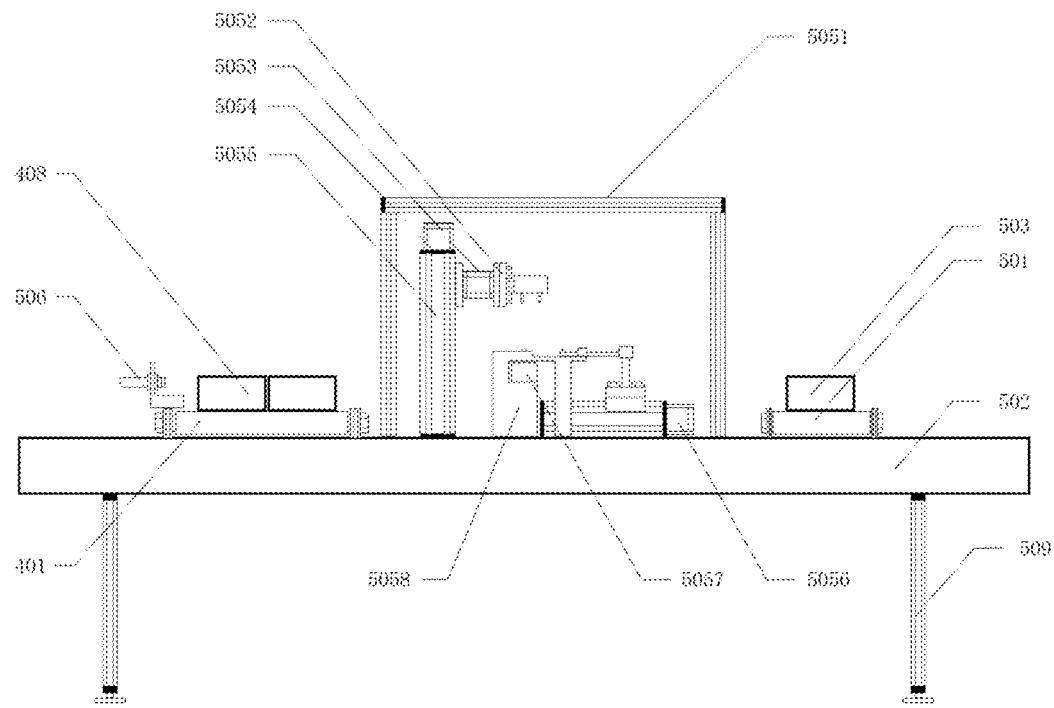
FIG. 27 is a right view of a preferred flash removal machine provided by the present invention.
Figure 28:
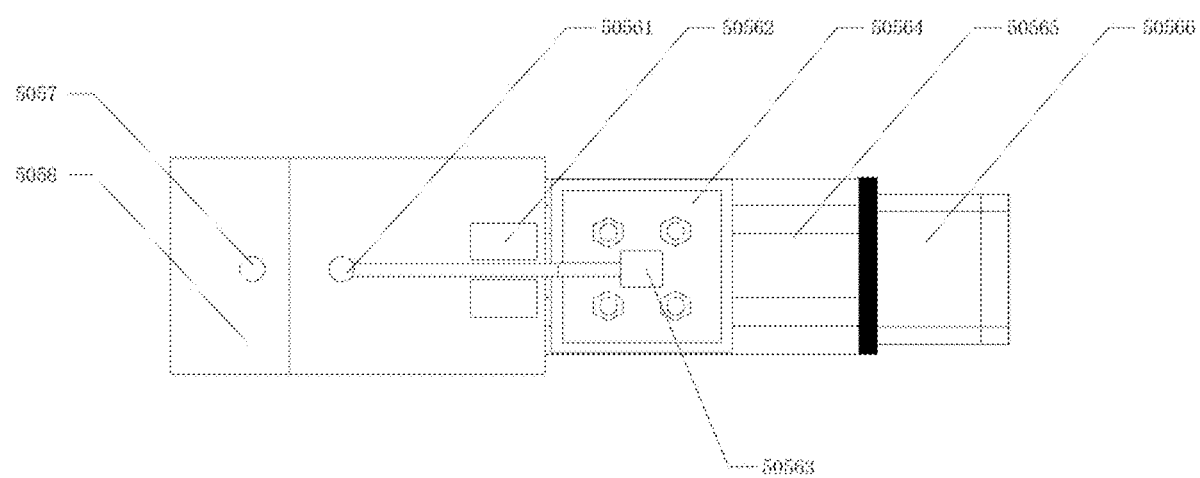
FIG. 28 is a top view of a rubber ring stretching mechanism of a preferred flash removal machine provided by the present invention.
Figure 29:
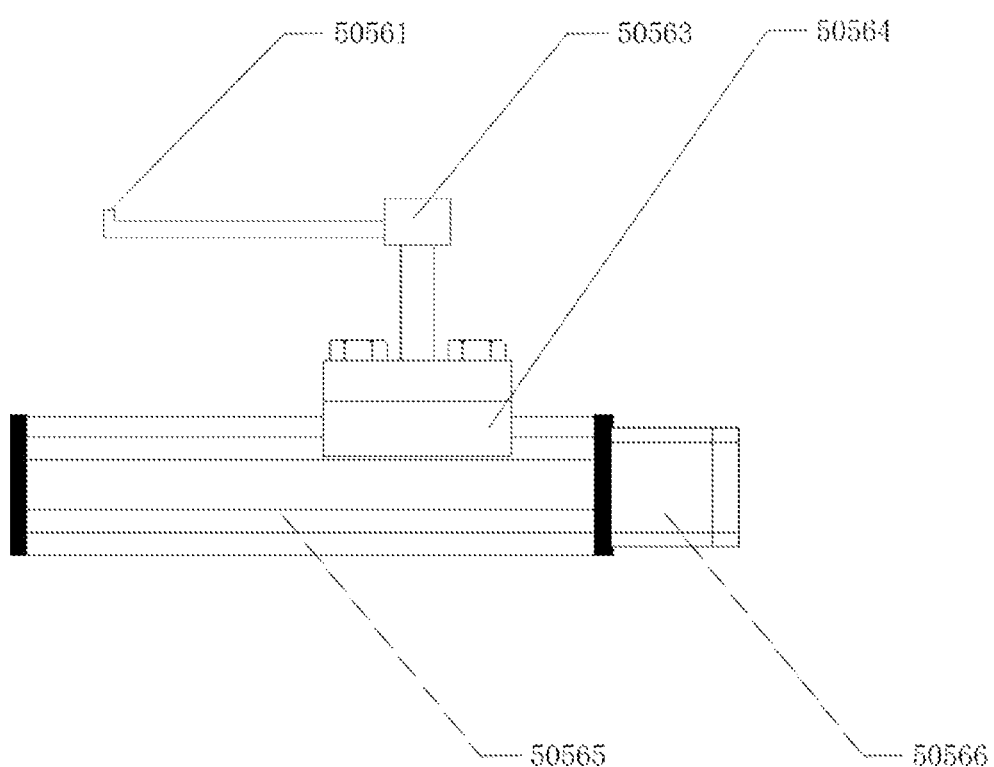
FIG. 29 is a side view of a rubber ring stretching mechanism of a preferred flash removal machine provided by the present invention.
Figure 30:
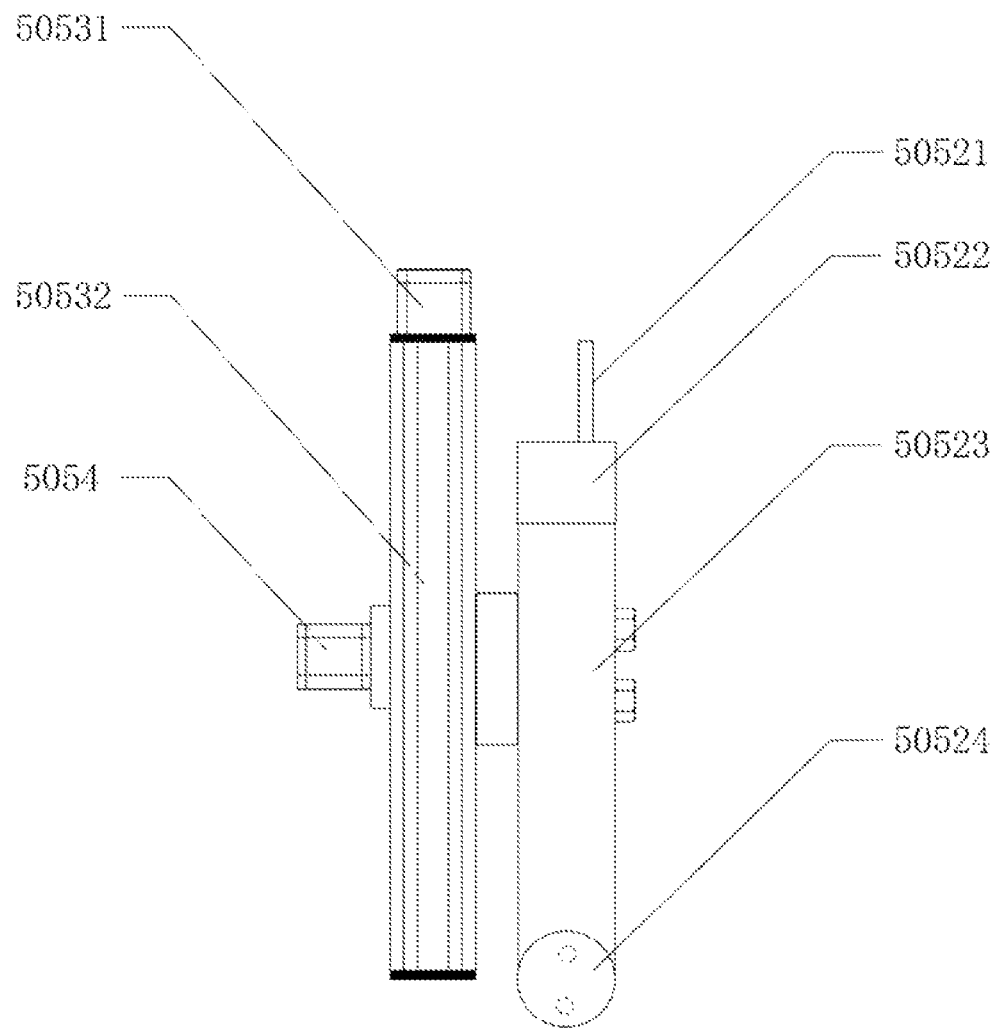
FIG. 30 is a top view of a preferred loading and unloading mechanism II provided by the present invention.
Figure 31:
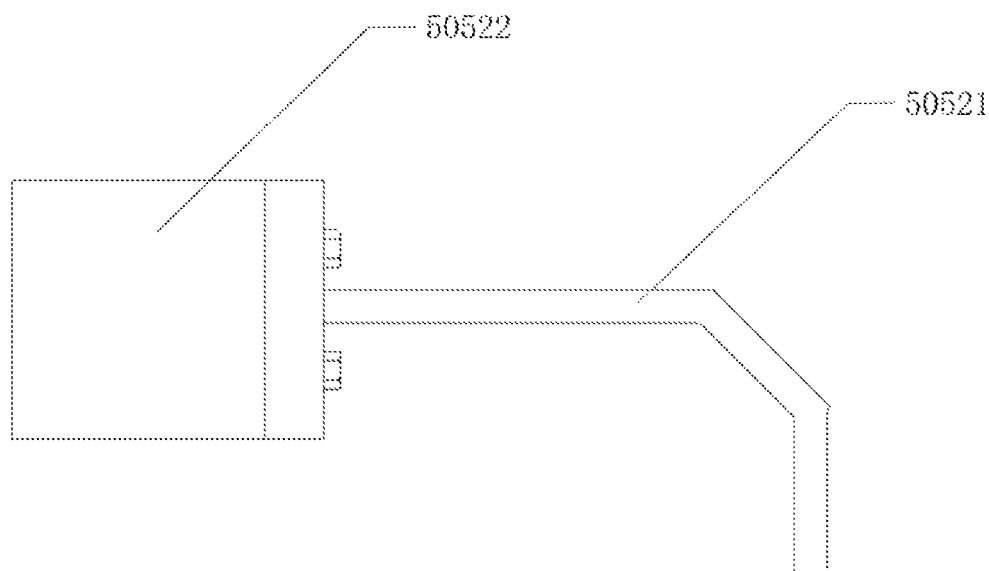
FIG. 31 is a side view of a preferred flash removal head provided by the present invention.
Figure 31:
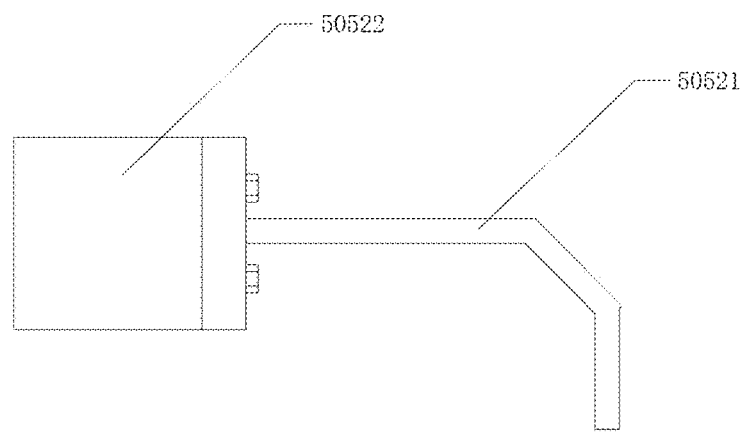
Figure 32:
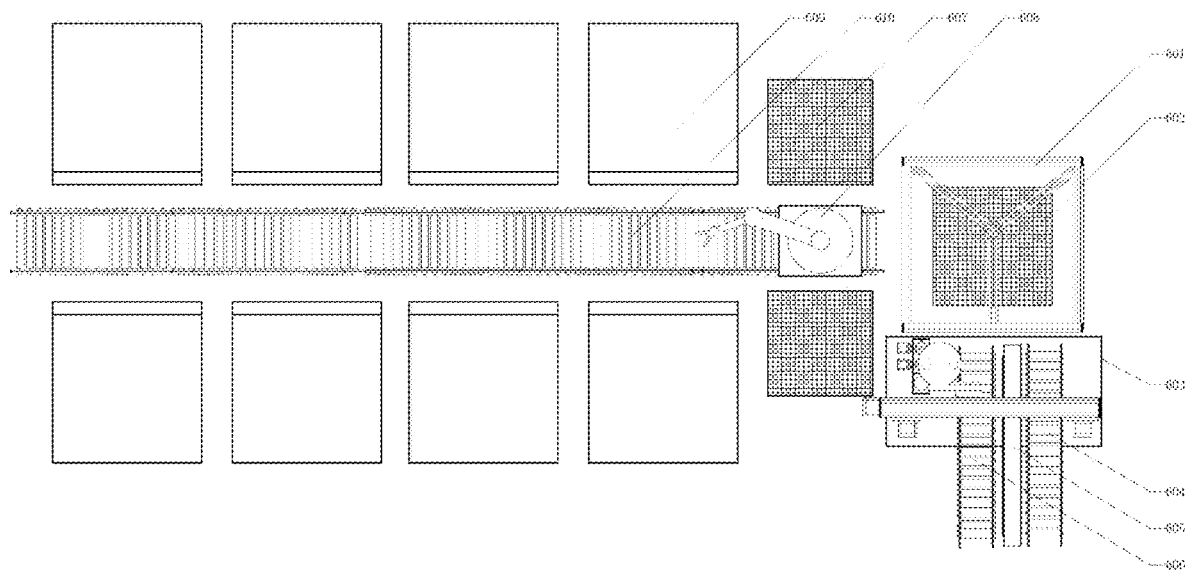
FIG. 32 is a top view of a preferred second-stage vulcanization area provided by the present invention.
Figure 33:
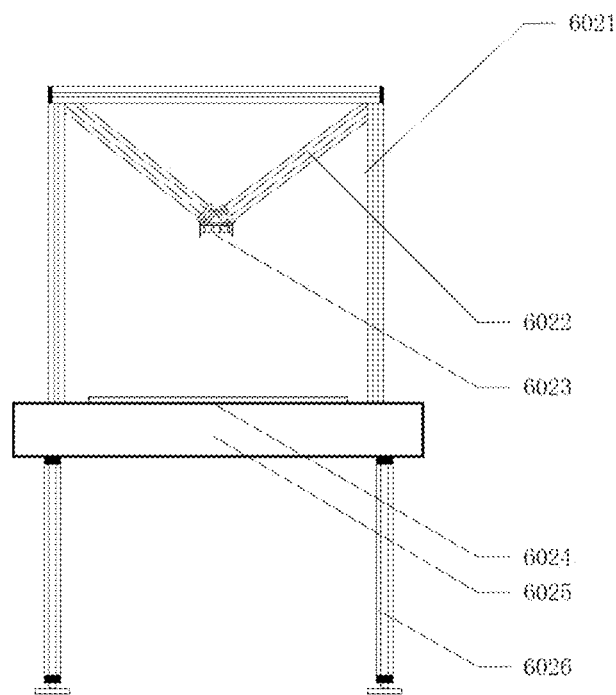
FIG. 33 is a schematic diagram of a rubber ring placement mechanism of a preferred second-stage vulcanization area provided by the present invention.
Figure 34:
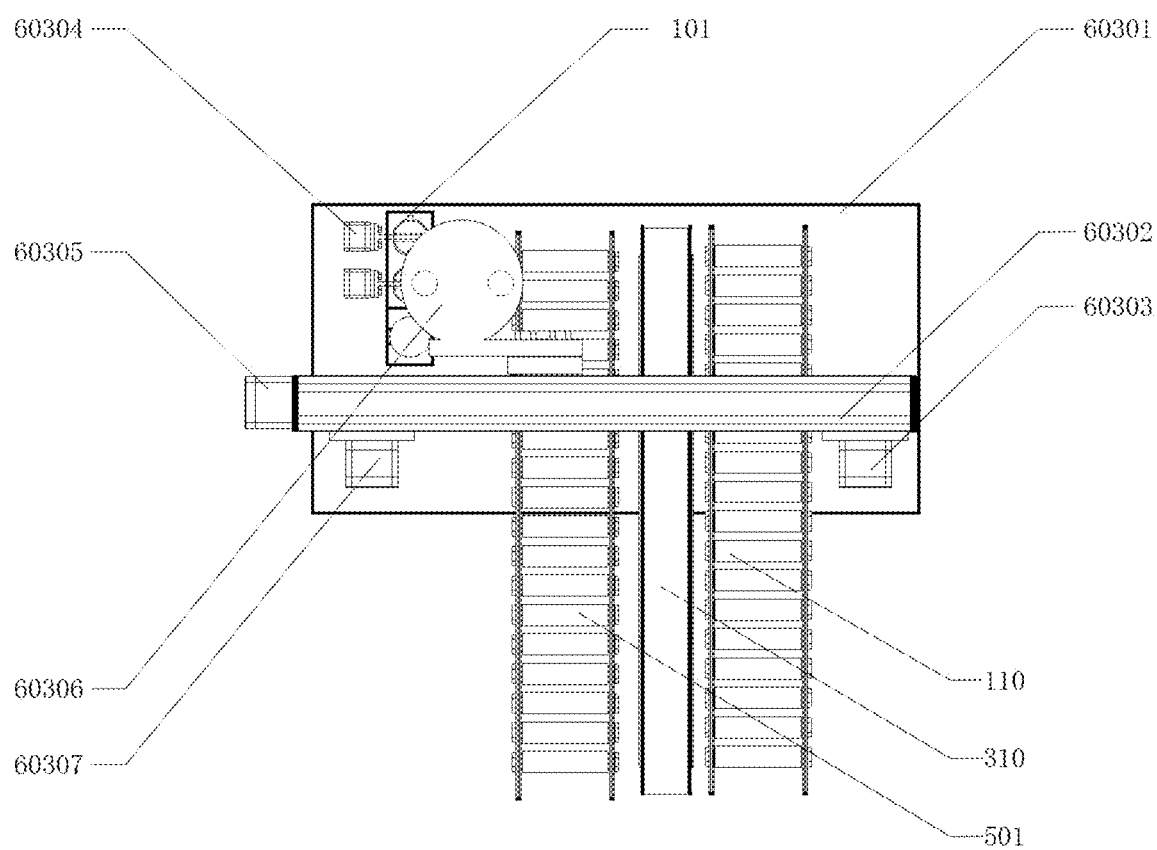
FIG. 34 is a top view of a blank box loading and unloading mechanism of a preferred second-stage vulcanization area provided by the present invention.
Figure 35:
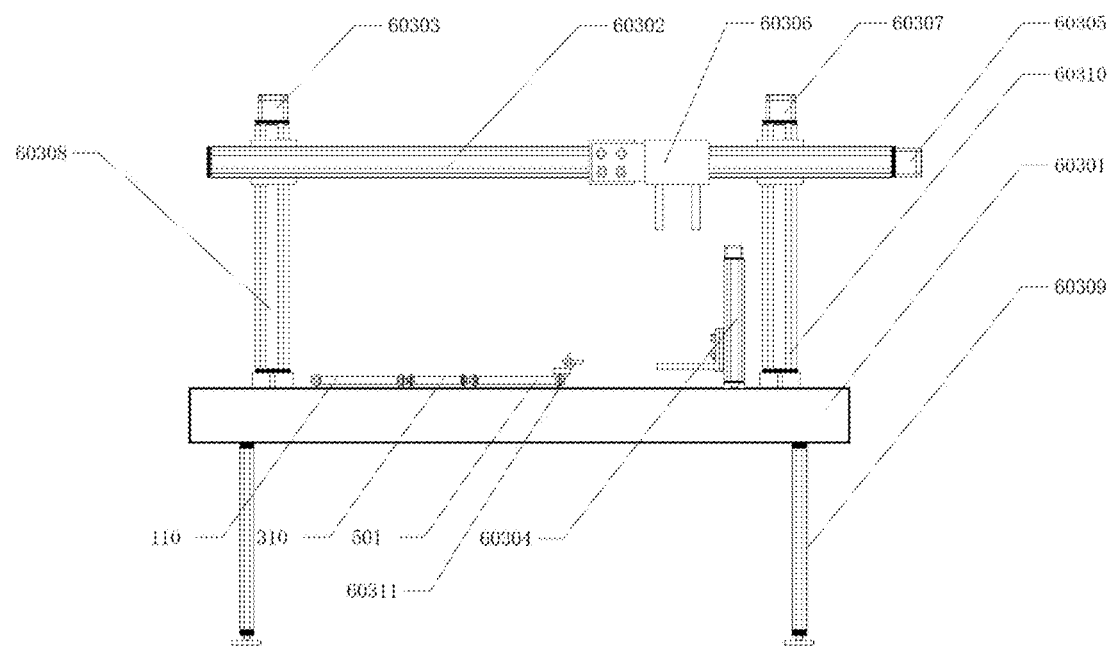
FIG. 35 is a side view of a blank box loading and unloading mechanism of a preferred second-stage vulcanization area provided by the present invention.
Figure 36:
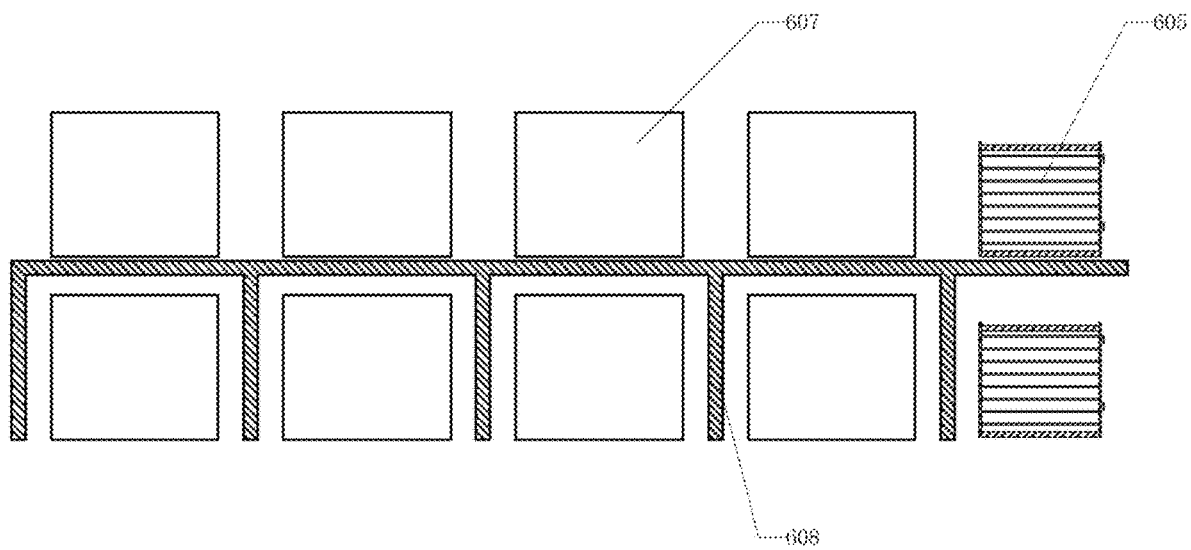
FIG. 36 is a side view of a preferred second-stage vulcanization area provided by the present invention.
Figure 37:
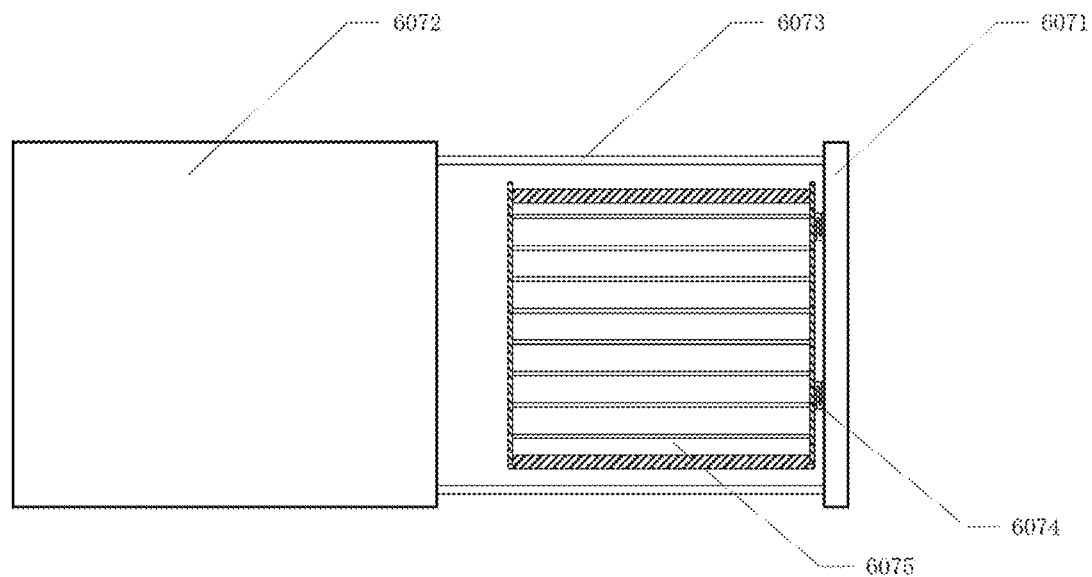
FIG. 37 is a side view of a preferred oven provided by the present invention.
Figure 38:
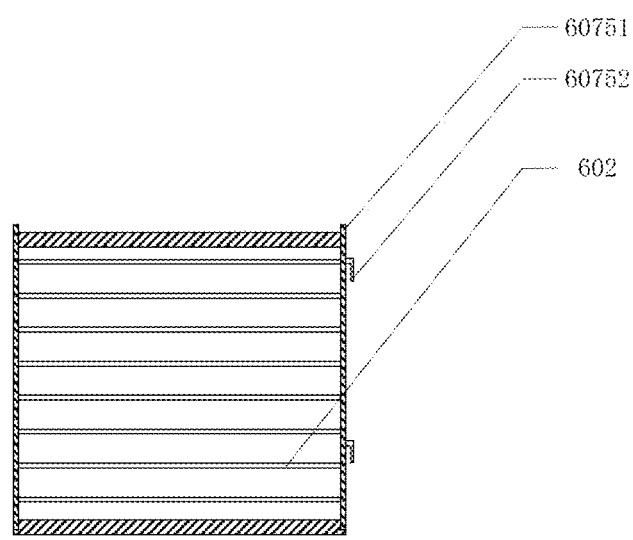
FIG. 38 is a side view of a preferred oven rack provided by the present invention.
Figure 39:
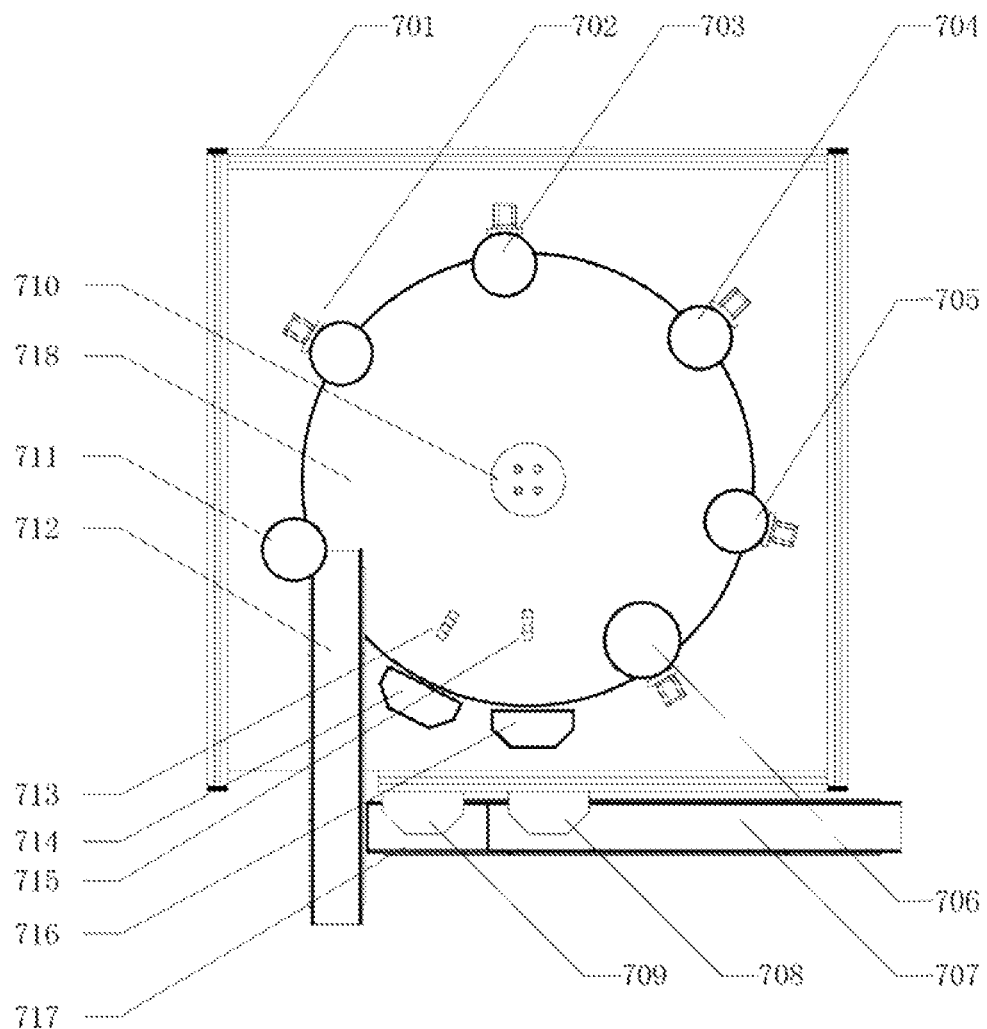
FIG. 39 is a top view of a preferred automatic rubber ring detection machine provided by the present invention.
Figure 40:
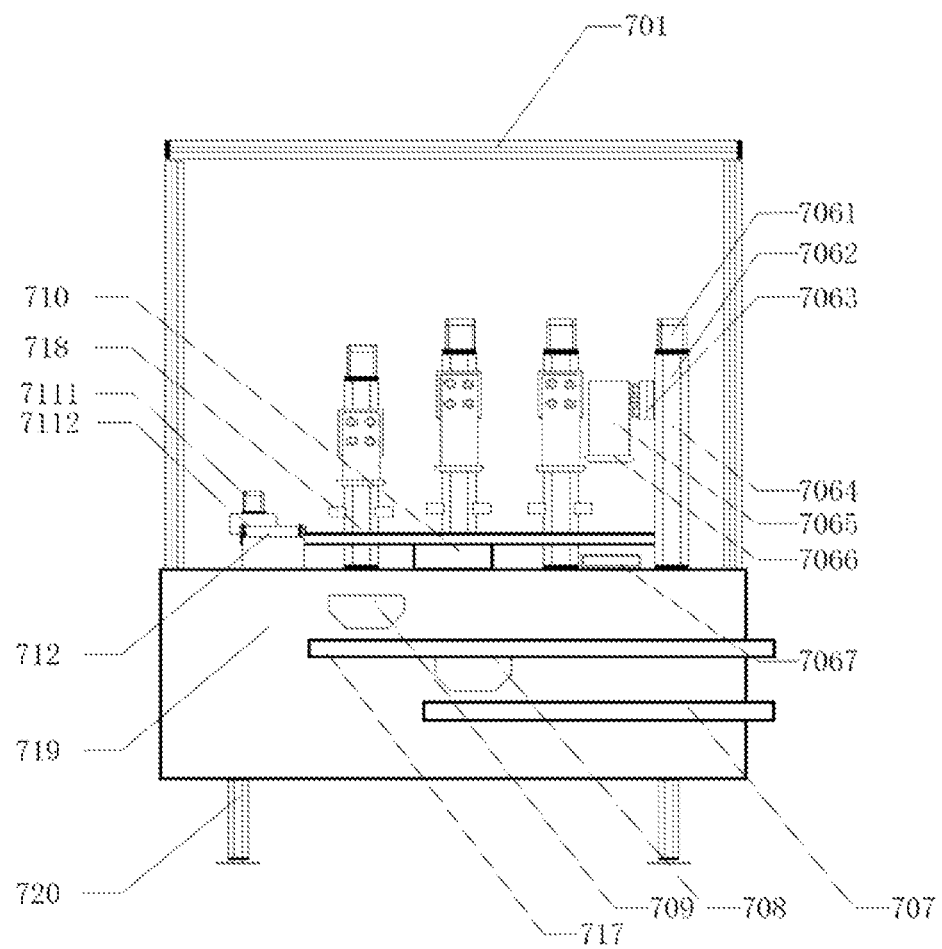
FIG. 40 is a side view of a preferred automatic rubber ring detection machine provided by the present invention.
Figure 41:
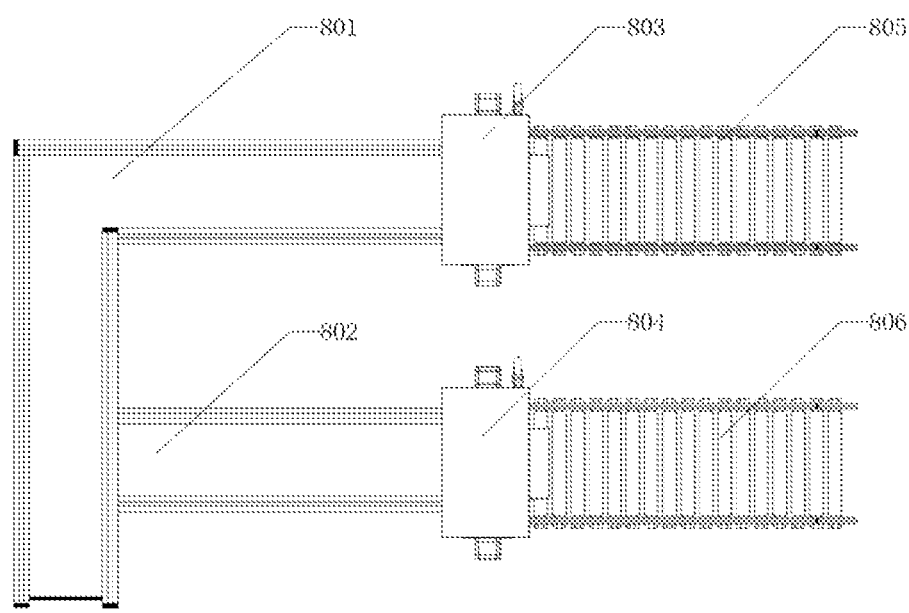
FIG. 41 is a top view of a preferred rubber ring packaging and labeling unit provided by the present invention.
Figure 42:
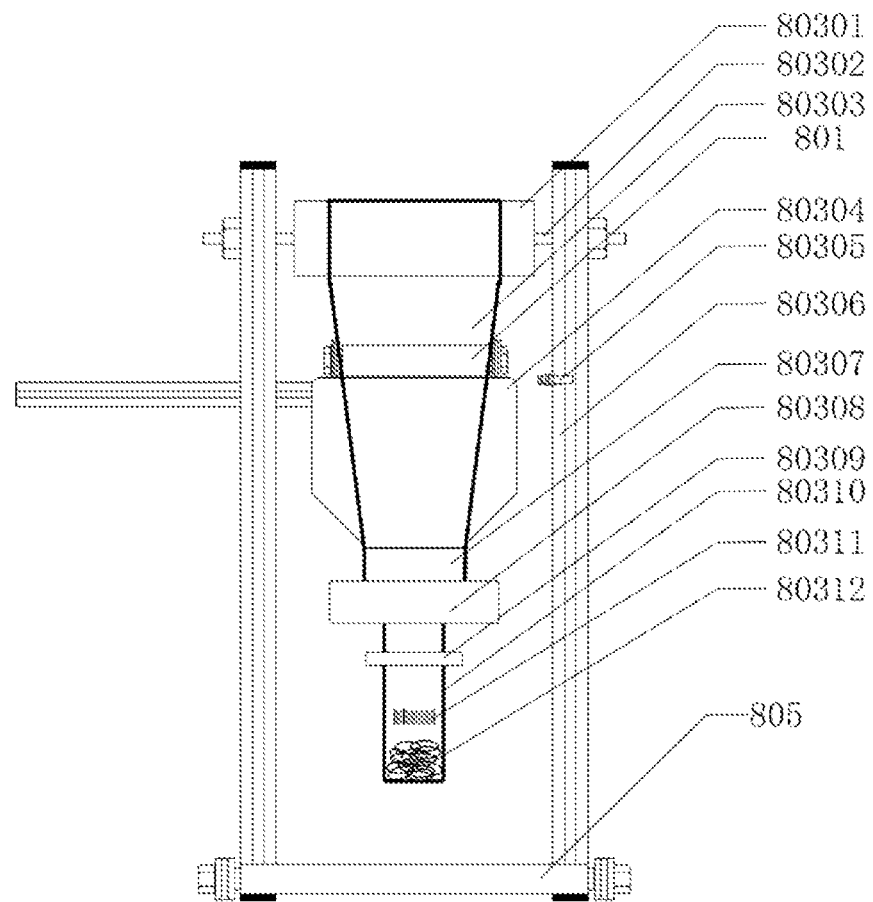
FIG. 42 is a front view of a preferred rubber ring packaging and labeling machine provided by the present invention.
Figure 43:
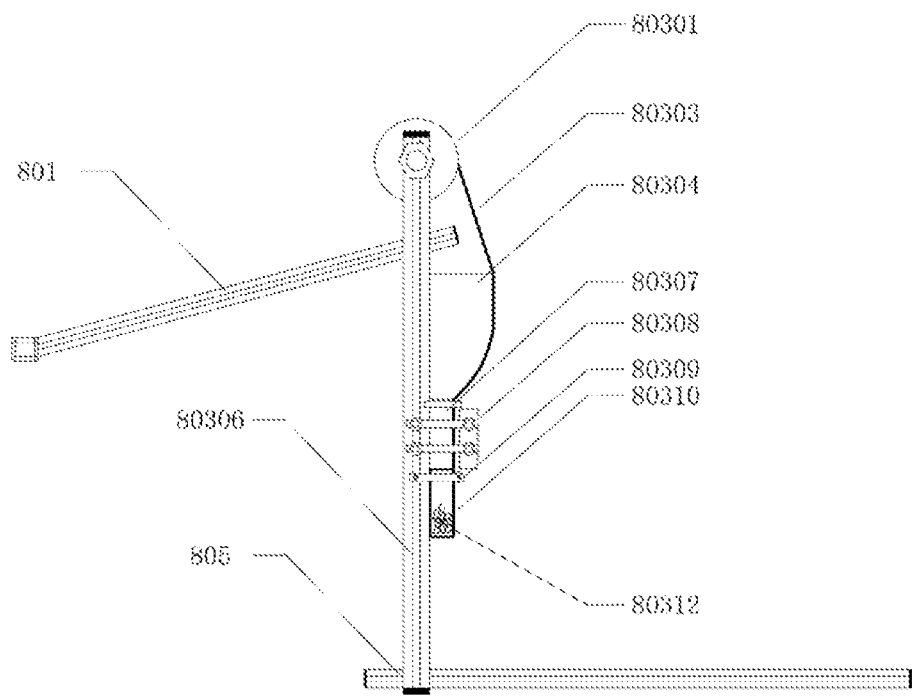
FIG. 43 is a side view of a preferred rubber ring packaging and labeling machine provided by the present invention.
Figure 44:
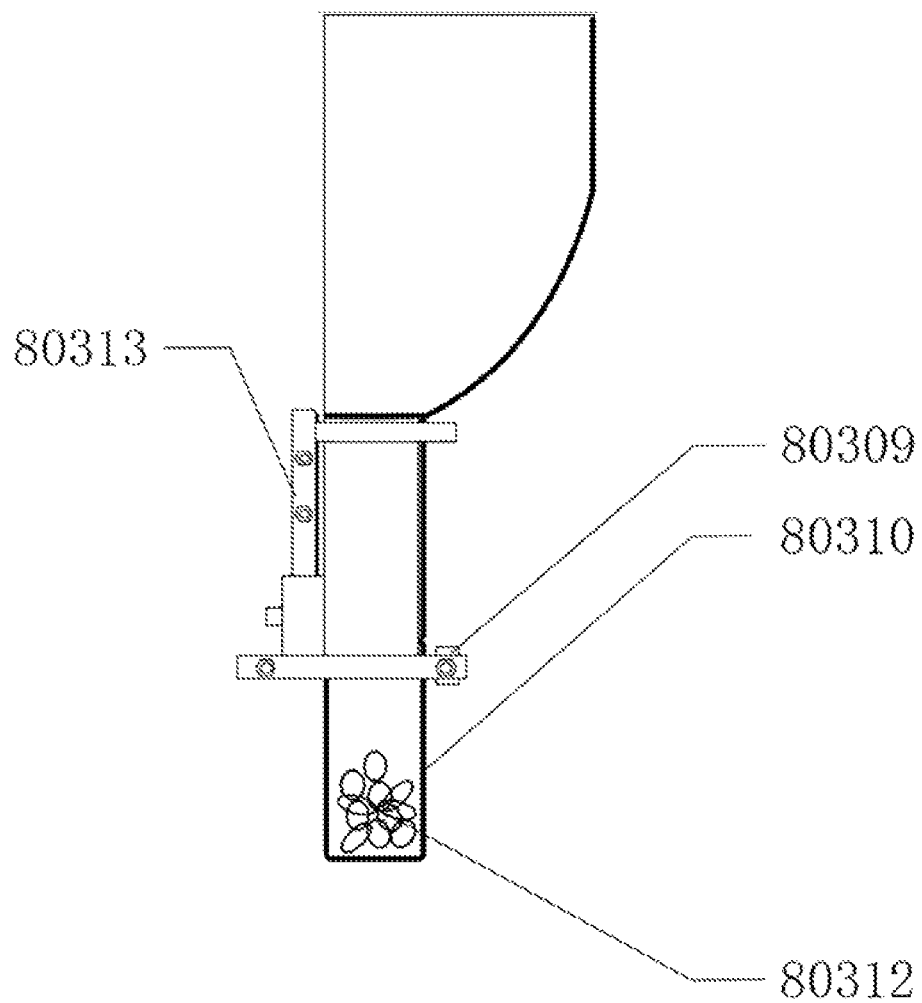
FIG. 44 is a schematic diagram of a bag sealing mechanism at the rear side of a preferred rubber ring packaging and labeling unit provided by the present invention.

Where, 1—blank box stereoscopic warehouse; 101—blank box; 1011—blank box barrels; 10111—upper barrel edge; 10112—barrel stop edge; 10113—barrel side edge vertical tank; 10114—barrel positioning rod; 10115—barrel base; 10116—barrel base lifting auxiliary hole; 10117—barrel positioning rod top connecting rod; 10118—barrel positioning rod bottom connecting rod; 10119—barrel positioning rod transverse fixing rod; 1012—blank box mold clamping tank; 1013—mold storage position; 1014—thermal insulation area; 102—longitudinal load-bearing steel frame of the blank box stereoscopic warehouse; 103—transverse load-bearing steel frame of the blank box stereoscopic warehouse; 104—four-way reach truck passage of the blank box stereoscopic warehouse; 105—four-way reach truck of the blank box stereoscopic warehouse; 106—in-warehouse stacking machine of the blank box stereoscopic warehouse; 107—blank box transfer mechanism I; 1071—blank box transfer mechanism I base; 1072—blank box transfer mechanism I Z-axis sliding table; 1073—blank box transfer mechanism I Y-axis sliding table motor; 1074—blank box transfer mechanism I Y-axis sliding table screw; 1075—blank box transfer mechanism I clamping cylinder; 1076—blank box transfer tank I; 1077—photoelectric sensor I; 108—ex-warehouse stacking machine of the blank box stereoscopic warehouse; 109—ex-warehouse passage of the blank box stereoscopic warehouse; 110—blank box conveying belt I; 2—blank forming machines; 201—blank forming machine base; 202—blank reel; 2021—blank reel motor; 2022—blank reel body; 2023—blank reel shaft; 2024—blank reel mounting base; 2025—blank strip; 203—blank strip guide device; 2031—blank strip guide device mounting base; 2032—blank strip guide device guide pulley; 204—blank gripping mechanism; 2041—blank gripping mechanism Z-axis motor; 2042—blank gripping mechanism Z-axis screw; 2043—blank gripping mechanism X-axis connecting mechanism; 2044—blank gripping mechanism cylinder; 2045—blank gripping mechanism X-axis screw; 2046—blank gripping mechanism X-axis motor; 2047—blank gripping mechanism Y-axis sliding table; 205—blank forming workbench; 206—blank box transfer mechanism II; 2061—blank box transfer mechanism II Z-axis sliding table motor I; 2062—blank box transfer mechanism II X-axis screw; 2063—blank box transfer mechanism II Z-axis screw I; 2064—blank box transfer mechanism II Z-axis sliding table motor II; 2065—blank box transfer mechanism II Z-axis sliding table screw II; 2066—blank box transfer mechanism II X-axis sliding block; 2067—blank box transfer mechanism II cylinder; 2068—blank box transfer mechanism II X-axis sliding table motor; 207—base lifting mechanism I; 2071—base lifting mechanism I motor; 2072—base lifting mechanism I screw; 2073—base lifting mechanism I connecting rod; 208—blank box; 209—blank box conveying belt II; 210—blank box transfer tank II; 211—photoelectric sensor II; 212—blank forming machine supporting rod; 213—blank strip cutting knife; 214—blank gripper; 3—mold stereoscopic warehouse; 301—transfer robot I; 302—blank box transfer tank III; 303—blank box conveying belt III; 304—ex-warehouse stacking machine of the mold stereoscopic warehouse; 305—mold conveying belts I; 306—mold stereoscopic warehouse mold storage positions; 307—mold stereoscopic warehouse roller group I; 308—conveying belt steering rod I; 309—mold stereoscopic warehouse roller group II; 310—mold conveying belts II; 311—mold leveling baffle; 312—mold barcode reader; 313—in-warehouse stacking machine of the mold stereoscopic warehouse; 314—conveying belt steering rod II; 315—mold depositing area; 316—mold stereoscopic warehouse roller group III; 317—photoelectric sensor III; 4—molded vulcanization area; 401—blank box conveying belt V; 402—conveying belt steering rod III; 403—molded vulcanization manufacturing unit; 4031—molded vulcanization manufacturing unit frame; 4032—molded vulcanization manufacturing unit control box; 4033—base lifting mechanism II; 4034—molded vulcanization machine; 40341—molded vulcanization machine force-applying shaft; 40342—molded vulcanization machine C-type base; 40343—electromagnetic adsorption device I; 40344—heat insulation layer I; 40345—heating plate I; 40346—vulcanization thermal insulation plate; 40347—heating plate II; 40348—heat insulation layer II; 40349—electromagnetic adsorption device II; 4035—mold; 40351—upper mold; 40352—lower mold; 4036—loading and unloading mechanism I; 40361—loading and unloading mechanism I Z-axis motor; 40362—loading and unloading mechanism I Z-axis screw; 40363—loading and unloading mechanism I Y-axis sliding table; 40364—loading and unloading mechanism I cylinder connecting block; 40365—loading and unloading mechanism I cylinder upper part; 40366—loading and unloading mechanism I cylinder lower part; 40367—loading and unloading mechanism I cylinder rotating assembly; 404—longitudinal load-bearing steel frames of the molded vulcanization stereoscopic warehouse; 405—transverse load-bearing steel frames of the molded vulcanization stereoscopic warehouse; 406—transfer robot II ground rail; 407—transfer robot II; 40701—transfer robot II Z-axis load-bearing beam; 40702—transfer robot II motor screw; 40703—transfer robot II motor; 40704—transfer robot II base; 40705—transfer robot II level II shaft; 40706—transfer robot II level II bracket; 40707—transfer robot II grippe; 40708—transfer robot II level I shaft; 40709—transfer robot II level I bracket; 40710—transfer robot II shaft base; 40711—transfer robot II shaft base guide rod; 408—photoelectric sensor IV; 409—photoelectric sensor V; 410—photoelectric sensor VI; 5—flash removal area; 501—blank box conveying belt VI; 502—flash removal machine base; 503—blank box transfer tank IV; 504—blank box transfer mechanism III; 5041—blank box transfer mechanism III Z-axis sliding table motor I; 5042—blank box transfer mechanism III Z-axis sliding table screw I; 5043—blank box transfer mechanism III X-axis sliding table screw; 5044—blank box transfer mechanism III X-axis sliding table connecting block; 5045—blank box transfer mechanism III cylinder; 5046—blank box transfer mechanism III Z-axis sliding table motor II; 5047—blank box transfer mechanism III X-axis sliding table motor; 5048—blank box transfer mechanism III Z-axis sliding table screw II; 505—flash removal machines; 5051—flash removal machine frame; 5052—clamping removal end of the flash removal machine; 50521—removal head of the flash removal machine; 50522—force sensor I; 50523—clamping removal end connector of the flash removal machine; 50524—flash removal machine cylinder; 5053—loading and unloading mechanism II Y-axis sliding table; 50531—loading and unloading mechanism II Y-axis motor; 50532—loading and unloading mechanism II Y-axis screw; 5054—loading and unloading mechanism II Z-axis motor; 5055—loading and unloading mechanism II Z-axis screw; 5056—flash removal machine X-axis sliding table; 50561—flash removal machine rubber ring hook; 50562—flash removal machine rubber ring stretching guide block; 50563—force sensor II; 50564—flash removal machine X-axis sliding table connecting block; 50565—flash removal machine X-axis sliding table screw; 50566—flash removal machine X-axis sliding table motor; 5057—flash removal machine rubber ring rotating motor; 5058—flash removal machine flash removal table; 506—photoelectric sensor VII; 507—base lifting mechanism III; 508—blank box; 509—flash removal machine supporting rod; 6—two-stage vulcanization area; 601—rubber ring placement robot; 6011—rubber ring placement robot frame; 6012—rubber ring placement robot pneumatic rod; 6013—rubber ring placement robot cylinder; 6014—rubber ring placement robot base; 6015—rubber ring placement robot supporting rod; 602—rubber ring disc; 603—blank box transfer mechanism IV; 60301—blank box transfer mechanism IV base; 60302—blank box transfer mechanism IV X-axis sliding table screw; 60303—blank box transfer mechanism IV Z-axis sliding table motor I; 60304—base lifting mechanism IV; 60305—blank box transfer mechanism IV X-axis sliding table motor; 60306—blank box transfer mechanism IV cylinder; 60307—blank box transfer mechanism IV Z-axis sliding table motor II; 60308—blank box transfer mechanism IV Z-axis screw I; 60309—blank box transfer mechanism IV Z-axis supporting rod; 60310—blank box transfer mechanism IV screw II; 60311—photoelectric sensor VIII; 604—transfer robot III; 605—two-stage vulcanization area oven rack temporary-storage area; 606—transfer robot III ground rail; 607—oven; 6071—oven door; 6072—oven body; 6073—oven door guide rail; 6074—oven door hook; 6075—oven rack; 60751—oven rack bracket; 60752—oven rack hook; 60753—rubber ring disc; 608—oven support; 7—online detection area; 701—automatic rubber ring detection machine frame; 702—detection station I; 703—detection station II; 704—detection station III; 705—detection station IV; 706—detection station V; 7061—detection station V Z-axis sliding table motor; 7062—detection station V detection head connecting block; 7063—detection station V Z-axis sliding table screw; 7064—detection station V Z-axis detection head; 7065—detection station V detection lens; 7066—detection station V power supply; 707—qualified rubber ring output passage of the automatic rubber ring detection machine; 708—qualified rubber ring outlet; 709—unqualified rubber ring outlet; 710—rubber ring detection disc motor; 711—rubber ring separation mechanism; 7111—rubber ring separation mechanism motor; 7112—rubber ring separation mechanism rotator; 712—automatic rubber ring detection machine input passage; 713—unqualified rubber ring air gun; 714—unqualified rubber ring inlet; 715—qualified rubber ring air gun; 716—qualified rubber ring inlet; 717—unqualified rubber ring output passage of the automatic rubber ring detection machine; 718—rubber ring detection disc; 719—automatic rubber ring detection machine base; 720—automatic rubber ring detection machine supporting rod; 8—packaging and labeling area; 801—packaging and labeling area unqualified rubber ring input passage; 802—packaging and labeling area qualified rubber ring input passage; 803—unqualified rubber ring packaging and labeling machine; 80301—packaging bag barrel; 80302—packaging bag barrel shaft; 80303—packaging bag I; 80304—rubber ring receiving barrel; 80305—photoelectric sensor IX; 80306—packaging and labeling machine supporting rod; 80307—packaging bag guide cylinder; 80308—labeler; 80309—packaging bag transverse heat sealer; 80310—packaging bag II; 80311—barcode identifier; 80312—rubber ring; 80313—packaging bag longitudinal heat sealer; 804—qualified rubber ring packaging and labeling machine; 805—packaging and labeling area unqualified rubber ring output passage; 806—packaging and labeling area qualified rubber ring output passage; 9—control room.

DETAILED DESCRIPTION OF SOME EMBODIMENTS

The present invention provides a fully-automatic production line for rubber sealing rings, comprising a ring forming area, a molded vulcanization area, a flash removal area 5, a two-stage vulcanization area 6, an online detection area 7, a packaging and labeling area 8, and a control room 9, wherein the ring forming area comprises a blank box stereoscopic warehouse 1 and a plurality of blank forming machines 2; the blank box stereoscopic warehouse 1 further comprises a blank box 101, a longitudinal load-bearing steel frame 102 of the blank box stereoscopic warehouse, and a transverse load-bearing steel frame 103 of the blank box stereoscopic warehouse; the blank box 101 is disposed on a load-bearing steel frame composed of the longitudinal load-bearing steel frame 102 of the blank box stereoscopic warehouse and the transverse load-bearing steel frame 103 of the blank box stereoscopic warehouse; the load-bearing steel frame composed of the longitudinal load-bearing steel frame 102 of the blank box stereoscopic warehouse and the transverse load-bearing steel frame 103 of the blank box stereoscopic warehouse is also provided with a four-way reach truck passage 104 of the blank box stereoscopic warehouse; a four-way reach truck 105 of the blank box stereoscopic warehouse is disposed on and in conjunction with the four-way reach truck passage 104 of the blank box stereoscopic warehouse; an in-warehouse stacking machine 106 of the blank box stereoscopic warehouse is disposed at an inlet of the four-way reach truck passage 104 of the blank box stereoscopic warehouse; a blank box conveying belt I 110 is also disposed beside the in-warehouse stacking machine 106 of the blank box stereoscopic warehouse; a blank box transfer mechanism I 107 is disposed on and in conjunction with the blank box conveying belt I 110; an ex-warehouse stacking machine 108 of the blank box stereoscopic warehouse is further disposed at an outlet of the four-way reach truck passage 104 of the blank box stereoscopic warehouse; an ex-warehouse passage 109 of the blank box stereoscopic warehouse is disposed beside and in cooperation with the ex-warehouse stacking machine 108 of the blank box stereoscopic warehouse; the plurality of blank forming machines 2 is arranged side by side beside the blank box stereoscopic warehouse 1, and a matching blank box conveying belt II 209 is disposed on the other side of the plurality of blank forming machines 2;

the molded vulcanization area comprises a mold stereoscopic warehouse 3, a production stereoscopic warehouse and an assembly unit; the mold stereoscopic warehouse 3 is divided into multiple layers with the same structure, each layer being provided with a plurality of transverse mold stereoscopic warehouse roller groups I 307, a plurality of longitudinal mold stereoscopic warehouse roller groups II 309 and a mold stereoscopic warehouse roller group III 316; the mold stereoscopic warehouse roller groups II 309 and the mold stereoscopic warehouse roller groups I 307 jointly constitute a plurality of mold stereoscopic warehouse mold storage positions 306; a conveying belt steering rod I 308 is respectively disposed at an outlet and an inlet of each mold stereoscopic warehouse mold storage position 306; a conveying belt steering rod II 314 is further disposed at the junction between the mold stereoscopic warehouse roller group II 309 and the mold stereoscopic warehouse roller group III 316; the assembly unit comprises a transfer robot I 301; a blank box conveying belt III 303 is disposed beside and in cooperation with the transfer robot I 301; a blank box transfer tank III 302 is formed in and in cooperation with the blank box conveying belt III 303, and meanwhile a photoelectric sensor III 317 is also disposed on the blank box conveying belt III 303; the blank box conveying belt III 303 is also provided with mold conveying belts II 310 at different heights in a direction perpendicular to the ground; a mold leveling baffle 311 is disposed on the mold conveying belt II 310, and meanwhile, a mold barcode reader 312 is also disposed on the mold conveying belt II 310; an in-warehouse stacking machine 313 of a mold stereoscopic warehouse is also disposed at an outlet of the mold conveying belt II 310; an ex-warehouse stacking machine 304 of the mold stereoscopic warehouse is also disposed at a corresponding position of the in-warehouse stacking machine 313 of the mold stereoscopic warehouse; the in-warehouse stacking machine 313 of the mold stereoscopic warehouse and the ex-warehouse stacking machine 304 of the mold stereoscopic warehouse are connected through a mold stereoscopic warehouse roller group III 316; the production stereoscopic warehouse comprises a blank box conveying belt V 401, a conveying belt steering rod III 402, a molded vulcanization manufacturing unit 403, longitudinal load-bearing steel frames 404 of the molded vulcanization stereoscopic warehouse, transverse load-bearing steel frames 405 of the molded vulcanization stereoscopic warehouse, transfer robot II ground rails 406, a transfer robot II 407, a photoelectric sensor IV 408, a photoelectric sensor V 409 and a photoelectric sensor VI 410; the plurality of longitudinal load-bearing steel frames 404 of the molded vulcanization stereoscopic warehouse and the plurality of transverse load-bearing steel frames 405 of the molded vulcanization stereoscopic warehouse constitute a molded vulcanization stereoscopic warehouse shelf; the molded vulcanization warehouse shelf is divided into multiple layers along a direction perpendicular to the ground, with a plurality of molded vulcanization manufacturing units 403 being stored in each layer; the transfer robot II ground rails 406 are disposed between the molded vulcanization stereoscopic warehouse shelves; the transfer robot II 407 is disposed and in cooperation with the transfer robot II ground rails 406; the photoelectric sensor IV 408, the photoelectric sensor V 409 and the photoelectric sensor VI 410 are respectively disposed at each position, adjacent to the transfer robot II ground rails 406, of the blank box conveying belt V 401; the conveying belt steering rod III 402 is disposed at the connection between the blank box conveying belt V 401 and the blank box conveying belt III 303;

the flash removal area 5 comprises a blank box conveying belt VI 501, a flash removal machine base 502, a blank box transfer tank IV 503, a blank box transfer mechanism III 504, a plurality of flash removal machines 505, a photoelectric sensor VII 506, a base lifting mechanism III 507, a blank box 101 and flash removal machine supporting rods 509; the flash removal machine supporting rods 509 are disposed below the flash removal machine base 502; the flash removal machines 505 are disposed above the flash removal machine base 502; the blank box conveying belt V 401 is disposed on one side of each flash removal machine 505, the blank box conveying belt VI 501 is disposed on the other side of each flash removal machine 505, and the base lifting mechanism III 507 and the blank box transfer mechanism III 504 are disposed in front of the flash removal machine 505; the blank box transfer tank IV 503 is disposed on the blank box conveying belt VI 501; the photoelectric sensor VII 506 is disposed on the blank box conveying belt V 401; the blank box 101 is mounted on the flash removal machines 505; the plurality of flash removal machines 505 share one blank box conveying belt V 401, and at the same time share one blank box conveying belt VI 501;

the two-stage vulcanization area 6 comprises a rubber ring placement robot 601, a rubber ring disc 602, a blank box transfer mechanism IV 603, a transfer robot III 604, a two-stage vulcanization area oven rack temporary-storage area 605, transfer robot III ground rails 606, ovens 607 and oven supports 608; the rubber ring disc 602 is installed in conjunction with the rubber ring placement robot 601; a blank box transfer mechanism IV 603 is disposed beside the rubber ring placement robot 601; the transfer robot III ground rails 606 is disposed on and in conjunction with the blank box transfer mechanism IV 603; the transfer robot III 604 is also disposed on and in conjunction with the transfer robot III ground rails 606; the two-stage vulcanization area oven rack temporary-storage area 605 is also disposed on the transfer robot III ground rails 606; the plurality of ovens 607 is disposed on both sides of the transfer robot III ground rails 606 through the oven supports 608, and divided into an upper layer and a lower layer; the transfer robot III ground rails 606 are used in conjunction with the transfer robot III 604, such that a disposed oven rack 6075 is fed into and removed from the oven 607;

the online detection area 7 comprises an input passage 712 of an automatic rubber ring detection machine, a qualified rubber ring output passage 707 of the automatic rubber ring detection machine, an unqualified rubber ring output passage 717 of the automatic rubber ring detection machine, and the automatic rubber ring detection machine; the input passage 712 of the automatic rubber ring detection machine, the qualified rubber ring output passage 707 of the automatic rubber ring detection machine, and the unqualified rubber ring output passage 717 of the automatic rubber ring detection machine are respectively connected to the automatic rubber ring detection machine; meanwhile, the other end of the input passage 712 of the automatic rubber ring detection machine is connected to the rubber ring placement robot 601; and the packaging and labeling area 8 comprises a packaging and labeling area unqualified rubber ring input passage 801, a packaging and labeling area qualified rubber ring input passage 802, an unqualified rubber ring packaging and labeling machine 803, a qualified rubber ring packaging and labeling machine 804, a packaging and labeling area unqualified rubber ring output passage 805, and a packaging and labeling area qualified rubber ring output passage 806; one end of the packaging and labeling area unqualified rubber ring input passage 801 is connected to the unqualified rubber ring output passage 717 of the automatic rubber ring detection machine, and the other end of the packaging and labeling area unqualified rubber ring input passage 801 is connected to the unqualified rubber ring packaging and labeling machine 803; the packaging and labeling area unqualified rubber ring output passage 805 is connected to the unqualified rubber ring packaging and labeling machine 803; one end of the packaging and labeling area qualified rubber ring input passage 802 is connected to the qualified rubber ring output passage 707 of the automatic rubber ring detection machine, and the other end of the packaging and labeling area qualified rubber ring input passage 802 is connected to the qualified rubber ring packaging and labeling machine 804; and the packaging and labeling area qualified rubber ring output passage 806 is connected to the qualified rubber ring packaging and labeling machine 804.

As an optional specific embodiment, the blank box 101 further comprises a plurality of blank box barrels 1011; the plurality of the blank box barrels 1011 is disposed side by side on one side inside the blank box 101; a thermal insulation area 1014 is disposed beside each blank box barrel 1011; a mold storage position 1013 is arranged above the thermal insulation area 1014; a blank box mold clamping tank 1012 is also formed above the thermal insulation area 1014; an upper barrel edge 10111 is disposed on the top of the blank box barrel 1011; a barrel stop edge 10112 is disposed at the bottom of an outer edge of the upper barrel edge 10111; the internal side wall of the blank box barrel 1011 is provided with a barrel side edge vertical tank 10113 and a barrel positioning rod 10114; a barrel base 10115 is disposed on the bottom of the blank box barrel 1011; the barrel base 10115 is also provided with a barrel base lifting auxiliary hole 10116; a barrel positioning rod transverse fixing rod 10119 is also arranged under the barrel base 10115; and a barrel positioning rod top connecting rod 10117 and a barrel positioning rod bottom connecting rod 10118 are correspondingly disposed at the upper and lower ends of the barrel positioning rod 10114, respectively.

As an optional specific embodiment, the blank box transfer mechanism I 107 further comprises a blank box transfer mechanism I base 1071; the blank box transfer mechanism I base 1071 is disposed on one side of the blank box conveying belt I 110 close to the blank box stereoscopic warehouse 1; the blank box transfer mechanism I base 1071 is further provided with a blank box transfer mechanism I Z-axis sliding table 1072, and a blank box transfer mechanism I Y-axis sliding table screw 1074; the blank box transfer mechanism I Y-axis sliding table screw 1074 is provided with a blank box transfer mechanism I Y-axis sliding table motor 1073, meanwhile the blank box transfer mechanism I base 1071 is also provided with a blank box transfer mechanism I clamping cylinder 1075 and a blank box transfer tank I 1076, and meanwhile the blank box conveying belt I 110 is further provided with a photoelectric sensor I 1077; the blank box transfer mechanism II 206 comprises a blank box transfer mechanism II Z-axis sliding table screw II 2065 and a blank box transfer mechanism II Z-axis screw I 2063 which are disposed on the blank forming machine base 201; a blank box transfer mechanism II Z-axis sliding table motor II 2064 and a blank box transfer mechanism II Z-axis sliding table motor I 2061 are respectively disposed at the upper end of the blank box transfer mechanism II Z-axis sliding table screw II 2065 and the upper end of the blank box transfer mechanism II Z-axis screw I 2063; the blank box transfer mechanism II Z-axis sliding table screw II 2065 and the upper end of the blank box transfer mechanism II Z-axis screw I 2063 are connected through a blank box transfer mechanism II X-axis screw 2062; the blank box transfer mechanism II X-axis screw 2062 is also provided with a blank box transfer mechanism II X-axis sliding block 2066 and a blank box transfer mechanism II cylinder 2067; the blank box transfer mechanism III 504 comprises a blank box transfer mechanism III Z-axis sliding table screw I 5042 and a blank box transfer mechanism III Z-axis sliding table screw II 5048; the blank box transfer mechanism III Z-axis sliding table screw I 5042 and the blank box transfer mechanism III Z-axis sliding table screw II 5048 are respectively disposed on a flash removal machine base 502; the blank box transfer mechanism III Z-axis sliding table screw I 5042 and the blank box transfer mechanism III Z-axis sliding table screw II 5048 are connected through a mounted blank box transfer mechanism III X-axis sliding table screw 5043; the blank box transfer mechanism III X-axis sliding table screw 5043 is provided with a blank box transfer mechanism III X-axis sliding table connecting block 5044 and a blank box transfer mechanism III cylinder 5045; a blank box transfer mechanism III X-axis sliding table motor 5047 is disposed at one end of the blank box transfer mechanism III X-axis sliding table screw 5043; a blank box transfer mechanism III Z-axis sliding table motor II 5046 is arranged at the upper end of the blank box transfer mechanism III Z-axis sliding table screw II 5048; a blank box transfer mechanism III Z-axis sliding table motor I 5041 is arranged at the upper end of the blank box transfer mechanism III Z-axis sliding table screw I 5042; the blank box transfer mechanism IV 603 comprises a blank box transfer mechanism IV base 60301; a blank box transfer mechanism IV Z-axis screw I 60308 and a base lifting mechanism IV 60304 are respectively disposed at the upper part of the blank box transfer mechanism IV base 60301; one end of the blank box transfer mechanism IV Z-axis screw I 60308 and one end of the blank box transfer mechanism IV screw II 60310 are both disposed on the blank box transfer mechanism IV base 60301, and a blank box transfer mechanism IV Z-axis sliding table motor I 60303 and a blank box transfer mechanism IV Z-axis sliding table motor II 60307 are respectively disposed at the other ends of the blank box transfer mechanism IV Z-axis screw I 60308 and the blank box transfer mechanism IV screw II 60310; the blank box transfer mechanism IV Z-axis screw I 60308 and the blank box transfer mechanism IV screw II 60310 are connected through a mounted blank box transfer mechanism IV X-axis sliding table screw 60302; a blank box transfer mechanism IV X-axis sliding table motor 60305 is disposed at one end of the blank box transfer mechanism IV X-axis sliding table screw 60302, and meanwhile, a blank box transfer mechanism IV cylinder 60306 is further disposed on the blank box transfer mechanism IV X-axis sliding table screw 60302; and a photoelectric sensor VIII 60311 is disposed on the blank box conveying belt VI 501.

As an optional specific embodiment, the blank forming machine 2 includes a blank forming machine base 201, a blank reel 202, a blank strip guide device 203, a blank gripping mechanism 204, a blank forming workbench 205, a blank box transfer mechanism II 206, a base lifting mechanism I 207, a blank box 208, a blank box conveying belt II 209, a blank box transfer tank II 210, a photoelectric sensor II 211, a blank strip cutting knife 213 and a blank gripper 214; the blank forming machine supporting rod 212 is disposed on the bottom surface under the blank forming machine base 201; the blank forming workbench 205, the blank box conveying belt II 209, the blank strip guide device 203, the blank reel 202, the blank box transfer mechanism II 206, the blank box conveying belt II 209 and the base lifting mechanism I 207 are further disposed on the blank forming machine base 201; the blank strip cutting knife 213, the blank gripper 214 and the blank gripping mechanism 204 are disposed on the blank forming workbench 205; the blank strip guide device 203 is composed of a blank strip guide device mounting base 2031 mounted on the blank forming machine base 201 and two upper and lower blank strip guide device guide pulleys 2032 located on the blank strip guide device mounting base 2031; the blank reel 202 comprises a blank reel body 2022, a blank reel shaft 2023 and a blank reel mounting base 2024; the blank reel 202 is mounted on the blank forming machine base 201 through a blank reel mounting base 2024, and assisted by a blank reel motor 2021 to rotate; the blank reel 202 is also wound with a rubber blank strip 2025 extruded by a high-pressure extruder; the blank box conveying belt II 209 is provided with a blank box transfer tank II 210 in conjunction therewith; a photoelectric sensor II 211 is also disposed on the blank box conveying belt II 209; the base lifting mechanism I 207 comprises a base lifting mechanism I motor 2071, a base lifting mechanism I screw 2072 and a base lifting mechanism I connecting rod 2073; one end of the base lifting mechanism I screw 2072 is disposed on the blank forming machine base 201, the base lifting mechanism I motor 2071 is disposed at the other end of the base lifting mechanism I screw 2072, and the base lifting mechanism I connecting rod 2073 is disposed on the base lifting mechanism I screw 2072; the base lifting mechanism I connecting rod 2073 is driven by the base lifting mechanism I screw 2072 to move vertically in a direction perpendicular to the ground; the blank gripping mechanism 204 comprises a blank gripping mechanism Z-axis screw 2042; one end of the blank gripping mechanism Z-axis screw 2042 is disposed on the blank forming machine base 201, and a blank gripping mechanism Z-axis motor 2041 is disposed at the other end of the blank gripping mechanism Z-axis screw 2042; a blank gripping mechanism X-axis screw 2045 and a blank gripping mechanism Y-axis sliding table 2047 are disposed on the blank gripping mechanism Z-axis screw 2042; a blank gripping mechanism X-axis connecting mechanism 2043 is arranged at one end of the blank gripping mechanism X-axis screw 2045; a blank gripping mechanism cylinder is also disposed on the blank gripping mechanism X-axis connecting mechanism 2043; a blank gripping mechanism X-axis motor 2046 is disposed at the other end of the blank gripping mechanism X-axis screw 2045; and meanwhile, the base lifting mechanism IV 60304 and the base lifting mechanism I 207 are identical in structure.

As an optional specific embodiment, the molded vulcanization manufacturing unit 403 comprises a molded vulcanization manufacturing unit frame 4031 and a mold 4035; the molded vulcanization manufacturing unit frame 4031 is of a cuboid structure, and meanwhile the molded vulcanization manufacturing unit frame 4031 is provided with a molded vulcanization machine 4034 inside; a molded vulcanization manufacturing unit control box 4032 is disposed on one side of the molded vulcanization machine 4034, and a loading and unloading mechanism I 4036 is disposed on the other side of the molded vulcanization machine 4034; a base lifting mechanism II 4033 is disposed in front of the molded vulcanization manufacturing unit frame 4031; the molded vulcanization machine 4034 comprises a molded vulcanization machine C-type base 40342; the molded vulcanization machine C-type base 40342 is disposed on a bottom plate of the molded vulcanization manufacturing unit frame 4031, and at the same time provides mechanical structural support for the molded vulcanization machine 4034; a molded vulcanization machine force-applying shaft 40341 is also disposed at the upper part of the molded vulcanization machine C-type base 40342; the molded vulcanization machine force-applying shaft 40341 moves vertically along a Z-axis in a direction perpendicular to the ground, and is provided with an electromagnetic adsorption device I 40343, a heat insulation layer I 40344 and a heating plate I 40345 respectively from top to bottom; an outer edge of the heating plate I 40345 is also provided with a vulcanization thermal insulation plate 40346; a heating plate II 40347, a heat insulation layer II 40348 and an electromagnetic adsorption device II 40349 are disposed at the lower part of the molded vulcanization machine C-type base 40342 from bottom to top; the loading and unloading mechanism I 4036 comprises a loading and unloading mechanism I Z-axis screw 40362 and a loading and unloading mechanism I Y-axis sliding table 40363; one end of the loading and unloading mechanism I Z-axis screw 40362 is disposed on the bottom plate of the molded vulcanization manufacturing unit frame 4031, and a loading and unloading mechanism I Z-axis motor 40361 is disposed at the other end of the loading and unloading mechanism I Z-axis screw 40362; a loading and unloading mechanism I cylinder connecting block 40364 is disposed on the loading and unloading mechanism I Y-axis sliding table 40363; a loading and unloading mechanism I cylinder rotating assembly 40367 is disposed on the loading and unloading mechanism I cylinder connecting block 40364; the loading and unloading mechanism I cylinder is divided into a loading and unloading mechanism I cylinder upper part 40365 and a loading and unloading mechanism I cylinder lower part 40366, which are connected independently to an air source and controlled for actions receptively by corresponding air pressure gauges; and meanwhile, the base lifting mechanism II 4033 and the base lifting mechanism I 207 are identical in structure.

As an optional specific embodiment, the flash removal machine 505 comprises a flash removal machine frame 5051, a loading and unloading mechanism II and a flash removal mechanism; the loading and unloading mechanism II comprises a clamping removal end 5052 of the flash removal machine, a loading and unloading mechanism II Y-axis sliding table 5053, a loading and unloading mechanism II Z-axis motor 5054 and a loading and unloading mechanism II Z-axis screw 5055; the clamping removal end 5052 of the flash removal machine consists of a removal head 50521 of the flash removal machine, a force sensor I 50522, a clamping removal end connector 50523 of the flash removal machine and a flash removal machine cylinder 50524; one end of the flash removal head 50521 of the flash removal machine is connected to the force sensor I 50522, and the other end of the flash removal head 50521 of the flash removal machine is continuously provided with a 45° inclination friction surface and a 90° inclination friction surface; one end of the force sensor I 50522 is connected to the flash removal head 50521 of the flash removal machine, and the other end of the force sensor I 50522 is connected to the clamping removal end connector 50523 of the flash removal machine; the clamping removal end connector 50523 of the flash removal machine is respectively connected to the force sensor I 50522, the flash removal machine cylinder 50524 and the loading and unloading mechanism II Y-axis sliding table 5053; the flash removal machine cylinder 50524 is connected to the clamping removal end connector 50523 of the flash removal machine; the lower part of the flash removal machine frame 5051 is disposed on the flash removal machine frame 5051, and except for the side connected with the base lifting mechanism III 507, the other three sides and the bottom are closed; the loading and unloading mechanism II Y-axis sliding table 5053 is composed of a loading and unloading mechanism II Y-axis motor 50531 and a loading and unloading mechanism II Y-axis screw 50532; one end of the loading and unloading mechanism II Z-axis screw 5055 is disposed on the flash removal machine base 502, and a loading and unloading mechanism II Z-axis motor 5054 is disposed at the other end of the loading and unloading mechanism II Z-axis screw 5055; the flash removal mechanism comprises a flash removal machine X-axis sliding table 5056, a flash removal machine rubber ring rotating motor 5057 and a flash removal machine flash removal table 5058; the flash removal machine X-axis sliding table 5056 is composed of a flash removal machine rubber ring hook 50561, a flash removal machine rubber ring stretching guide block 50562, a force sensor II 50563, a flash removal machine X-axis sliding table connecting block 50564, a flash removal machine X-axis sliding table screw 50565 and a flash removal machine X-axis sliding table motor 50566; one side of the force value sensor II 50563 is connected to the flash removal machine rubber ring hook 50561 through a crossbar, and the other side of the force value sensor II 50563 is connected to the flash removal machine X-axis sliding table connecting block 50564; one side of the flash removal machine X-axis sliding table connecting block 50564 is connected to the force sensor II 50563, and the other side of the flash removal machine X-axis sliding table connecting block 50564 is connected to the flash removal machine X-axis sliding table screw 50565, such that a connecting force value drives the force sensor II 50563 to slide through the flash removal machine X-axis sliding table screw 50565, and finally drives the flash removal machine rubber ring hook 50561 to tighten the rubber ring.

As an optional specific embodiment, the rubber ring placement robot 601 comprises a rubber ring placement robot frame 6011, rubber ring placement robot pneumatic rods 6012, a rubber ring placement robot cylinder 6013, a rubber ring placement robot base 6014 and a rubber ring placement robot supporting rod 6015; the rubber ring placement robot frame 6011 is disposed on the rubber ring placement robot base 6014; one ends of the plurality of rubber ring placement robot pneumatic rods 6012 at the same angle to each other are connected to the rubber ring placement robot frame 6011, and the other ends thereof are connected to the rubber ring placement robot cylinder 6013; a rubber ring disc 602 is also disposed above the rubber ring placement robot base 6014, and functions to carry the rubber rings placed by the rubber ring placement robot 601; the rubber ring disc 602 is also provided with a barcode for rubber ring disc identification; a rubber ring placement robot supporting rod 6015 is disposed below the rubber ring placement robot base 6014 and used for providing mechanical support and height adjustment of the rubber ring placement robot; meanwhile the oven rack 6075 is composed of an oven rack bracket 60751, an oven rack hook 60752 and a rubber ring disc 602, and functions to hold different rubber ring discs 602 in conjunction with the oven 607; the oven 607 is composed of an oven door 6071, an oven body 6072, oven door guide rails 6073 and an oven door hook 6074; the oven door 6071 is driven by a motor disposed in the oven 607, and is opened and closed along the oven door guide rails 6073; and the oven rack hook 60752 on the oven rack 6075 is used in conjunction with the oven door hook 6074.

As an optional specific embodiment, the automatic rubber ring detection machine comprises a qualified rubber ring outlet 708, an unqualified rubber ring outlet 709, a rubber ring detection disc motor 710, a rubber ring separation mechanism 711, a unqualified rubber ring air gun 713, an unqualified rubber ring inlet 714, a qualified rubber ring air gun 715, a qualified rubber ring inlet 716, a rubber ring detection disc 718, and an automatic rubber ring detection machine base 719; an automatic rubber ring detection machine frame 710 is disposed in the middle of the upper part of the automatic rubber ring detection machine base 719, an automatic rubber ring detection machine frame 701 is also provided around the perimeter of the automatic rubber ring detection machine base 719, and automatic rubber ring detection machine supporting rods 720 are disposed at the lower part of the automatic rubber ring detection machine base 719; a detection station I 702, a detection station II 703, a detection station III 704, a detection station IV 705 and a detection station V 706 are respectively disposed at the upper part of the automatic rubber ring detection machine base 719; the detection station V 706 further comprises a detection station V Z-axis sliding table screw 7063 and a detection station V Z-axis detection head 7064; one end of the detection station V Z-axis sliding table screw 7063 is disposed on one end on the automatic rubber ring detection machine base 719, a detection station V Z-axis sliding table motor 7061 is disposed at the other end of the detection station V Z-axis sliding table screw 7063, and a detection station V detection head connecting block 7062 is disposed in the middle of the detection station V Z-axis sliding table screw 7063; one side of the detection station V Z-axis detection head 7064 is connected to the detection station V detection head connecting block 7062, and a detection station V detection lens 7065 is disposed at the lower part of the detection station V Z-axis detection head 7064; a detection station V power supply 7066 is disposed below the detection station V detection lens 7065, and the detection station V power supply 7066 is located below the rubber ring detection disc 718; and a qualified rubber ring air gun 715 and an unqualified rubber ring air gun 713 are disposed at a position of the rubber ring detection disc 718 close to the upper part of the automatic rubber ring detection machine input passage 712, and function to blow air to the rubber rings, such that qualified rubber rings or unqualified rubber rings are blown into the qualified rubber ring inlet 716 or the unqualified rubber ring inlet 714 respectively.

As an optional specific embodiment, the unqualified rubber ring packaging and labeling machine 803 comprises a packaging bag barrel 80301, a packaging bag barrel shaft 80302, a packaging bag I 80303, a rubber ring receiving barrel 80304, a photoelectric sensor IX 80305, a packaging and labeling machine supporting rod 80306, a packaging bag guide cylinder 80307, a labeler 80308, a packaging bag transverse heat sealer 80309, a packaging bag II 80310, a barcode identifier 80311, a rubber ring 80312 and a packaging bag longitudinal heat sealer 80313; the lower part of the packaging and labeling machine supporting rod 80306 is disposed on the ground, and the packaging bag barrel 80301 is disposed above the packaging and labeling machine supporting rod 80306 through the packaging bag barrel shaft 80302; the packaging bag I 80303 is a film rolled on the packaging bag barrel 80301, and the lower part of the packaging bag I is rolled into a film tube with an unsealed end through the packaging bag guide cylinder 80307; the unsealed side end of the packaging bag I 80303 is heat-sealed by the packaging bag longitudinal heat sealer 80313, and the lower end of the packaging bag I 80303 is sealed twice in the front and the rear of the rubber ring 80312 by the packaging bag transverse heat sealer 80309; the rubber ring 80312 is inputted by the unqualified rubber ring input passage 801 of the packaging and labeling unit, and falls into the packaging bag II 80310 with the lower end and side end being sealed after passing through the rubber ring receiving barrel 80304, and the falling process is counted by the photoelectric sensor IX 80305; and the packaging bag II 80310 is labeled by the labeler 80308.

The present invention provides an automatic production method for rubber seal rings, comprising the following steps:

S1: issuing a production order number to production line management personnel in a control room 9; conveying, by a four-way reach truck 105 of a blank box stereoscopic warehouse, blank boxes 101 in the blank box stereoscopic warehouse 1 to an ex-warehouse stacking machine 108 of the blank box stereoscopic warehouse through a four-way reach truck passage 104 of the blank box stereoscopic warehouse 104, and then conveying to a working area of a transfer robot I 301 through an ex-warehouse passage 109 of the blank box stereoscopic warehouse; establishing a corresponding relation between the production order number and a barcode on the blank box 101;

S2: clamping, by the transfer robot I 301, the blank box 101 on the four-way reach truck 105 of the blank box stereoscopic warehouse to a blank box transfer tank II 210, and returning the four-way reach truck 105 of the blank box stereoscopic warehouse to the blank box stereoscopic warehouse 1;

S3: conveying the blank box 101 that is carried on the blank box transfer tank II 210 to a blank forming machine that produces the blank ring corresponding to a material designation, along a blank box conveying belt II 209;

S4: activating a blank box transfer mechanism II 206 to clamp the blank box 101 out of the blank box transfer tank II 210, and installing the blank box together with a base lifting mechanism I 207, by means of the installation method of inserting a base lifting mechanism I connecting rod 2073 into a barrel base lifting auxiliary hole 10116;

S5: lifting a base lifting mechanism I connecting rod 2073 close to one side of the blank forming machine until a barrel base 10115 is in a highest position;

S6: after the installation of the blank box 101, operating the blank forming machine, and clamping, by a blank gripping mechanism cylinder 2044, blank strips 2025 and pulling them forward until a blank gripper 214 clamps the front ends of the blank strips 2025;

S7: loosening the blank strips 2025 by the blank gripping mechanism cylinder 2044, and conveying the blank strips 2025 forward by a blank strip guide device guide pulley 2032 until a desired blank strip length is formed in accordance with a desired blank ring specification;

S8: clamping the blank strip 2025 by the blank gripping mechanism cylinder 2044, and operating a blank strip cutting knife 213 to cut off the blank strip 2025;

S9: bending the blank strip 2025 into a ring by the blank gripping mechanism cylinder 2044 under the action of a blank gripping mechanism 204, and extruding two ends of the blank strip 2025 by the blank gripping mechanism cylinder 2044 and the blank gripper 214 to complete the blank ring formation;

S10: loosening the blank gripper 214, placing, by the blank gripping mechanism cylinder 2044, the blank ring, onto a barrel base 10115 on which the blank box 101 is raised, and moving the barrel base 10115 slightly downward under the driving of a base lifting mechanism I connecting rod 2073 to ensure that a vertical height position of the next blank ring on the barrel base 10115 is similar to the previous one;

S11: repeating S6 to S10, till a barrel is filled with the blank rings;

S12: clamping the blank box 101 into a blank box transfer tank II 210 through a blank box transfer mechanism II 206, and conveying the blank box transfer tank II 210 to a working area of the transfer robot I 301 through a blank box conveying belt II 209;

S13: clamping, by the transfer robot I 301, the blank box 101 from the blank box transfer tank II 210 into the blank box transfer tank II, recognizing a barcode on the blank box 101, and issuing a mold command to a mold stereoscopic warehouse 3;

S14: conveying molds in corresponding mold stereoscopic warehouse mold storage positions 306 in the mold stereoscopic warehouse 3 respectively to an ex-warehouse stacking machine 304 of the mold stereoscopic warehouse through a mold stereoscopic warehouse roller group I 307, a mold stereoscopic warehouse roller group II 309 and a mold stereoscopic warehouse roller group III 316, under the action of a conveying belt steering rod I 308 and a conveying belt steering rod II 314;

S15: lifting the corresponding molds to a working position of the transfer robot I 301 through the ex-warehouse stacking machine 304 of the mold stereoscopic warehouse, and clamping the molds by the transfer robot I 301 into a blank box mold cavity 1013 of the blank box 101;

S16: conveying the blank box transfer tank III 302 to a molded vulcanization area 4 through a blank box conveying belt III 303, and then conveying to a working area of a corresponding transfer robot II 407 under the action of a conveying belt steering rod III 402 and a blank box conveying belt V 401;

S17: clamping, by the transfer robot II 407, the blank box 101 out of a blank box transfer tank III 302, and installing the blank box in a base lifting mechanism II 4033 of the idle mold vulcanization manufacturing unit 403, by means of the installation method of inserting a connecting rod of the base lifting mechanism II 4033 into a barrel base lifting auxiliary hole 10116;

S18: installing, by the transfer robot II 407, the mold 4035 in the blank box 101 on the molded vulcanization machine 4034, and lifting, by the base lifting mechanism II 4033, a barrel base 10115 away from the molded vulcanization machine 4034, to a highest position;

S19: operating an electromagnetic adsorption device I 40343 and an electromagnetic adsorption device II 40349 of the molded vulcanization machine 4034 to adsorb an upper mold 40351 and a lower mold 40352 respectively;

S20: moving a molded vulcanization machine force-applying shaft 4034 of the molded vulcanization machine 4034 upward to drive the upper mold 40351 to be separated from the lower mold 40352;

S21: sucking, a loading and unloading mechanism I 4036, the blank ring from the barrel containing the blank ring in the blank box 101 to the lower mold 40352, and then moving the molded vulcanization machine force-applying shaft downward;

S22: operating a heating plate I 40345 and a heating plate II 40347 such that the blank ring begins to be molded-vulcanized;

S23: after the completion of molded vulcanization, moving the molded vulcanization machine force-applying shaft 40341 upward, and moving a loading and unloading mechanism I cylinder of the loading and unloading mechanism I 4036 between the upper mold 40351 and the lower mold 40352;

S24: moving the molded vulcanization machine force-applying shaft 40341 upward until the upper mold 40351 and the lower mold 40352 are fitted to the loading and unloading mechanism I cylinder;

S25: operating the loading and unloading mechanism I cylinder to suck the rubber ring on the mold 4035, and determining, according to sensor data, that an adsorption position of the rubber ring is located in a loading and unloading mechanism I cylinder upper part 40365 or a loading and unloading mechanism I cylinder lower part 40366;

S26: moving the molded vulcanization machine force-applying shaft 40341 upward, and rotating, by the loading and unloading mechanism I 4063, the rubber ring, onto a finished-product rubber ring barrel of the blank box 101;

S27: moving the finished-product rubber ring barrel base 10115 slightly downward under the driving of the base lifting mechanism II 4033 to ensure that a vertical height position of the next rubber ring on the barrel base 10115 is similar to the previous one;

S28: repeating S19 to S27, until all blank rings are molded-vulcanized, and placed one by one in the finished-product rubber ring barrel;

S29: moving the molded vulcanization machine force-applying shaft 40341 downward till the upper mold 40351 and the lower mold 40352 are close and fitted, stopping operating an electromagnetic adsorption device I 40343 and an electromagnetic adsorption device II 40349, and lowering, by the base lifting mechanism 4033, barrel bases 10115 on both sides of the blank box 101 to a lowest position;

S30: moving the molded vulcanization machine force-applying shaft 40341 upward, clamping, by the transfer robot II 407, the mold 4035 into a blank box mold cavity 1013 of the blank box 101, and clamping the blank box 101 into a blank box transfer tank III 302;

S31: conveying the blank box transfer tank III 302 into a flash removal area 5 through a blank box conveying belt V 401, taking, by a blank box transfer mechanism III 504, the blank box 101 out of the blank box transfer tank III 302, and installing the blank box 101 in the base lifting mechanism III 507, by means of an installation method of inserting a connecting rod of the base lifting mechanism III 507 into a barrel base lifting auxiliary hole 10116;

S32: lifting, by the base lifting mechanism III 507, the barrel base 10115 on one side of the blank barrel of the blank box 101 to a highest position;

S33: clamping, by the blank box transfer mechanism III 504, the rubber ring on one side of a finished-product barrel of the blank box 101 to a flash removal table 5058 of the flash removable machine, such that a rotating shaft of a rubber ring rotating motor 5057 of the flash removal machine and a flash removal rubber ring hook 50561 are located in the rubber ring;

S34: operating a flash removal machine X-axis sliding table 5056, and tightening the rubber ring, wherein the degree of tightening is controlled by a force sensor II 50563;

S35: operating the rubber ring rotating motor 5057 of the flash removal machine to drive the rubber ring to rotate, and operating a flash removal head 50521 of the flash removal machine to remove flashes of the rubber ring by means of a friction surface, wherein the removal force is controlled by the force sensor I 50522;

S36: after the removal of the flashes of the rubber ring, loosening the rubber ring by the flash removal machine X-axis sliding table 5056; clamping, by the blank box transfer mechanism III 504, the rubber ring to one side of the blank barrel of the blank box 101; and moving the blank barrel base 10115 slightly downward under the driving of the base lifting mechanism III 504 to ensure that a vertical height position of the next rubber ring on the barrel base 10115 is similar to the previous one;

S37: repeating S29 to S36, until all rubber rings are removed for flashes, and placed one by one in the blank barrel;

S38: operating the base lifting mechanism III 507 to lower the barrel bases 10115 on both sides of the blank box 101 to a lowest position; and operating the blank box transfer mechanism III 504 to clamp the blank box 101 into a blank box transfer tank IV 503;

S39: conveying, by the blank box transfer tank IV 503, the blank box 101 to a second-stage vulcanization area 6 along a blank box conveying belt VI 501;

S40: operating a blank box transfer mechanism IV 603 to install the blank box 101 and the base lifting mechanism IV 60304, by means of the installation method of inserting a connecting rod of the base lifting mechanism IV 60304 into a barrel base lifting auxiliary hole 10116;

S41: taking, by a rubber ring placement robot 601, the rubber rings one by one out of the blank barrel of the blank box 101, placing the rubber rings on a rubber disc 602 without overlapping with each other, and establishing a relationship between a barcode on the rubber disc 602 and a barcode on the blank box 101;

S42: after all rubber rings are placed in the blank box 101, clamping, by the blank box transfer mechanism IV 603, a mold 4035 in the blank box 101 onto a mold conveying belt II 310, and then conveying to the mold stereoscopic warehouse 3 by a mold conveying belt II 310; clamping, by the blank box transfer mechanism IV 603, the blank box 101 onto the blank box conveying belt I 110, and then conveying to a blank box stereoscopic warehouse 1 by the blank box conveying belt I 110;

S43: transferring a rubber ring disc 602 to an oven rack 6075 by a transfer robot III 604, and after all the rubber ring discs 602 placed in the same batch of rubber rings are transferred to the oven rack 6075, transferring the oven rack 6075 to the oven 607 by the transfer robot III 604;

S44: operating the oven 607 to perform two-stage vulcanization of the rubber rings;

S45: after the completion of the two-stage vulcanization, transferring, by the transfer robot III 604, the oven 607 out of the oven rack 6075, and placing the oven on a two-stage vulcanization area oven rack temporary-storage area 605; placing, by the transfer robot III 604, the rubber ring discs 602 in the oven rack 6075 one by one on a rubber ring placement robot base 6014; sucking, by a rubber ring placement robot 601, the rubber rings one by one into an automatic rubber ring detection machine input passage 712;

S46: inputting the rubber rings one by one ton an automatic blank detection machine through the automatic rubber ring detection machine input passage 712, for appearance quality and size detection; associating detection information through the barcode on the rubber ring disc 602; blowing qualified rubber rings into a qualified rubber ring inlet 716, and then conveying into a packaging and labeling area 8 through a qualified rubber ring output passage 707 of the automatic rubber ring detection machine; blowing unqualified rubber rings into an unqualified rubber ring inlet 714, and then conveying into the packaging and labeling area 8 through an unqualified rubber ring output passage 717 of the automatic rubber ring detection machine; and S47: packaging and labeling the qualified rubber rings through a qualified rubber ring packaging and labeling machine 804, and associating detection information through the barcode on the rubber ring disc 602; packaging and labeling the unqualified rubber rings through an unqualified rubber ring packaging and labeling machine 803, and associating detection information through the barcode on the rubber ring disc 602.

The foregoing content is a specific description of the preferred embodiments of the present invention, but the present invention is not limited to these embodiments. A person skilled in the art may also make various equivalent variants or replacements without violating the spirit of the present invention, and these equivalent variants or replacements are included within the scope defined by the claims of the present application. The present invention is also not limited to the production of rubber sealing rings, but uses of similar products in the technical solutions of the present invention.

The invention claimed is:

1. A fully-automatic production line for rubber sealing rings, comprising a ring forming area, a molded vulcanization area, a flash removal area, a two-stage vulcanization area, an online detection area, a packaging and labeling area, and a control room, wherein the ring forming area comprises a blank box stereoscopic warehouse and a plurality of blank forming machines; the blank box stereoscopic warehouse further comprises a blank box, a longitudinal load-bearing steel frame of the blank box stereoscopic warehouse, and a transverse load-bearing steel frame of the blank box stereoscopic warehouse; the blank box is disposed on a load-bearing steel frame composed of the longitudinal load-bearing steel frame of the blank box stereoscopic warehouse and the transverse load-bearing steel frame of the blank box stereoscopic warehouse; the load-bearing steel frame composed of the longitudinal load-bearing steel frame of the blank box stereoscopic warehouse and the transverse load-bearing steel frame of the blank box stereoscopic warehouse is also provided with a four-way reach truck passage of the blank box stereoscopic warehouse; a four-way reach truck of the blank box stereoscopic warehouse is disposed on and in conjunction with the four-way reach truck passage of the blank box stereoscopic warehouse; an in-warehouse stacking machine of the blank box stereoscopic warehouse is disposed at an inlet of the four-way reach truck passage of the blank box stereoscopic warehouse; a blank box conveying belt I is also disposed beside the in-warehouse stacking machine of the blank box stereoscopic warehouse; a blank box transfer mechanism I is disposed on and in conjunction with the blank box conveying belt I; an ex-warehouse stacking machine of the blank box stereoscopic warehouse is further disposed at an outlet of the four-way reach truck passage of the blank box stereoscopic warehouse; an ex-warehouse passage of the blank box stereoscopic warehouse is disposed beside and in cooperation with the ex-warehouse stacking machine of the blank box stereoscopic warehouse; the plurality of blank forming machines is arranged side by side beside the blank box stereoscopic warehouse, and a matching blank box conveying belt II is disposed on an other side of the plurality of blank forming machines;

the molded vulcanization area comprises a mold stereoscopic warehouse, a production stereoscopic warehouse and an assembly unit; the mold stereoscopic warehouse is divided into multiple layers with a same structure, each layer being provided with a plurality of transverse mold stereoscopic warehouse roller groups I, a plurality of longitudinal mold stereoscopic warehouse roller groups II and a mold stereoscopic warehouse roller group III; the mold stereoscopic warehouse roller groups II and the mold stereoscopic warehouse roller groups I jointly constitute a plurality of mold stereoscopic warehouse mold storage positions; a conveying belt steering rod I is respectively disposed at an outlet and an inlet of each mold stereoscopic warehouse mold storage position; a conveying belt steering rod II is further disposed at a junction between the mold stereoscopic warehouse roller group II and the mold stereoscopic warehouse roller group III; the assembly unit comprises a transfer robot I; a blank box conveying belt III is disposed beside and in cooperation with the transfer robot I; a blank box transfer tank III is formed in and in cooperation with the blank box conveying belt III, and meanwhile a photoelectric sensor III is also disposed on the blank box conveying belt III; the blank box conveying belt III is also provided with mold conveying belts II at different heights in a direction perpendicular to a ground; a mold leveling baffle is disposed on a mold conveying belt II, and meanwhile, a mold barcode reader is also disposed on the mold conveying belt II; an in-warehouse stacking machine of a mold stereoscopic warehouse is also disposed at an outlet of the mold conveying belt II; an ex-warehouse stacking machine of the mold stereoscopic warehouse is also disposed at a corresponding position of the in-warehouse stacking machine of the mold stereoscopic warehouse; the in-warehouse stacking machine of the mold stereoscopic warehouse and the ex-warehouse stacking machine of the mold stereoscopic warehouse are connected through a mold stereoscopic warehouse roller group III; the production stereoscopic warehouse comprises a blank box conveying belt V, a conveying belt steering rod III, a molded vulcanization manufacturing unit, longitudinal load-bearing steel frames of a molded vulcanization stereoscopic warehouse, transverse load-bearing steel frames of the molded vulcanization stereoscopic warehouse, transfer robot II ground rails, a transfer robot II, a photoelectric sensor IV, a photoelectric sensor V and a photoelectric sensor VI; the plurality of longitudinal load-bearing steel frames of the molded vulcanization stereoscopic warehouse and the plurality of transverse load-bearing steel frames of the molded vulcanization stereoscopic warehouse constitute a molded vulcanization stereoscopic warehouse shelf; the molded vulcanization warehouse shelf is divided into multiple layers along a direction perpendicular to the ground, with a plurality of molded vulcanization manufacturing units being stored in each layer; the transfer robot II ground rails are disposed between molded vulcanization stereoscopic warehouse shelves; the transfer robot II is disposed and in cooperation with the transfer robot II ground rails; the photoelectric sensor IV, the photoelectric sensor V and the photoelectric sensor VI are respectively disposed at each position, adjacent to the transfer robot II ground rails, of the blank box conveying belt V; the conveying belt steering rod III is disposed at the connection between the blank box conveying belt V and the blank box conveying belt III; the flash removal area comprises a blank box conveying belt VI, a flash removal machine base, a blank box transfer tank IV, a blank box transfer mechanism III, a plurality of flash removal machines, a photoelectric sensor VII, a base lifting mechanism III, a blank box and flash removal machine supporting rods; the flash removal machine supporting rods are disposed below the flash removal machine base; the flash removal machines are disposed above the flash removal machine base; the blank box conveying belt V is disposed on one side of each flash removal machine, the blank box conveying belt VI is disposed on an other side of each flash removal machine, and the base lifting mechanism III and the blank box transfer mechanism III are disposed in front of a flash removal machine; the blank box transfer tank IV is disposed on the blank box conveying belt VI; the photoelectric sensor VII is disposed on the blank box conveying belt V; the blank box is mounted on the flash removal machines; the plurality of flash removal machines share one blank box conveying belt V, and at the same time share one blank box conveying belt VI;

the two-stage vulcanization area comprises a rubber ring placement robot, a rubber ring disc, a blank box transfer mechanism IV, a transfer robot III, a two-stage vulcanization area oven rack temporary-storage area, transfer robot III ground rails, ovens and oven supports; the rubber ring disc is installed in conjunction with the rubber ring placement robot; a blank box transfer mechanism IV is disposed beside the rubber ring placement robot; the transfer robot III ground rails is disposed on and in conjunction with the blank box transfer mechanism IV; the transfer robot III is also disposed on and in conjunction with the transfer robot III ground rails; the two-stage vulcanization area oven rack temporary-storage area is also disposed on the transfer robot III ground rails; the ovens are disposed on both sides of the transfer robot III ground rails through the oven supports, and divided into an upper layer and a lower layer; the transfer robot III ground rails are used in conjunction with the transfer robot III, such that a disposed oven rack is fed into and removed from the oven;

the online detection area comprises an input passage of an automatic rubber ring detection machine, a qualified rubber ring output passage of the automatic rubber ring detection machine, an unqualified rubber ring output passage of the automatic rubber ring detection machine, and the automatic rubber ring detection machine; the input passage of the automatic rubber ring detection machine, the qualified rubber ring output passage of the automatic rubber ring detection machine, and the unqualified rubber ring output passage of the automatic rubber ring detection machine are respectively connected to the automatic rubber ring detection machine; meanwhile, an other end of the input passage of the automatic rubber ring detection machine is connected to the rubber ring placement robot; and the packaging and labeling area comprises a packaging and labeling area unqualified rubber ring input passage, a packaging and labeling area qualified rubber ring input passage, an unqualified rubber ring packaging and labeling machine, a qualified rubber ring packaging and labeling machine), a packaging and labeling area unqualified rubber ring output passage, and a packaging and labeling area qualified rubber ring output passage; one end of the packaging and labeling area unqualified rubber ring input passage is connected to the unqualified rubber ring output passage of the automatic rubber ring detection machine, and the other end of the packaging and labeling area unqualified rubber ring input passage is connected to the unqualified rubber ring packaging and labeling machine; the packaging and labeling area unqualified rubber ring output passage is connected to the unqualified rubber ring packaging and labeling machine; one end of the packaging and labeling area qualified rubber ring input passage is connected to the qualified rubber ring output passage of the automatic rubber ring detection machine, and the other end of the packaging and labeling area qualified rubber ring input passage is connected to the qualified rubber ring packaging and labeling machine; and the packaging and labeling area qualified rubber ring output passage is connected to the qualified rubber ring packaging and labeling machine.

2. The fully-automatic production line for rubber sealing rings according to claim 1, wherein the blank box further comprises a plurality of blank box barrels; the plurality of the blank box barrels is disposed side by side on one side inside the blank box; a thermal insulation area is disposed beside each blank box barrel; a mold storage position is arranged above the thermal insulation area; a blank box mold clamping tank) is also formed above the thermal insulation area; an upper barrel edge is disposed on a top of the blank box barrel; a barrel stop edge is disposed at the bottom of an outer edge of the upper barrel edge; an internal side wall of the blank box barrel is provided with a barrel side edge vertical tank and a barrel positioning rod; a barrel base is disposed on a bottom of the blank box barrel; the barrel base is also provided with a barrel base lifting auxiliary hole; a barrel positioning rod transverse fixing rod is also arranged under the barrel base; and a barrel positioning rod top connecting rod and a barrel positioning rod bottom connecting rod are correspondingly disposed at upper and lower ends of the barrel positioning rod, respectively.

3. The fully-automatic production line for rubber sealing rings according to claim 1, wherein the blank box transfer mechanism I further comprises a blank box transfer mechanism I base; the blank box transfer mechanism I base is disposed on one side of the blank box conveying belt I close to the blank box stereoscopic warehouse; the blank box transfer mechanism I base is further provided with a blank box transfer mechanism I Z-axis sliding table, and a blank box transfer mechanism I Y-axis sliding table screw; the blank box transfer mechanism I Y-axis sliding table screw is provided with a blank box transfer mechanism I Y-axis sliding table motor, meanwhile the blank box transfer mechanism I base is also provided with a blank box transfer mechanism I clamping cylinder and a blank box transfer tank I, and meanwhile the blank box conveying belt I is further provided with a photoelectric sensor I; the blank box transfer mechanism II comprises a blank box transfer mechanism II Z-axis sliding table screw II and a blank box transfer mechanism II Z-axis screw I which are disposed on the blank forming machine base; a blank box transfer mechanism II Z-axis sliding table motor II and a blank box transfer mechanism II Z-axis sliding table motor I are respectively disposed at an upper end of the blank box transfer mechanism II Z-axis sliding table screw II and the upper end of the blank box transfer mechanism II Z-axis screw I; the blank box transfer mechanism II Z-axis sliding table screw II and the upper end of the blank box transfer mechanism II Z-axis screw I are connected through a blank box transfer mechanism II X-axis screw; the blank box transfer mechanism II X-axis screw is also provided with a blank box transfer mechanism II X-axis sliding block and a blank box transfer mechanism II cylinder; the blank box transfer mechanism III comprises a blank box transfer mechanism III Z-axis sliding table screw I and a blank box transfer mechanism III Z-axis sliding table screw II; the blank box transfer mechanism III Z-axis sliding table screw I and the blank box transfer mechanism III Z-axis sliding table screw II are respectively disposed on a flash removal machine base; the blank box transfer mechanism III Z-axis sliding table screw I and the blank box transfer mechanism III Z-axis sliding table screw II are connected through a mounted blank box transfer mechanism III X-axis sliding table screw; the blank box transfer mechanism III X-axis sliding table screw is provided with a blank box transfer mechanism III X-axis sliding table connecting block and a blank box transfer mechanism III cylinder; a blank box transfer mechanism III X-axis sliding table motor is disposed at one end of the blank box transfer mechanism III X-axis sliding table screw; a blank box transfer mechanism III Z-axis sliding table motor II is arranged at the upper end of the blank box transfer mechanism III Z-axis sliding table screw II; a blank box transfer mechanism III Z-axis sliding table motor I is arranged at the upper end of the blank box transfer mechanism III Z-axis sliding table screw I; the blank box transfer mechanism IV comprises a blank box transfer mechanism IV base; a blank box transfer mechanism IV Z-axis screw I and a base lifting mechanism IV are respectively disposed at the upper part of the blank box transfer mechanism IV base; one end of the blank box transfer mechanism IV Z-axis screw I and one end of the blank box transfer mechanism IV screw II are both disposed on the blank box transfer mechanism IV base, and a blank box transfer mechanism IV Z-axis sliding table motor I and a blank box transfer mechanism IV Z-axis sliding table motor II are respectively disposed at other ends of the blank box transfer mechanism IV Z-axis screw I and the blank box transfer mechanism IV screw II; the blank box transfer mechanism IV Z-axis screw I and the blank box transfer mechanism IV screw II are connected through a mounted blank box transfer mechanism IV X-axis sliding table screw; a blank box transfer mechanism IV X-axis sliding table motor is disposed at one end of the blank box transfer mechanism IV X-axis sliding table screw, and meanwhile, a blank box transfer mechanism IV cylinder is further disposed on the blank box transfer mechanism IV X-axis sliding table screw; and a photoelectric sensor VIII is disposed on the blank box conveying belt VI.

4. The fully-automatic production line for rubber seal rings according to claim 1, wherein the blank forming machine includes a blank forming machine base, a blank reel, a blank strip guide device, a blank gripping mechanism, a blank forming workbench, a blank box transfer mechanism II, a base lifting mechanism I, a blank box, a blank box conveying belt II, a blank box transfer tank II, a photoelectric sensor II, a blank forming machine supporting rod, a blank strip cutting knife and a blank gripper; the blank forming machine supporting rod is disposed on a bottom surface under the blank forming machine base; the blank forming workbench, the blank box conveying belt II, the blank strip guide device, the blank reel, the blank box transfer mechanism II, the blank box conveying belt II and the base lifting mechanism I are further disposed on the blank forming machine base; the blank strip cutting knife, the blank gripper and the blank gripping mechanism are disposed on the blank forming workbench; the blank strip guide device is composed of a blank strip guide device mounting base mounted on the blank forming machine base and two upper and lower blank strip guide device guide pulleys located on the blank strip guide device mounting base; the blank reel comprises a blank reel body, a blank reel shaft and a blank reel mounting base; the blank reel is mounted on the blank forming machine base through a blank reel mounting base, and assisted by a blank reel motor to rotate; the blank reel is also wound with a rubber blank strip extruded by a high-pressure extruder; the blank box conveying belt II is provided with a blank box transfer tank II in conjunction therewith; a photoelectric sensor II is also disposed on the blank box conveying belt II; the base lifting mechanism I comprises a base lifting mechanism I motor, a base lifting mechanism I screw and a base lifting mechanism I connecting rod; one end of the base lifting mechanism I screw is disposed on the blank forming machine base, the base lifting mechanism I motor is disposed at an other end of the base lifting mechanism I screw, and the base lifting mechanism I connecting rod is disposed on the base lifting mechanism I screw; the base lifting mechanism I connecting rod is driven by the base lifting mechanism I screw to move vertically in a direction perpendicular to the ground; the blank gripping mechanism comprises a blank gripping mechanism Z-axis screw; one end of the blank gripping mechanism Z-axis screw is disposed on the blank forming machine base, and a blank gripping mechanism Z-axis motor is disposed at the other end of the blank gripping mechanism Z-axis screw; a blank gripping mechanism X-axis screw and a blank gripping mechanism Y-axis sliding table are disposed on the blank gripping mechanism Z-axis screw; a blank gripping mechanism X-axis connecting mechanism is arranged at one end of the blank gripping mechanism X-axis screw; a blank gripping mechanism cylinder is also disposed on the blank gripping mechanism X-axis connecting mechanism; a blank gripping mechanism X-axis motor is disposed at the other end of the blank gripping mechanism X-axis screw.

5. The fully-automatic production line for rubber seal rings according to claim 1, wherein the molded vulcanization manufacturing unit comprises a molded vulcanization manufacturing unit frame and a mold; the molded vulcanization manufacturing unit frame is of a cuboid structure, and meanwhile the molded vulcanization manufacturing unit frame is provided with a molded vulcanization machine inside; a molded vulcanization manufacturing unit control box is disposed on one side of the molded vulcanization machine, and a loading and unloading mechanism I is disposed on the other side of the molded vulcanization machine; a base lifting mechanism II is disposed in front of the molded vulcanization manufacturing unit frame; the molded vulcanization machine comprises a molded vulcanization machine C-type base; the molded vulcanization machine C-type base is disposed on a bottom plate of the molded vulcanization manufacturing unit frame, and at the same time provides mechanical structural support for the molded vulcanization machine; a molded vulcanization machine force-applying shaft is also disposed at an upper part of the molded vulcanization machine C-type base; the molded vulcanization machine force-applying shaft moves vertically along a Z-axis in a direction perpendicular to the ground, and is provided with an electromagnetic adsorption device I, a heat insulation layer I and a heating plate I respectively from top to bottom; an outer edge of the heating plate I is also provided with a vulcanization thermal insulation plate; a heating plate II, a heat insulation layer II and an electromagnetic adsorption device II are disposed at a lower part of the molded vulcanization machine C-type base from bottom to top; the loading and unloading mechanism I comprises a loading and unloading mechanism I Z-axis screw and a loading and unloading mechanism I Y-axis sliding table; one end of the loading and unloading mechanism I Z-axis screw is disposed on the bottom plate of the molded vulcanization manufacturing unit frame, and a loading and unloading mechanism I Z-axis motor is disposed at an other end of the loading and unloading mechanism I Z-axis screw; a loading and unloading mechanism I cylinder connecting block is disposed on the loading and unloading mechanism I Y-axis sliding table; a loading and unloading mechanism I cylinder rotating assembly is disposed on the loading and unloading mechanism I cylinder connecting block; the loading and unloading mechanism I cylinder is divided into a loading and unloading mechanism I cylinder upper part and a loading and unloading mechanism I cylinder lower part, which are connected independently to an air source and controlled for actions receptively by corresponding air pressure gauges.

6. The fully-automatic production line for rubber seal rings according to claim 1, wherein the flash removal machine comprises a flash removal machine frame, a loading and unloading mechanism II and a flash removal mechanism; the loading and unloading mechanism II comprises a clamping removal end of the flash removal machine, a loading and unloading mechanism II Y-axis sliding table, a loading and unloading mechanism II Z-axis motor and a loading and unloading mechanism II Z-axis screw; the clamping removal end of the flash removal machine consists of a removal head of the flash removal machine, a force sensor I, a clamping removal end connector of the flash removal machine and a flash removal machine cylinder; one end of the flash removal head of the flash removal machine is connected to the force sensor I, and an other end of the flash removal head of the flash removal machine is continuously provided with a 45° inclination friction surface and a 90° inclination friction surface; one end of the force sensor I is connected to the flash removal head of the flash removal machine, and the other end of the force sensor I is connected to the clamping removal end connector of the flash removal machine; the clamping removal end connector of the flash removal machine is respectively connected to the force sensor I, the flash removal machine cylinder and the loading and unloading mechanism II Y-axis sliding table; the flash removal machine cylinder is connected to the clamping removal end connector of the flash removal machine; a lower part of the flash removal machine frame is disposed on the flash removal machine frame, and except for a side connected with the base lifting mechanism III, the other three sides and the bottom are closed; the loading and unloading mechanism II Y-axis sliding table is composed of a loading and unloading mechanism II Y-axis motor and a loading and unloading mechanism II Y-axis screw; one end of the loading and unloading mechanism II Z-axis screw is disposed on the flash removal machine base, and a loading and unloading mechanism II Z-axis motor is disposed at the other end of the loading and unloading mechanism II Z-axis screw; the flash removal mechanism comprises a flash removal machine X-axis sliding table, a flash removal machine rubber ring rotating motor and a flash removal machine flash removal table; the flash removal machine X-axis sliding table is composed of a flash removal machine rubber ring hook, a flash removal machine rubber ring stretching guide block, a force sensor II, a flash removal machine X-axis sliding table connecting block, a flash removal machine X-axis sliding table screw and a flash removal machine X-axis sliding table motor; one side of the force value sensor II is connected to the flash removal machine rubber ring hook through a crossbar, and an other side of the force value sensor II is connected to the flash removal machine X-axis sliding table connecting block; one side of the flash removal machine X-axis sliding table connecting block is connected to the force sensor II, and the other side of the flash removal machine X-axis sliding table connecting block is connected to the flash removal machine X-axis sliding table screw, such that a connecting force value drives the force sensor II to slide through the flash removal machine X-axis sliding table screw, and finally drives the flash removal machine rubber ring hook to tighten the rubber ring.

7. The fully-automatic production line for rubber seal rings according to claim 1, wherein the rubber ring placement robot comprises a rubber ring placement robot frame, rubber ring placement robot pneumatic rods, a rubber ring placement robot cylinder, a rubber ring placement robot base and a rubber ring placement robot supporting rod; the rubber ring placement robot frame is disposed on the rubber ring placement robot base; one ends of the plurality of rubber ring placement robot pneumatic rods at a same angle to each other are connected to the rubber ring placement robot frame, and other ends thereof are connected to the rubber ring placement robot cylinder; a rubber ring disc is also disposed above the rubber ring placement robot base, and functions to carry the rubber rings placed by the rubber ring placement robot; the rubber ring disc is also provided with a barcode for rubber ring disc identification; a rubber ring placement robot supporting rod is disposed below the rubber ring placement robot base and used for providing mechanical support and height adjustment of the rubber ring placement robot; meanwhile the disposed oven rack is composed of an oven rack bracket, an oven rack hook and a rubber ring disc, and functions to hold different rubber ring discs in conjunction with the oven; the oven is composed of an oven door, an oven body, oven door guide rails and an oven door hook; the oven door is driven by a motor disposed in the oven, and is opened and closed along the oven door guide rails; and the oven rack hook on the oven rack is used in conjunction with the oven door hook.

8. The fully-automatic production line for rubber seal rings according to claim 1, wherein the automatic rubber ring detection machine comprises a qualified rubber ring outlet, an unqualified rubber ring outlet, a rubber ring detection disc motor, a rubber ring separation mechanism, a unqualified rubber ring air gun, an unqualified rubber ring inlet, a qualified rubber ring air gun, a qualified rubber ring inlet, a rubber ring detection disc, and an automatic rubber ring detection machine base; an automatic rubber ring detection machine frame is disposed in a middle of an upper part of the automatic rubber ring detection machine base, an automatic rubber ring detection machine frame is also provided around a perimeter of the automatic rubber ring detection machine base, and automatic rubber ring detection machine supporting rods are disposed at a lower part of the automatic rubber ring detection machine base; a detection station I, a detection station II, a detection station III, a detection station IV and a detection station V are respectively disposed at the upper part of the automatic rubber ring detection machine base; the detection station V further comprises a detection station V Z-axis sliding table screw and a detection station V Z-axis detection head; one end of the detection station V Z-axis sliding table screw is disposed on one end on the automatic rubber ring detection machine base, a detection station V Z-axis sliding table motor is disposed at an other end of the detection station V Z-axis sliding table screw, and a detection station V detection head connecting block is disposed in a middle of a detection station V Z-axis sliding table screw; one side of the detection station V Z-axis detection head is connected to the detection station V detection head connecting block, and a detection station V detection lens is disposed at a lower part of the detection station V Z-axis detection head; a detection station V power supply is disposed below the detection station V detection lens, and the detection station V power supply is located below the rubber ring detection disc; and a qualified rubber ring air gun and an unqualified rubber ring air gun are disposed at a position of the rubber ring detection disc close to the upper part of the automatic rubber ring detection machine input passage, and function to blow air to the rubber rings, such that qualified rubber rings or unqualified rubber rings are blown into the qualified rubber ring inlet or the unqualified rubber ring inlet respectively.

9. The fully-automatic production line for rubber seal rings according to claim 1, wherein the unqualified rubber ring packaging and labeling machine comprises a packaging bag barrel, a packaging bag barrel shaft, a packaging bag I, a rubber ring receiving barrel, a photoelectric sensor IX, a packaging and labeling machine supporting rod, a packaging bag guide cylinder, a labeler, a packaging bag transverse heat sealer, a packaging bag II, a barcode identifier, a rubber ring and a packaging bag longitudinal heat sealer; a lower part of the packaging and labeling machine supporting rod is disposed on a ground, and the packaging bag barrel is disposed above the packaging and labeling machine supporting rod through the packaging bag barrel shaft; the packaging bag I is a film rolled on the packaging bag barrel, and the lower part of the packaging bag I is rolled into a film tube with an unsealed end through the packaging bag guide cylinder; un sealed side end of the packaging bag I is heat-sealed by the packaging bag longitudinal heat sealer, and a lower end of the packaging bag I is sealed twice in front and rear of the rubber ring by the packaging bag transverse heat sealer; the rubber ring is inputted by the unqualified rubber ring input passage of the packaging and labeling unit, and falls into the packaging bag II with the lower end and side end being sealed after passing through the rubber ring receiving barrel, and a falling process is counted by the photoelectric sensor IX; and the packaging bag II is labeled by the labeler.

10. An automatic production method for rubber seal rings, which is implemented by the fully-automatic production line for rubber seal rings according to claim 1, comprising the following steps:

S1: issuing a production order number to production line management personnel in the control room; conveying, by the four-way reach truck of the blank box stereoscopic warehouse, blank boxes in the blank box stereoscopic warehouse to the ex-warehouse stacking machine of the blank box stereoscopic warehouse through the four-way reach truck passage of the blank box stereoscopic warehouse, and then conveying to a working area of the transfer robot I through the ex-warehouse passage of the blank box stereoscopic warehouse; establishing a corresponding relation between the production order number and a barcode on the blank box;

S2: clamping, by the transfer robot I, the blank box on the four-way reach truck of the blank box stereoscopic warehouse to a blank box transfer tank II, and returning the four-way reach truck of the blank box stereoscopic warehouse to the blank box stereoscopic warehouse;

S3: conveying the blank box that is carried on the blank box transfer tank II to a blank forming machine that produces a blank ring corresponding to a material designation, along the blank box conveying belt II;

S4: activating the blank box transfer mechanism II to clamp the blank box out of the blank box transfer tank II, and installing the blank box together with a base lifting mechanism I, by means of an installation method of inserting a base lifting mechanism I connecting rod into a barrel base lifting auxiliary hole;

S5: lifting the base lifting mechanism I connecting rod close to one side of the blank forming machine until a barrel base is in a highest position;

S6: after installation of the blank box, operating the blank forming machine, and clamping, by a blank gripping mechanism cylinder, blank strips and pulling blank strips forward until a blank gripper clamps the front ends of the blank strips;

S7: loosening the blank strips by the blank gripping mechanism cylinder, and conveying the blank strips forward by a blank strip guide device guide pulley until a desired blank strip length is formed in accordance with a desired blank ring specification;

S8: clamping the blank strip by the blank gripping mechanism cylinder, and operating a blank strip cutting knife to cut off the blank strip;

S9: bending the blank strip into a ring by the blank gripping mechanism cylinder under an action of a blank gripping mechanism, and extruding two ends of the blank strip by the blank gripping mechanism cylinder and the blank gripper to complete the blank ring formation;

S10: loosening the blank gripper, placing, by the blank gripping mechanism cylinder, the blank ring, onto a barrel base on which the blank box is raised, and moving the barrel base slightly downward under the driving of a base lifting mechanism I connecting rod to ensure that a vertical height position of a next blank ring on the barrel base is similar to a previous one;

S11: repeating S6 to S10, till a barrel is filled with the blank rings;

S12: clamping the blank box into a blank box transfer tank II through a blank box transfer mechanism II, and conveying the blank box transfer tank II to a working area of the transfer robot I through a blank box conveying belt II;

S13: clamping, by the transfer robot I, the blank box from the blank box transfer tank II into the blank box transfer tank II, recognizing a barcode on the blank box, and issuing a mold command to a mold stereoscopic warehouse;

S14: conveying molds in corresponding mold stereoscopic warehouse mold storage positions in the mold stereoscopic warehouse respectively to an ex-warehouse stacking machine of the mold stereoscopic warehouse through a mold stereoscopic warehouse roller group I, a mold stereoscopic warehouse roller group II and the mold stereoscopic warehouse roller group III, under the action of the conveying belt steering rod I and the conveying belt steering rod II;

S15: lifting corresponding molds to a working position of the transfer robot I through the ex-warehouse stacking machine of the mold stereoscopic warehouse, and clamping the molds by the transfer robot I into a blank box mold cavity of the blank box;

S16: conveying the blank box transfer tank III to the molded vulcanization area through the blank box conveying belt III, and then conveying to a working area of a corresponding transfer robot II under the action of the conveying belt steering rod III and the blank box conveying belt V;

S17: clamping, by the transfer robot II, the blank box out of the blank box transfer tank III, and installing the blank box in a base lifting mechanism II of the idle mold vulcanization manufacturing unit, by means of the installation method of inserting a connecting rod of the base lifting mechanism II into a barrel base lifting auxiliary hole;

S18: installing, by the transfer robot II, the mold in the blank box on the molded vulcanization machine, and lifting, by the base lifting mechanism II, a barrel base away from the molded vulcanization machine, to a highest position;

S19: operating an electromagnetic adsorption device I and an electromagnetic adsorption device II of the molded vulcanization machine to adsorb an upper mold and a lower mold respectively;

S20: moving a molded vulcanization machine force-applying shaft of the molded vulcanization machine upward to drive the upper mold to be separated from the lower mold;

S21: sucking, a loading and unloading mechanism I, the blank ring from the barrel containing the blank ring in the blank box to the lower mold, and then moving the molded vulcanization machine force-applying shaft downward;

S22: operating a heating plate I and a heating plate II such that the blank ring begins to be molded-vulcanized;

S23: after completion of molded vulcanization, moving the molded vulcanization machine force-applying shaft upward, and moving a loading and unloading mechanism I cylinder of the loading and unloading mechanism I between the upper mold and the lower mold;

S24: moving the molded vulcanization machine force-applying shaft upward until the upper mold and the lower mold are fitted to the loading and unloading mechanism I cylinder;

S25: operating the loading and unloading mechanism I cylinder to suck the rubber ring on the mold, and determining, according to sensor data, that an adsorption position of the rubber ring is located in a loading and unloading mechanism I cylinder upper part or a loading and unloading mechanism I cylinder lower part;

S26: moving the molded vulcanization machine force-applying shaft upward, and rotating, by the loading and unloading mechanism I, the rubber ring, onto a finished-product rubber ring barrel of the blank box;

S27: moving a finished-product rubber ring barrel base slightly downward under driving of the base lifting mechanism II to ensure that a vertical height position of a next rubber ring on the barrel base is similar to a previous one;

S28: repeating S19 to S27, until all blank rings are molded-vulcanized, and placed one by one in the finished-product rubber ring barrel;

S29: moving the molded vulcanization machine force-applying shaft downward till the upper mold and the lower mold are close and fitted, stopping operating an electromagnetic adsorption device I and an electromagnetic adsorption device II, and lowering, by the base lifting mechanism, barrel bases on both sides of the blank box to a lowest position;

S30: moving the molded vulcanization machine force-applying shaft upward, clamping, by the transfer robot II, the mold into a blank box mold cavity of the blank box, and clamping the blank box into a blank box transfer tank III;

S31: conveying the blank box transfer tank III into the flash removal area through the blank box conveying belt V, taking, by the blank box transfer mechanism III, the blank box out of the blank box transfer tank III, and installing the blank box in the base lifting mechanism III, by means of an installation method of inserting a connecting rod of the base lifting mechanism III into a barrel base lifting auxiliary hole;

S32: lifting, by the base lifting mechanism III, the barrel base on one side of the blank barrel of the blank box to a highest position;

S33: clamping, by the blank box transfer mechanism III, the rubber ring on one side of a finished-product barrel of the blank box to a flash removal table of the flash removable machine, such that a rotating shaft of a rubber ring rotating motor of the flash removal machine and a flash removal rubber ring hook are located in the rubber ring;

S34: operating a flash removal machine X-axis sliding table, and tightening the rubber ring, wherein a degree of tightening is controlled by a force sensor II;

S35: operating the rubber ring rotating motor of the flash removal machine to drive the rubber ring to rotate, and operating a flash removal head of the flash removal machine to remove flashes of the rubber ring by means of a friction surface, wherein a removal force is controlled by the force sensor I;

S36: after removal of the flashes of the rubber ring, loosening the rubber ring by the flash removal machine X-axis sliding table; clamping, by the blank box transfer mechanism III, the rubber ring to one side of the blank barrel of the blank box; and moving a blank barrel base slightly downward under the driving of the base lifting mechanism III to ensure that a vertical height position of the next rubber ring on the barrel base is similar to the previous one;

S37: repeating S29 to S36, until all rubber rings are removed for flashes, and placed one by one in the blank barrel;

S38: operating the base lifting mechanism III to lower the barrel bases on both sides of the blank box to a lowest position; and operating the blank box transfer mechanism III to clamp the blank box into a blank box transfer tank IV;

S39: conveying, by the blank box transfer tank IV, the blank box to a second-stage vulcanization area along a blank box conveying belt VI;

S40: operating the blank box transfer mechanism IV to install the blank box and the base lifting mechanism IV, by means of the installation method of inserting a connecting rod of the base lifting mechanism IV into a barrel base lifting auxiliary hole;

S41: taking, by the rubber ring placement robot, the rubber rings one by one out of the blank barrel of the blank box, placing the rubber rings on a rubber disc without overlapping with each other, and establishing a relationship between a barcode on the rubber disc and a barcode on the blank box;

S42: after all rubber rings are placed in the blank box, clamping, by the blank box transfer mechanism IV, a mold in the blank box onto the mold conveying belt II, and then conveying to the mold stereoscopic warehouse by the mold conveying belt II; clamping, by the blank box transfer mechanism IV, the blank box onto the blank box conveying belt I, and then conveying to a blank box stereoscopic warehouse by the blank box conveying belt I;

S43: transferring a rubber ring disc to an oven rack by a transfer robot III, and after all the rubber ring discs placed in a same batch of rubber rings are transferred to the oven rack, transferring the oven rack to an oven by the transfer robot III;

S44: operating the oven to perform two-stage vulcanization of the rubber rings;

S45: after completion of the two-stage vulcanization, transferring, by the transfer robot III, the oven out of the oven rack, and placing the oven on a two-stage vulcanization area oven rack temporary-storage area; placing, by the transfer robot III, the rubber ring discs in the oven rack one by one on a rubber ring placement robot base; sucking, by a rubber ring placement robot, the rubber rings one by one into an automatic rubber ring detection machine input passage;

S46: inputting the rubber rings one by one ton an automatic blank detection machine through the automatic rubber ring detection machine input passage, for appearance quality and size detection; associating detection information through the barcode on the rubber ring disc; blowing qualified rubber rings into a qualified rubber ring inlet, and then conveying into a packaging and labeling area through a qualified rubber ring output passage of the automatic rubber ring detection machine; blowing unqualified rubber rings into an unqualified rubber ring inlet, and then conveying into the packaging and labeling area through an unqualified rubber ring output passage of the automatic rubber ring detection machine; and S47: packaging and labeling the qualified rubber rings through a qualified rubber ring packaging and labeling machine), and associating detection information through the barcode on the rubber ring disc; packaging and labeling the unqualified rubber rings through an unqualified rubber ring packaging and labeling machine, and associating detection information through the barcode on the rubber ring disc.

\* \* \* \* \*